US012677197B2

(12) United States Patent
Kim

(10) Patent No.: US 12,677,197 B2
(45) Date of Patent: Jul. 7, 2026

(54) METHOD AND APPARATUS FOR PREAMBLE TRANSMISSION AND UPLINK TRANSMISSION TIMING ADJUSTMENT FOR LAYER 2 MOBILITY IN MOBILE WIRELESS COMMUNICATION SYSTEM

(71) Applicants: BLACKPIN Inc., Seoul (KR); Soenghun Kim, Hanam-si (KR)

(72) Inventor: Soenghun Kim, Hanam-si (KR)

(73) Assignees: BLACKPIN Inc., Seoul (KR); Soenghun Kim, Hanam-si (KR)

( * ) Notice: Subject to any disclaimer, the term of this patent is extended or adjusted under 35 U.S.C. 154(b) by 302 days.

(21) Appl. No.: 18/602,032

(22) Filed: Mar. 12, 2024

(65) Prior Publication Data

US 2024/0314651 A1 Sep. 19, 2024

(30) Foreign Application Priority Data

Mar. 14, 2023 (KR) ........................ 10-2023-0033041

(51) Int. Cl.
*H04W 36/00* (2009.01)
(52) U.S. Cl.
CPC ... *H04W 36/0072* (2013.01); *H04W 36/0061* (2013.01)
(58) Field of Classification Search
CPC ............. H04W 36/08; H04W 36/0077; H04W 36/0061; H04W 36/0072
See application file for complete search history.

(56) References Cited

U.S. PATENT DOCUMENTS

| | | | | |
|---|---|---|---|---|
| 12,114,334 | B1 * | 10/2024 | Kim ..................... | H04W 72/231 |
| 2018/0007693 | A1 * | 1/2018 | Lee ......................... | H04L 5/0098 |
| 2019/0110224 | A1 * | 4/2019 | Yasukawa ............. | H04W 72/21 |
| 2019/0253197 | A1 * | 8/2019 | Babaei ................... | H04L 1/188 |
| 2019/0320467 | A1 * | 10/2019 | Freda ................... | H04L 5/0055 |
| 2020/0178278 | A1 * | 6/2020 | Zhao ................. | H04W 72/1268 |
| 2021/0144582 | A1 * | 5/2021 | Yi ..................... | H04W 28/0278 |

(Continued)

OTHER PUBLICATIONS

3GPP TS 38.213 V17.4.0 (Dec. 2022); Technical Specification; 3rd Generation Partnership Project; Technical Specification Group Radio Access Network; NR; Physical layer procedures for control (Release 17).

(Continued)

*Primary Examiner* — Kenny S Lin
(74) *Attorney, Agent, or Firm* — Nicholas Park

(57) ABSTRACT

A method and apparatus for layer 2 mobility is provided. Method for lower layer mobility includes transmitting the UECapabilityInformation to the base station, receiving a RRCReconfigruation from the base station, receiving a PDCCH order from the base station, transmitting a preamble to the base station based on the PDCCH order, receiving a response from the base station and determining Timing advance between downlink and uplink (TTA). If the type1 PDCCH order was received, the terminal determining TTA of a first cell based on the first field (TAC) and the subcarrier spacing for a first PUSCH transmission. The first cell is the cell where the first PDCCH order was received. If the type2 PDCCH order was received, the terminal determining TTA of a second cell based on the first field and the subcarrier spacing for the preamble transmission and the second field (CMG identifier).

20 Claims, 10 Drawing Sheets

(56)         References Cited

U.S. PATENT DOCUMENTS

| 2022/0295366 | A1* | 9/2022 | Teyeb | H04W 76/30 |
| 2022/0338077 | A1* | 10/2022 | Kim | H04W 36/087 |
| 2022/0369172 | A1* | 11/2022 | Hwang | H04W 36/0079 |
| 2023/0099762 | A1* | 3/2023 | Khoshkholgh Dashtaki | H04W 56/001 |
| | | | | 370/350 |
| 2023/0110446 | A1* | 4/2023 | Ohlsson | H04W 36/362 |
| | | | | 455/442 |
| 2023/0199571 | A1* | 6/2023 | Babaei | H04W 56/0015 |
| | | | | 370/331 |
| 2024/0205772 | A1* | 6/2024 | Jung | H04W 36/08 |
| 2024/0314880 | A1* | 9/2024 | Kim | H04W 56/0015 |
| 2025/0088926 | A1* | 3/2025 | Hong | H04W 36/08 |

OTHER PUBLICATIONS

3GPP TS 38.212 V17.4.0 (Dec. 2022); Technical Specification; 3rd Generation Partnership Project; Technical Specification Group Radio Access Network; NR; Multiplexing and channel coding (Release 17).
3GPP TS 38.211 V17.4.0 (Dec. 2022); Technical Specification; 3rd Generation Partnership Project; Technical Specification Group Radio Access Network; NR; Physical channels and modulation (Release 17).
3GPP TS 38.214 V17.4.0 (Dec. 2022); Technical Specification; 3rd Generation Partnership Project; Technical Specification Group Radio Access Network; NR; Physical layer procedures for data (Release 17).
3GPP TS 38.321 V17.3.0 (Dec. 2022); Technical Specification; 3rd Generation Partnership Project; Technical Specification Group Radio Access Network; NR; Medium Access Control (MAC) protocol specification (Release 17).
3GPP TS 38.331 V17.3.0 (Dec. 2022); Technical Specification; 3rd Generation Partnership Project; Technical Specification Group Radio Access Network; NR; Radio Resource Control (RRC) protocol specification (Release 17).
Ericsson, "Discussion on RRC aspects for LTM," 3GPP TSG-RAN WG2 #120, Toulouse, France, R2-2212435, Nov. 14-18, 2022.
Ericsson, "Discussion on the execution of LTM cell switch," 3GPP TSG-RAN WG2 #120, Toulouse, France, R2-2212436, Nov. 14-18, 2022.
Ericsson, "Description of overall LTM procedure," 3GPP TSG-RAN WG2 #120, Toulouse, France, R2-2212437, Nov. 14-18, 2022.
Ericsson, "Qualitative analysis on what to include in the RRC model for LTM," 3GPP TSG-RAN WG2 #120, Toulouse, France, R2-2212438, Nov. 14-18, 2022.
MediaTek Inc., "Enhancements on Latency Components for L1/L2-triggered Mobility," 3GPP TSG-RAN WG2 Meeting #120, Toulouse, France, R2-2211194, Nov. 14-18, 2022.
MediaTek Inc., "Procedures of L1/L2-triggered Mobility," 3GPP TSG-RAN WG2 Meeting #120, Toulouse, France, R2-2211195, Nov. 14-18, 2022.
MediaTek Inc., "RRC Aspects of L1/L2-triggered Mobility," 3GPP TSG-RAN WG2 Meeting #120, Toulouse, France, R2-2211196, Nov. 14-18, 2022.
MediaTek Inc., "Cell Switch in L1/L2-triggered Mobility," 3GPP TSG-RAN WG2 Meeting #120, Toulouse, France, R2-2211197, Nov. 14-18, 2022.
Huawei et al., "Procedure descriptions of LTM procedure," 3GPP TSG RAN WG2 Meeting #120, Toulouse, France, R2-2211641, Nov. 14-18, 2022.
Huawei et al., "Solutions to cell switch in LTM," 3GPP TSG-RAN WG2 Meeting #120, Toulouse, France, R2-2211642, Nov. 14-18, 2022.
Huawei et al., "LTM target performance enhancement," 3GPP TSG-RAN WG2 Meeting #120, Toulouse, France,, R2-2212068, Nov. 14-18, 2022.
Huawei et al., "Configuration of candidate target configurations (pre-configurations) for LTM," 3GPP TSG-RAN2 Meeting #120, Toulouse, France, R2-2212069, Nov. 14-18, 2022.

* cited by examiner

User Plane Protocol Stack

Control Plane Protocol Stack

3A-11

Transmitting the UECapabilityInformation 3A-16

Receiving the RRCReconfigruation 3A-21

Receiving a PDCCH order 3A-26

Transmitting a preamble based on the PDCCH order 3A-31

Receiving a response 3A-36

Determining Timing advance between downlink and uplink (TTA)

METHOD AND APPARATUS FOR PREAMBLE TRANSMISSION AND UPLINK TRANSMISSION TIMING ADJUSTMENT FOR LAYER 2 MOBILITY IN MOBILE WIRELESS COMMUNICATION SYSTEM

CROSS-REFERENCE TO RELATED APPLICATION

This application claims priority to and the benefit of Korean Patent Application No. 10-2023-0033041, filed on Mar. 14, 2023, the disclosure of which is incorporated here in by reference in its entirety.

BACKGROUND

Technical Field

The present disclosure relates to a mobile communication system with layer 2 mobility. More specifically, the present disclosure relates to interactions between terminal and base station to perform layer 2 mobility where layer 1 switches between adjacent cells while layer 2 continues.

Related Art

To meet the increasing demand for wireless data traffic since the commercialization of 4th generation (4G communication systems), the 5th generation (5G system) is being developed. 5G system introduced millimeter wave (mmW) frequency bands (e.g. 60 GHz bands). In order to increase the propagation distance by mitigating propagation loss in the 5 G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

When the UE passes from the coverage area of one cell to another cell, at some point a serving cell change need to be performed. Currently serving cell change is triggered by L3 measurements and is done by RRC signalling triggered Reconfiguration with Synch for change of PCell and PSCell, as well as release add for SCells when applicable, all cases with complete L2 (and L1) resets, and involving more latency, more overhead and more interruption time than beam switch mobility.

To meet the strict service requirements for the future mobile communication system, new mobility mechanism with less interruption time is required.

SUMMARY

Aspects of the present disclosure are to address the problems of supporting layer 2 mobility. The method includes transmitting the UECapabilityInformation to the base station, receiving a RRCReconfigruation from the base station, receiving a PDCCH order from the base station, transmitting a preamble to the base station based on the PDCCH order, receiving a response from the base station and determining Timing advance between downlink and uplink (TTA). If the type1 PDCCH order was received, the terminal determining TTA of a first cell based on the first field (TAC) and the subcarrier spacing for a first PUSCH transmission. The first cell is the cell where the first PDCCH order was received. If the type2 PDCCH order was received, the terminal determining TTA of a second cell based on the first field and the subcarrier spacing for the preamble trans-mission and the second field (CMG identifier).

DETAILED DESCRIPTION

Figure 1A:
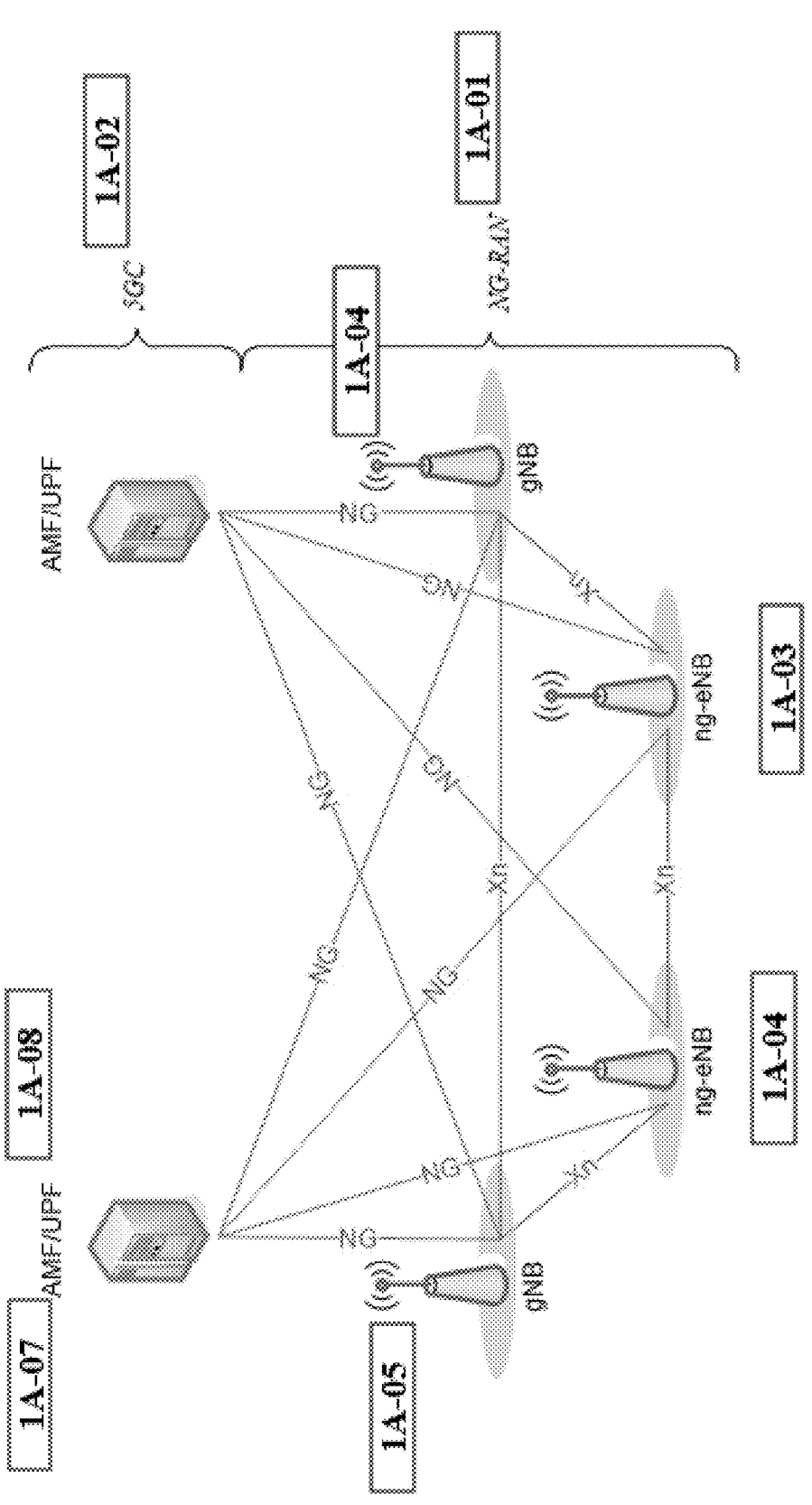
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary accord-ing to intentions or customs of users and operators. There-fore, the definition should be made based on the content throughout this specification.

The terms used, in the following description, for indicat-ing access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not lim-ited by use of these terms and definitions and other arbitrary terms and definitions may be employed instead.

Table 1 lists the acronyms used throughout the present disclosure.

TABLE 1

| Acronym | Full name | Acronym | Full name |
|---------|-----------|---------|-----------|
| 5GC | 5G Core Network | RACH | Random Access Channel |
| ACK | Acknowledgement | RAN | Radio Access Network |
| AM | Acknowledged Mode | RA-RNTI | Random Access RNTI |
| AMF | Access and Mobility Management Function | RAT | Radio Access Technology |
| ARQ | Automatic Repeat Request | RB | Radio Bearer |
| AS | Access Stratum | RLC | Radio Link Control |
| ASN.1 | Abstract Syntax Notation One | RNA | RAN-based Notification Area |
| BSR | Buffer Status Report | RNAU | RAN-based Notification Area Update |
| BWP | Bandwidth Part | RNTI | Radio Network Temporary Identifier |
| CA | Carrier Aggregation | RRC | Radio Resource Control |
| CAG | Closed Access Group | RRM | Radio Resource Management |
| CG | Cell Group | RSRP | Reference Signal Received Power |
| C-RNTI | Cell RNTI | RSRQ | Reference Signal Received Quality |
| CSI | Channel State Information | RSSI | Received Signal Strength Indicator |
| DCI | Downlink Control Information | SCell | Secondary Cell |
| DRB | (user) Data Radio Bearer | SCS | Subcarrier Spacing |
| DRX | Discontinuous Reception | SDAP | Service Data Adaptation Protocol |
| HARQ | Hybrid Automatic Repeat Request | SDU | Service Data Unit |
| IE | Information element | SFN | System Frame Number |
| LCG | Logical Channel Group | S-GW | Serving Gateway |
| MAC | Medium Access Control | SI | System Information |
| MIB | Master Information Block | SIB | System Information Block |
| NAS | Non-Access Stratum | SpCell | Special Cell |
| NG-RAN | NG Radio Access Network | SRB | Signalling Radio Bearer |
| NR | NR Radio Access | SRS | Sounding Reference Signal |
| PBR | Prioritised Bit Rate | SSB | SS/PBCH block |
| PCell | Primary Cell | SSS | Secondary Synchronisation Signal |
| PCI | Physical Cell Identifier | SUL | Supplementary Uplink |
| PDCCH | Physical Downlink Control Channel | TM | Transparent Mode |
| PDCP | Packet Data Convergence Protocol | UCI | Uplink Control Information |
| PDSCH | Physical Downlink Shared Channel | UE | User Equipment |
| PDU | Protocol Data Unit | UM | Unacknowledged Mode |
| PHR | Power Headroom Report | CRP | Cell Reselection Priority |
| PLMN | Public Land Mobile Network | PRS | Positioning Reference Signal |
| PRACH | Physical Random Access Channel | CS-RNTI | Configured Scheduling-RNTI |
| PRB | Physical Resource Block | TAG | Timing Advance Group |
| PSS | Primary Synchronisation Signal | SDT | Small Data Transmission |
| PUCCH | Physical Uplink Control Channel | RA-SDT | Random Access-SDT |
| PUSCH | Physical Uplink Shared Channel | CG-SDT | Configured Grant-SDT |
| PTAG | Primary TAG | STAG | Secondary TAG |

Table 2 lists the terminologies and their definition used throughout the present disclosure.

TABLE 2

| Terminology | Definition |
|-------------|------------|
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |

TABLE 2-continued

| Terminology | Definition |
|---|---|
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowedServingCells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discardTimer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code - Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |

TABLE 2-continued

| Terminology | Definition |
|---|---|
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply<br>- The cell is part of either the selected PLMN or the registered PLMN or PLMN of the Equivalent PLMN list<br>- The cell is not barred<br>- The cell is part of at least one TA that is not part of the list of "Forbidden Tracking Areas for Roaming" (TS 22.011 [18]), which belongs to a PLMN that fulfils the first bullet above.<br>- The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive AS Context | UE Inactive AS Context is stored when the connection is suspended and restored when the connection is resumed. It includes information below. the current KgNB and KRRCint keys, the ROHC state, the stored QoS flow to DRB mapping rules, the C-RNTI used in the source PCell, the cellIdentity and the physical cell identity of the source PCell, the spCellConfigCommon within Reconfiguration WithSync of the NR PSCell (if configured) and all other parameters configured except for:<br>- parameters within Reconfiguration WithSync of the PCell;<br>- parameters within ReconfigurationWithSync of the NR PSCell, if configured;<br>- parameters within MobilityControlInfoSCG of the E-UTRA PSCell, if configured;<br>- servingCellConfigCommonSIB; |
| TAG | A group of Serving Cells that is configured by RRC and that, for the cells with a UL configured, using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs. |

9

10

In the present invention, "trigger" or "triggered" and "initiate" or "initiated" may be used in the same meaning.

In the present invention, terminal and UE may be used in the same meaning. In the present invention, base station and NG-RAN node may be used in the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

a gNB, providing NR user plane and control plane protocol terminations towards the UE; or an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
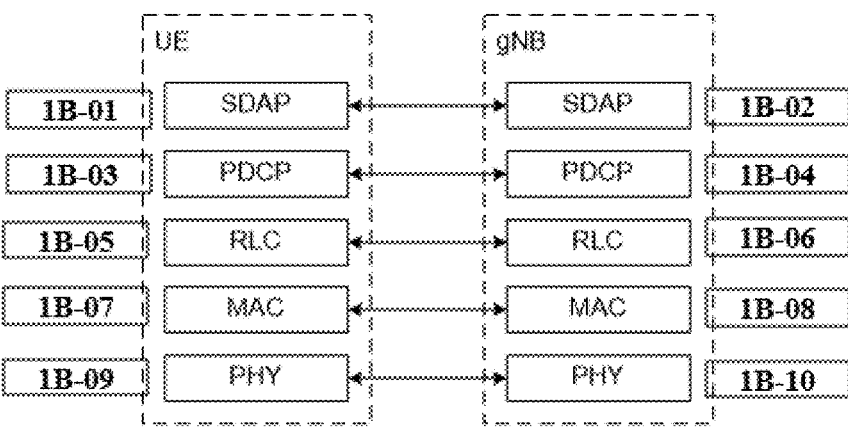
FIG. 1B is a diagram illustrating a wireless protocol architecture in an 5G system to which the disclosure may be applied.
Figure 1B:
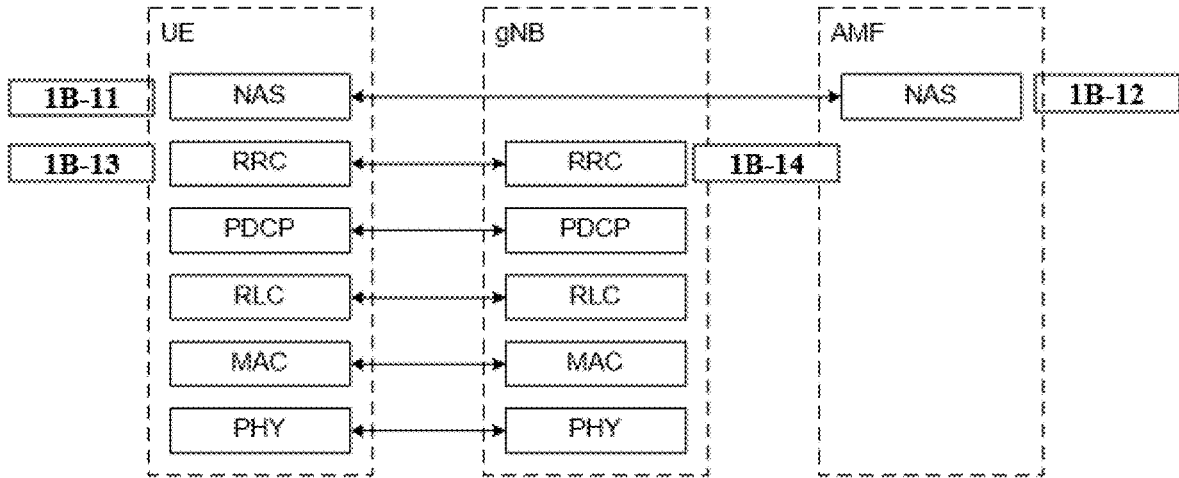

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
| --- | --- |
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
| --- | --- |
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection; Broadcast of system information; Cell re-selection mobility; Paging is initiated by NG-RAN (RAN paging; RAN-based notification area (RNA is managed by NG- RAN; DRX for RAN paging configured by NG-RAN; 5GC - NG-RAN connection (both C/U-planes is established for UE; The UE AS context is stored in NG-RAN and the UE; NG-RAN knows the RNA which the UE belongs to. |
| RRC_CONNECTED | 5GC - NG-RAN connection (both C/U-planes is established for UE; The UE AS context is stored in NG-RAN and the UE; NG-RAN knows the cell which the UE belongs to; Transfer of unicast data to/from the UE; Network controlled mobility including measurements. |

Figure 1C:
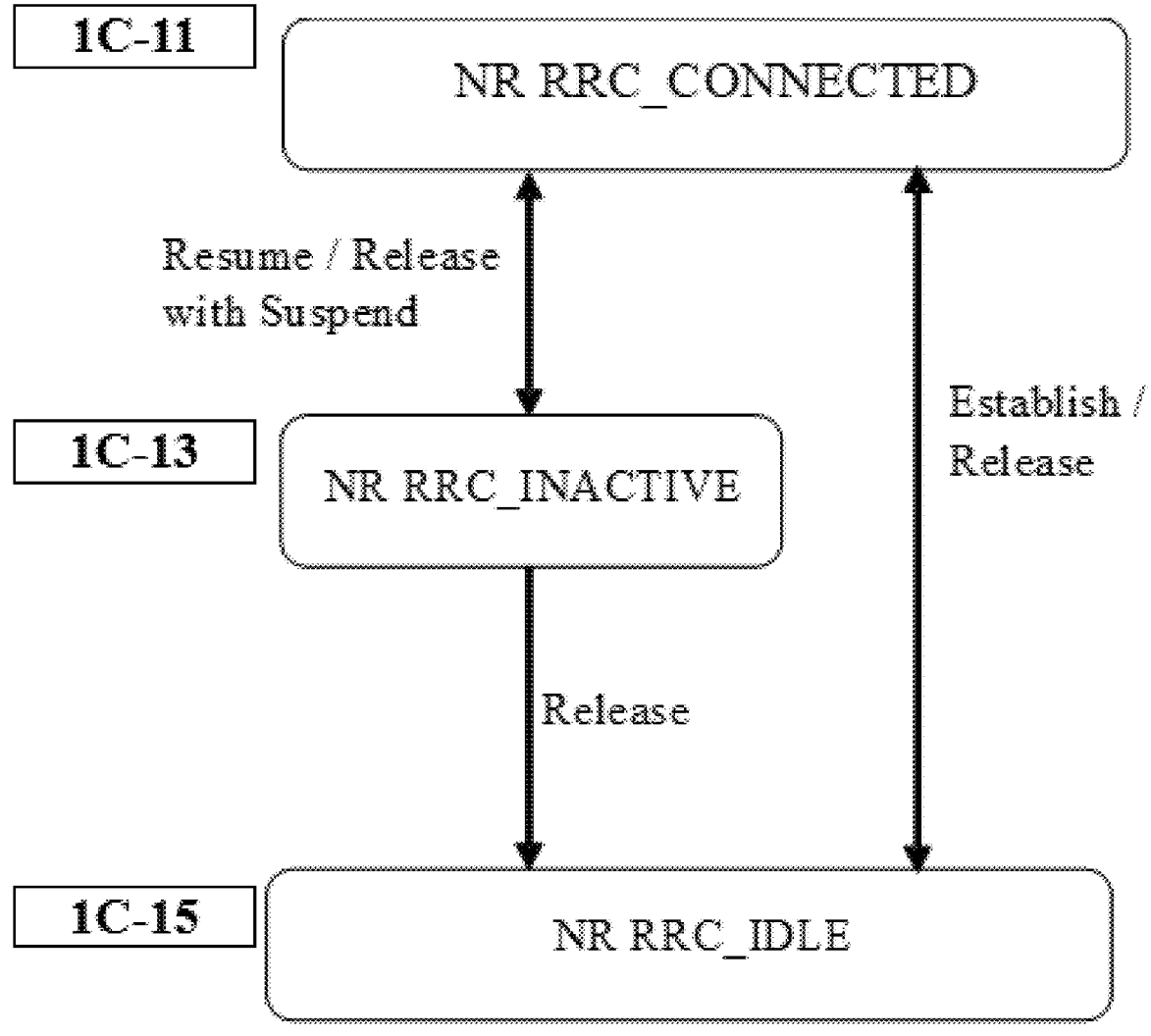
FIG. 1C is a diagram illustrating an RRC state transition.

FIG. 1C is a diagram illustrating an RRC state transition.

Between RRC_CONNECTED 1C-11 and RRC_INACTIVE 1C-13, a state transition occurs due to the exchange of the Resume message and the Release message containing the Suspend IE.

A state transition occurs between RRC_CONNECTED 1C-11 and RRC_IDLE 1C-15 through RRC connection establishment and RRC connection release.

Figure 1D:
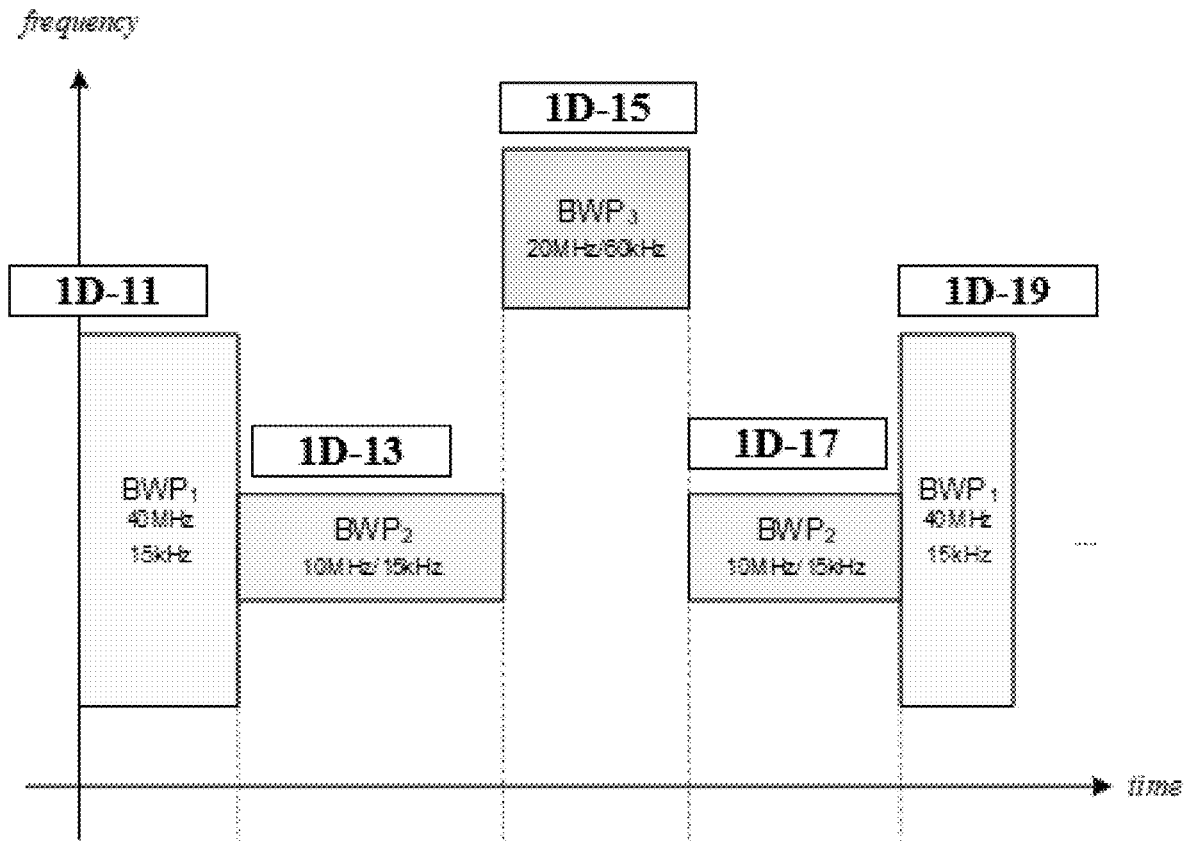
FIG. 1D is a diagram illustrating an example of a band-width part.

FIG. 1D is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell band width of a cell is referred to as a Bandwidth Part (BWP) and BA is achieved by configuring the UE with BWP(s) and telling the UE which of the configured BWPs is currently the active one. 12

FIG. 1D describes a scenario where 3 different BWPs are configured:
BWP1 with a width of 40 MHz and subcarrier spacing of 15 kHz; 1D-11 or 1D-19
BWP2 with a width of 10 MHz and subcarrier spacing of 15 kHz; 1D-13 or 1D-17
BWP3 with a width of 20 MHz and subcarrier spacing of 60 kHz. 1D-15

Figure 1E:
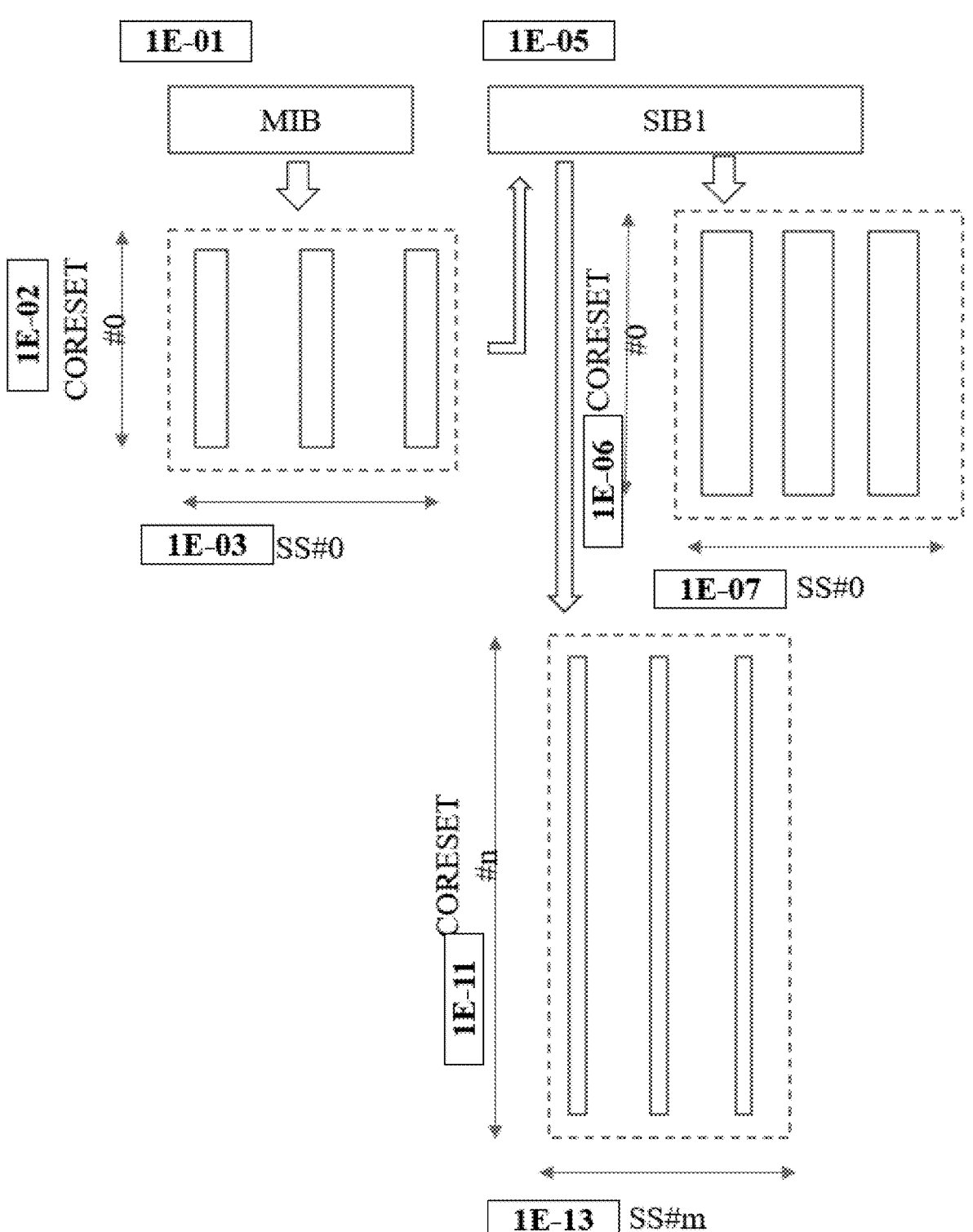
FIG. 1E is a diagram illustrating an example of a search space and a control resource set.

FIG. 1E is a diagram illustrating an example of a search space and a control resource set.

A plurality of SSs may be configured in one BWP. The UE monitors PDCCH candidates according to the SS configuration of the currently activated BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI status information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 1E-01, the UE recognizes CORESET #0 1E-02 and SS #0 1E-03 for receiving SIB1 using predetermined information included in the MIB. The UE receives SIB1 1E-05 through CORESET #0 1E-02 and SS #0 1E-03. In SIB1, information constituting CORESET #0 1E-06 and SS #0 1E-07 and information constituting another CORESET, for example, CORESET #n1E-11 and SS #m 1E-13 may be included.

The terminal receives necessary information from the base station before the terminal enters the RRC_CONNECTED state, such as SIB2 reception, paging reception, and random access response message reception by using the CORESETs and SSs configured in SIB1. CORESET #0 1E-02 configured in MIB and CORESET #0 1E-06 configured in SIB 1 may be different from each other, and the former is called a first CORESET #0 and the latter is called a second CORESET #0. SS #0 1E-03 configured in MIB and SS #0 1E-07 configured in SIB1 may be different from each other, and the former is referred to as a first SS #0 and the latter is referred to as a second SS #0. SS #0 and CORESET #0 configured for the RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

A Serving Cell may be configured with one or multiple BWPs.

UE can be configured with one or more DL BWPs and one or more UL BWPs in a serving cell. If the serving cell operates in paired spectrum (i.e., FDD band), the number of DL BWPs and the number of UL BWPs can be different. If the serving cell operates in unpaired spectrum (i.e., TDD band), the number of DL BWPs and the number of UL BWPs is same.

SIB1 includes a DownlinkConfigCommonSIB and a UplinkConfigCommonSIB and a tdd-UL-DL-ConfigurationCommon.

tdd-UL-DL-ConfigurationCommon is cell specific TDD UL/DL configuration. It c onsists of subfields such as referenceSubcarrierSpacing, pattern1, and pattern2.

referenceSubcarrierSpacing is the reference SCS used to determine the time domain boundary in the UL-DL pattern.

pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

dl-UL-TransmissionPeriodicity indicates the period of the DL-UL pattern.

nrofDownlinkSlots indicates the number of consecutive full DL slots in each DL-UL pattern.

nrofDownlinkSymbols indicates the number of consecutive DL symbols from the beginning of the slot following the last full DL slot.

nrofUplinkSlots indicates the number of consecutive full UL slots in each DL-UL pattern.

nrofUplinkSymbols indicates the number of consecutive UL symbols at the last time point of a slot preceding the first full UL slot.

slots between the last full DL slot and the first full UL slot are flexible slots. full UL slot is also called static UL slot. UL slot in this disclosure is static UL slot.

DownlinkConfigCommonSIB includes BWP-Downlink-Common IE for initial DL BWP. UplinkConfigCommonSIB includes BWP-UplinkCommon IE for initial UL BWP. BWP-id of initialDownlinkBWP is 0.

A RRCReconfiguration message includes one or more BWP-Downlink and one or more BWP-Uplink and a firstActiveDownlinkBWP-Id and a bwp-InactivityTimer and a defaultDownlinkBWP-Id and a BWP-DownlinkDedicated for the initial DL BWP.

A BWP-Downlink IE includes a bwp-Id and a BWP-DownlinkCommon and a BW P-DownlinkDedicated.

A BWP-Uplink IE includes a bwp-Id and a BWP-UplinkCommon and a BWP-UplinkDedicated.

The bwp-Id is an integer between 0 and 4. bwp-Id 0 is used only for the BWP indicated in SIB1. bwp-Id1~4 can be used for the BWPs indicated in the RRCReconfiguration message.

BWP-DownlinkCommon IE includes following information: Frequency domain location and bandwidth of this bandwidth part, subcarrier spacing to be used in this BWP, cell specific parameters for the PDCCH of this BWP, cell specific parameters for the PDSCH of this BWP.

BWP-UplinkCommon IE includes following information: Frequency domain location and bandwidth of this bandwidth part, subcarrier spacing to be used in this BWP, cell specific parameters for the PUCCH of this BWP, cell specific parameters for the PUSCH of this BWP, Configuration of cell specific random access parameters.

BWP-DownlinkDedicated is used to configure the dedicated (UE specific) parameters of a downlink BWP. It includes cell specific parameters for the PDCCH of this BWP, cell specific parameters for the PDSCH of this BWP It includes Type2GapStatus. Type2GapStatus IE is enumerated with a single value of "deactivated". Alternatively, Type2GapStatus IE is enumerated with a single value of "activated". Alternatively, Type2GapStatus IE is enumerated with two values of "deactivated" and "activated". Alternatively, Type2GapStatus IE includes an DL BWP-Id.

The BWP-UplinkDedicated is used to configure the dedicated (UE specific) parameters of an uplink BWP.

firstActiveDownlinkBWP-Id contains the ID of the DL BWP to be activated upon performing the RRC (re-)configuration.

defaultDownlinkBWP-Id is the ID of the downlink bandwidth part to be used upon expiry of the BWP inactivity timer.

bwp-InactivityTimer is the duration in ms after which the UE falls back to the default Bandwidth Part.

Figure 2A:
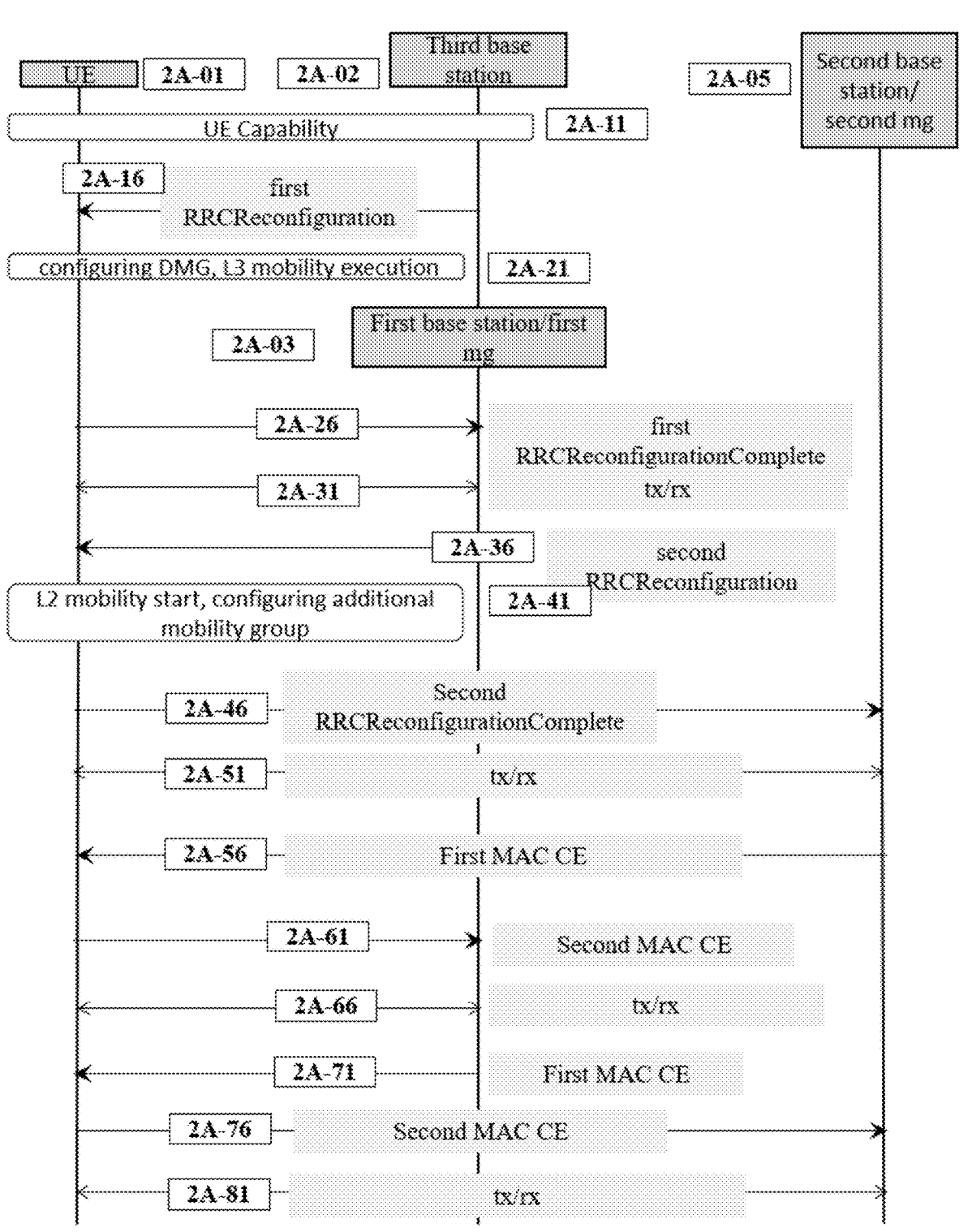
FIG. 2A is a diagram illustrating operations of a terminal and a base station according to an embodiment of the present invention.

FIG. 2A illustrates operation of UE and GNB.

The mobile communication system comprises a UE 2A-01 and a third base station 2A-02 and a first base station and a first mobility group 2A-03 and a second base station and a second mobility group 2A-05. The first mobility group is controlled by the first base station. The second mobility group is controlled by the second base station. The first mobility group and the second mobility group consist of different cells with each other. The first base station and the second base station and the third base station can be same or different.

In 2A-11, UE transmits to GNB 2A-02 UECapabilityInformation. GNB receives from UE UECapabilityInformation.

GNB 2A-02 determines the configuration to be applied to the UE based on the UE capability and other considerations such as the expected traffic for the UE and the load of cells.

At some point of time, GNB 2A-02 may decide to hand over UE from a cell to another cell.

In 2A-16, GNB 2A-02 transmits to UE a first RRCReconfiguration to command handover. UE receives from GNB 2A-02 the first RRCReconfiguration.

The first RRCReconfiguration message includes following configuration information: RadioBearerConfig, CellGroupConfig, MasterKeyUpdate.

If the first RRCReconfiguration message includes Reconfiguration WithSync and docs not include L2mobilityConfig within Reconfiguration WithSync, L3 mobility toward a new dmg is commanded. The new dmg consists of a default PCell and zero or more default SCells. The ServingCellConfig of the default PCell is included in SpCellConfig in CellGroupConfig. The ServingCellConfigCommon of the default PCell is included in Reconfiguration WithSync in SpCellConfig in CellGroupConfig. The ServingCellConfig and the ServingCellConfigCommon of a default SCell is included in SCellConfig in CellGroupConfig.

If the first RRCReconfiguration message includes Reconfiguration WithSync and L2mobilityConfig, L2 mobility between the current dmg and a new amg is commanded. The new amg consists of an additional PCell and zero or more additional SCells. The ServingCellConfig of the additional PCell is included in SpCellConfig in CellGroupConfig2. The ServingCellConfigCommon of the additional PCell is included in Reconfiguration WithSync in SpCellConfig in CellGroupConfig2. The ServingCellConfig and the Serving-CellConfigCommon of an additional SCell is included in SCellConfig in CellGroupConfig2.

Alternatively, if the first RRCReconfiguration message includes Reconfiguration WithSync, L3 mobility toward a new dmg is commanded.

If the first RRCReconfiguration message includes L2mobilityConfig, L2 mobility with a new amg is commanded.

The first RRCReconfiguration message is included in a downlink MAC PDU. UEtransmits the HARQ acknowledgement for the MAC PDU at a point of time. The point of ti me is indicated by the DCI scheduling PDSCH for the MAC PDU.

In 2A-21, UE performs L3_MOBILITY_EXECUTION_ACTIVITIES based on that the received RRCReconfiguration message includes Reconfiguration WithSync.

In 2A-26, UE transmits to GNB 2A-03 a first RRCReconfigurationComplete in a new default PCell of the new dmg. GNB receives the first RRCReconfigurationComplete from the UE via the default PCell of the dmg.

If RRCReconfigurationComplete is response to RRCReconfiguration commanding/implying L3 mobility (i.e., RRCReconfiguration including Reconfiguration With-Sync in spCellConfig of an MCG), UE performs L3_MOBILITY_COMPLETE_ACTIVITIES.

UE initiates Random Access procedure in the default PCell to transmits RRCReconfigurationComplete message via SRB1.

After successfully completing Random Access procedure, UE performs transmission/reception on the currently active mobility group. If UE is configured with a dmg, the dmg is the currently active mobility group. If UE is configured with a dmg and one or more a mg, currently active mobility group is determined based on the information included in a RRC message or a MAC CE.

In 2A-31, UE and GNB performs transmission/reception via the serving cells of the new mobility group.

If the currently active mobility group is dmg, UE performs TRANSMISSION_RECEPTION_ ACTIVITIES_ON_DMG.

At some point of time, GNB may decide to apply L2 mobility to the UE. The decision could be made based on UE capabilities (whether UE supports L2 mobility) and network capabilities (whether the source PCell and the target PCell support L2 mobility) and traffic characteristics (whether traffic requires strict QoS and radio condition).

In 2A-36, GNB 2A-03 transmits to UE a second RRCReconfiguration to configure L2 mobility. UE receives from GNB 2A-03 the second RRCReconfiguration.

The second RRCReconfiguration message includes following configuration information: CellGroupConfig2.

CellGroupConfig2 includes L2mobilityConfig and other configuration information.

If the second RRCReconfiguration message includes Reconfiguration WithSync and does not include L2mobilityConfig within Reconfiguration WithSync, L3 mobility toward a new dmg is commanded. The new dmg consists of a default PCell and zero or more default SCells. The ServingCellConfig of the default PCell is included in SpCellConfig in CellGroupConfig. The ServingCellConfig-Common of the default PCell is included in Reconfiguration WithSync in SpCellConfig in CellGroupConfig. The ServingCellConfig and the ServingCellConfigCommon of a default SCell is included in SCellConfig in CellGroupConfig.

If the second RRCReconfiguration message includes Reconfiguration WithSync and L2mobilityConfig, L2 mobility between the current dmg and a new amg is commanded. The new amg consists of an additional PCell and zero or more additional SCells. The ServingCellConfig of the additional PCell is included in SpCellConfig in Cell-GroupConfig2. The ServingCellConfigCommon of the additional PCell is included in Reconfiguration WithSync in SpCellConfig in CellGroupConfig2. The ServingCellConfig and the ServingCellConfigCommon of an additional SCell is included in SCellConfig in CellGroupConfig2.

Alternatively, if the second RRCReconfiguration message includes Reconfiguration WithSync, L3 mobility toward a new dmg is commanded.

If the second RRCReconfiguration message includes L2mobilityConfig, L2 mobility with a new amg is commanded.

The second RRCReconfiguration message is included in a downlink MAC PDU. UE transmits the HARQ acknowledgement for the MAC PDU at a point of time. The point of time is indicated by the DCI scheduling PDSCH for the MAC PDU.

In 2A-41, UE performs L2_MOBILITY_EXECUTION_ACTIVITIES based on that the received RRCReconfiguration message includes L2mobilityConfig.

In 2A-46, UE transmits to GNB 2A-05 a second RRCReconfigurationComplete in an additional PCell of the amg. GNB 2A-05 receives the second RRCReconfiguration-Complete from the UE via the additional PCell of the amg.

If RRCReconfigurationComplete is response to RRCReconfiguration configuring L2 mobility (i.e., RRCReconfiguration including L2mobilityConfig in spCell-Config of an MCG), UE performs L2_MOBILITY_COMPLETE_ACTIVITIES.

UE initiates Random Access procedure in the additional PCell to transmits RRCReconfigurationComplete message via SRB1.

Alternatively, if the RRCReconfiguration message includes L2mobilityConfig and if the L2mobilityConfig includes a randomAccessRequired, UE initiates Random Access procedure in the additional PCell.

After successfully completing Random Access procedure triggered by RRCReconfiguration configuring an amg, UE performs transmission/reception on a currently active mobility group. If the RRCReconfiguration triggering the Random Access procedure configures an amg (i.e., RRCReconfiguration including L2mobilityConfig in spCellConfig of an MCG), the currently active mobility group is the amg configured by the RRCReconfiguration.

Alternatively, if the RRCReconfiguration message includes L2mobilityConfig and if the L2mobilityConfig includes a L2mobilityExecution, UE switches the currently active mobility group to the amg after successfully completing Random Access procedure.

In 2A-51, UE and GNB 2A-05 performs transmission/reception via the serving cells of a mobility group.

If the currently active mobility group is amg, UE performs TRANSMISSION_RECEPTION_ACTIVITIES_O-N_AMG.

At some point of time, GNB may decide to switch the active mobility group from the amg to dmg.

In 2A-56, GNB 2A-05 transmits a MOBILITY_GROUP_ SWITCH_REQUEST MAC CE to the UE.

UE receives the MOBILITY_GROUP_SWITCH_RE-QUEST MAC CE by receiving PDSCH of a serving cell of the currently active mobility group (amg) in this case.

UE determines that mobility group switch (or L2 mobility) is instructed based on the received MOBILITY_GROUP_SWITCH_REQUEST MAC CE.

7 UE deactivates the currently active mobility group (in this case the currently active mobility group is amg) and activates the mobility group indicated by the MOBILITY_GROUP_SWITCH_REQUEST MAC CE.

UE deactivates the amg (i.e., UE deactivates the additional PCell and the additional SCells that was in activated state) at a second point of time and activates the dmg (i.e., UE activates the default PCell and the default SCells that are indicated in the MOBILITY_GROUP_SWITCH_RE-QUEST MAC CE) at a first point of time.

In 2A-61, when the mobility group is activated and UL grant is available, UE transmits a MOBILITY_GROUP_SWITCH_RESPONSE MAC CE to GNB 2A-03 on the PUSCH of the PCell of the activated mobility group (in this case the default PCell).

UE performs MOBILITY_GROUP_SWITCH_RESPONSE_TRANSMISSION_ACTIVITIES.

In 2A-66, UE and GNB 2A-03 performs transmission/reception via the serving cells of the currently active mobility group.

If the currently active mobility group is dmg, UE performs TRANSMISSION_RECEPTION_ACTIVITIES_ON_DMG.

At some point of time, GNB 2A-03 may decide to switch the active mobility group from the dmg to amg.

In 2A-71, GNB 2A-03 transmits a MOBILITY_GROUP_SWITCH_REQUEST MAC CE to the UE.

UE receives the MOBILITY_GROUP_SWITCH_RE-QUEST MAC CE by receiving PDSCH of a serving cell of the currently active mobility group (dmg in this case.

UE determines that mobility group switch is instructed based on the received MOBILITY_GROUP_SWITCH_RE-QUEST MAC CE.

UE deactivates the currently active mobility group (in this case the currently active mobility group is dmg) and activate the mobility group indicated by the MOBILITY_GROUP_SWITCH_REQUEST MAC CE.

UE deactivates the dmg (i.e., UE deactivates the default PCell and the default SCells that was in activated state immediately before deactivating dmg) at a second point of time and activates the amg (i.e., UE activates the additional PCell and the additional SCells that are indicated in the MOBILITY_GROUP_SWITCH_REQUEST MAC CE) at a first point of time.

In 2A-76, when the mobility group is activated and UL grant is available, UE transmits a MOBILITY_GROUP_SWITCH_RESPONSE MAC CE to GNB 2A-05 on the PUS CH of the PCell of the activated mobility group (in this case the additional PCell).

UE performs MOBILITY_GROUP_SWITCH_RESPONSE_TRANSMISSION_ACTIVITIES.

In 2A-81, UE and GNB 2A-05 performs transmission/reception via the serving cells of a mobility group.

If the currently active mobility group is amg, UE performs TRANSMISSION_RECEPTION_ACTIVITIES_ON_AMG.

At some point of time, GNB decides to change default PCell.

In 2A-86, GNB transmits a third RRCReconfiguration message to the UE.

The third RRCReconfiguration includes following information.

/A first information for PCell change: An indication that default PCell change is needed.

/A second information for PCell change: The identifier of new default PCell. The new default PCell is one of additional PCell. If there is only one additional PCell, this information is absent and the additional PCell is the new default PCell /A third information for PCell change: An indication whether the current PCell becomes new additional PCell or is released. If the indication is present, the current PCell becomes new additional PCell. If the indication is absent, the current PCell is released.

Above information may be included in a L2mobilityConfig IE.

Upon receiving the RRCReconfiguration message, UE performs DEFAULT_PCELL_CHANGE.

When UE moves into the territory of the new default PCell, the additional PCell (and amg) may be no longer sustainable.

In 2A-91, GNB transmits a fourth RRCReconfiguration to the UE.

The fourth RRCReconfiguration includes following information.

/A first information for PCell release: The identifier of additional PCell to be released.

/A second information for PCell release: List of identifiers of additional SCells to be released. This list is included if the additional PCell is not released. If the additional PCell is released, all the associated additional SCells are released together.

Above information may be included in a L2mobilityConfig IE.

Upon receiving the RRCReconfiguration message, UE performs ADDITIONAL_PCELL_RELEASE.

DEFAULT_PCELL_CHANGE are as follows. The activities are performed in order.

///START///
UE receives the third RRCReconfiguration at slot n of a serving cell of amg or of dmg.
UE transmits the acknowledgement (HARQ ACK for the MAC PDU containing the third RRCReconfiguration) at slot q.
UE considers a second serving cell is the default PCell at slot n + m.
UE considers the SCells associated with the second serving cells are default SCells at slot n + m.
UE considers a first serving cell is an additional PCell at slot n + m if the third information for PCell change is present.
UE considers the SCell associated with the first serving cell are additional SCells at slot n + m.
UE considers the first serving cell is released at slot q + p if the third information f or PCell change is not present.
UE considers the SCells associated with the first serving cell are released at slot q + p.
The second serving cell is the additional PCell if it is not indicated in the third RRCReconfiguration (if the second information for PCell change is not present).
The second serving cell is the one indicated by the third RRCReconfiguration (if the second information for PCell change is present).
The first serving cell is the default PCell when the third RRCReconfiguration is received.
m is an integer representing UE processing delay for switching.
m is varying depending on the subcarrier spacing of the DL BWP where the third RRCReconfiguration is received.

-continued p is an integer representing UE processing delay for releasing a
serving cell. p is varying depending on the subcarrier spacing
of the UL BWP where the acknowledgement for the third
RRCReconfiguration is transmitted.
    /// END ///

---

ADDITIONAL_PCELL_RELEASE are as follows.

---

///START///
    UE receives the fourth RRCReconfiguration at slot n of a serving cell of dmg.
    UE transmits the acknowledgement (HARQ ACK for the MAC
PDU containing the fourth RRCReconfiguration) at slot q.
    UE considers a third serving cell is released at slot q + p.
    UE considers the SCells associated with the third serving cells are released
at slot q + p.
    /// END ///

---

To facilitate mobility between cells with less interruption and better performance, multiple mobility groups are configured for a UE. Each of the multiple mobility groups may cover a different geographic area and connected with different DUs. UE communicates with a mobility group among the multiple mobility groups and switches back and forth among the mobility groups depending on UE's geographical location.

In this disclosure, UE operations and GNB operations are explained with two mobility groups.

A mobility group consists of one or more cells controlled by a single base station. A UE could be configured with multiple mobility groups and communicates with a single mobility group at a time.

A mobility group is either a default mobility group (hereafter dmg) or an additional mobility group (hereafter amg). A mobility group may consist of a PCell or a PSCell and zero or more SCells. A PCell/PSCell and a SCell in dmg are called default PCell/PSCell and default SCell. A PCell/PSCell and a SCell in amg are called additional PCell/PSCell and additional SCell.

Both a default mobility group and an additional mobility group are master cell group (in case of L2 PCell change or both are secondary cell group (in case of L2 SCG change.
    dmg is default MCG. amg is additional MCG.
    dmg is default SCG. amg is additional SCG.

The default PCell and the additional PCell are configured in the same center frequency (i.e., absoluteFrequencySSB in FrequencyInfoDL in ServingCellConfigCommon of the default PCell and absoluteFrequencySSB in FrequencyInfoDL in ServingCellConfigCommon of the additional PCell are same).

The default PCell and the additional PCell are assigned with a same ServCellIndex which is zero.

The default PSCell and the additional PSCell are configured in the same center frequency (i.e., absoluteFrequencySSB in FrequencyInfoDL in ServingCellConfigCommon of the default PSCell and absoluteFrequencySSB in FrequencyInfoDL in ServingCellConfig Common of the additional PSCell are same).

The default PSCell and the additional PSCell are assigned with a same ServCellIndex. The base station ensures that the same ServCellIndex is allocated to the default PSCell and the additional PSCell.

A default SCell with the ServCellIndex n and an additional SCell with the ServCellIndex n are configured in the same center frequency (i.e., absoluteFrequencySSB in FrequencyInfoDL in ServingCellConfigCommon of the default SCell n and absoluteFrequencySSB in FrequencyInfoDL in ServingCellConfigCommon of the additional SCell n are same).

A default SCell and an additional SCell configured with the same absoluteFrequencySSB are assigned with a same ServCellIndex. The base station ensure that the same Serv-CellIndex is allocated to the default SCell and the additional SCell having the same absolute FrequencySSB.

At any point of time, at least one PCell between the default PCell and the additional PCell is in activated state (i.e., at least one serving cell with servCellIndex 0 is activated in any time).

At any point of time, at most one SCell with servCellIndex n between the default SCell with servCellIndex n and the additional SCell with servCellIndex n is in activated state. All SCells with servCellIndex n can be in deactivated state.

The default PCell is the PCell when RRCReconfiguration configuring L2 mobility (RRCReconfiguration including L2mobilityConfig is received).

The additional PCell is the PCell added by RRCReconfiguration configuring L2 mobility.

In L3 mobility (also called handover), RRCReconfiguration message with Reconfiguration WithSync IE is used to configure the target configuration after L3 mobility and to initiate the L3 mobility.

In L2 mobility, RRCReconfiguration message with Reconfiguration WithSync IE and with L2MobilityInd IE is used to configure the target configuration during L2 mobility and to command the initial L2 mobility. In L2 mobility, a MAC CE is used to command L2 mobility between mobility groups.

During the L3 mobility, L1 (i.e., transceiver) switches from a group of cells to another group of cells, MAC entity resets, RLC entities are reestablished, PDCP entities are reestablished, security keys are updated.

During the L2 mobility, L1 switches repeatedly between a group of cells and another group of cells. MAC and RLC and PDCP continue the operation. The same security key s are used.

L2 mobility from dmg to amg triggered by RRCReconfiguration message is performed with Random Access procedure in the additional PCell.

L2 mobility from amg to dmg triggered by MAC CE is performed with or without Random Access procedure in accordance with a 1 bit indication in the MAC CE.

L2 mobility from dmg to amg triggered by MAC CE is performed with or without Random Access procedure in accordance with a 1 bit indication in the MAC CE.

In L3 mobility, the security key used for the PDCP packets exchanged in the target PCell is derived from PCI of the target PCell.

In L2 mobility, the security key used for the PDCP packets exchanged in an additional PCell is derived from PCI of the default PCell.

L3_MOBILITY_EXECUTION_ACTIVITIES are as follows. The activities are performed in order.

---

///START///
UE starts T304 for the target default PCell with the timer value set to t304 as included in the ReconfigurationWithSync.
UE starts synchronising to the DL of the target default PCell.
If the frequencyInfoDL is included in the ReconfigurationWithSync, the target default PCell is on the SSB frequency indicated by the frequencyInfoDL with a physical cell identity indicated by the physCellId.
If the frequencyInfoDL is not included in the ReconfigurationWithSync, the target default PCell is on the SSB frequency of the source default PCell with a physical cell identity indicated by the physCellId.
UE resets the MAC entity of dmg. The MAC entity of dmg is called default MAC entity.
UE applies the value of the newUE-Identity as the C-RNTI for dmg.
UE configures lower layers for the target default PCell in accordance with the received spCellConfigCommon in ReconfigurationWithSync in CellGroupConfig.
UE reconfigures the RLC entity or entities in accordance with the received rlc-Config in RLC-BearerConfig in CellGroupConfig.
UE reconfigures the logical channel in accordance with the received mac-LogicalChannelConfig in CellGroupConfig
UE reconfigures the MAC main configuration of the cell group in accordance with the received mac-CellGroupConfig in CellGroupConfig.
UE configures the default SCells in accordance with the received SCellConfigCommon field (comprising ServingCellConfigCommon) and SCellConfigDedicated field (comprising ServingCellConfig) that are included in CellGroupConfig.
UE derives or updates the GNB_Security_Key in accordance with the received MasterKeyUpdate.
If keySetChangeIndicator is set to true, UE derives or updates the GNB_Security_Key based on AMF_Security_Key.
If keySetChangeIndicator is not set to true, UE derives or updates the GNB_Security_Key based on the current GNB_Security_Key or the NH (Next HOP), using the nextHopChainingCount.
UE applies the security keys derived from the GNB_Security_Key to PDCP entities.
UE reestablishes a PDCP entity if reestabilishPDCP is set.
UE reconfigure the PDCP entity in accordance with the received pdcp-Config.
///END///

---

L3_MOBILITY_COMPLETE_ACTIVITIES are as follows. The activities are performed in order.

---

///START///
If the UE was configured with successHO-Config when connected to the source default PCell, UE store the successful handover information in VarSuccessHO-Report upon successfully completing the Random Access procedure triggered for the ReconfigurationWithSync in spCellConfig of the MCG.
If the UE has successful handover information available in VarSuccessHO-Report and if the RPLMN is included in plmn-IdentityList stored in VarSuccessHO-Report, UE includes successHO-InfoAvailable in the RRCReconfigurationComplete message.
UE includes successL2mobility-InfoAvailable in the RRCReconfigurationComplete message, if the UE has successful L2 mobility information available in VarSuccessL2mobility-Report and if the RPLMN is included in plmn-IndentityList stored in VarSuccessL2mobility-Report.
///END///

---

L2_MOBILITY_EXECUTION_ACTIVITIES are as follows. The activities are performed in order.

---

///START///
UE starts T3041 for the additional PCell with the timer value set to t3041 as included in the L2mobilityConfig.
UE starts synchronising to the DL of the additional PCell.
If the frequencyInfoDL is included in the L2mobilityConfig, the additional PCell is on the SSB frequency indicated by the frequencyInfoDL with a physical cell identity indicated by the physCellId.
If the frequencyInfoDL is not included in the L2mobilityConfig, the additional PCell is on the SSB frequency of the default PCell with a physical cell identity indicated by the physCellId.
If the newUE-Identity is included in L2mobilityConfig, UE applies the value of the newUE-Identity as the C-RNTI for amg (or additional PCell).

-continued

```
    If the newUE-Identity is not included in L2mobilityConfig, UE applies
C-RNTI of the default PCell (or 을 ) as the C-RNTI for amg
(or additional PCell).
    UE configures lower layers for the additional PCell in accordance with the
received spCellConfigCommon in L2mobilityConfig in CellGroupConfig2.
    UE creates an additional MAC entity with the same configuration as the
default MAC entity (same configuration as the mac-CellGroupConfig
included in the CellGroupConfig in the first RRCReconfiguration) and
reconfigure the MAC main configuration for the additional MAC entity
in accordance with the received mac-CellGroupConfig in the
CellGroupConfig2 in the second RRCReconfiguration.
    UE establishes, for each radio bearer, an additional RLC entity for the
radio bearer with the same configuration as the default RLC entity
(same configuration as the rlc-BearerConfig in CellGroupConfig in the
first RRCReconfiguration) and reconfigures the additional RLC entity
in accordance with the received RLC-BearerConfig in CellGroupConfig2
in the second RRCReconfiguration.
    UE establishes an additional logical channel with the same configuration
as the default logical channel and reconfigures the additional logical
channel in accordance with the received MAC-LogicalChannelConfig
in CellGroupConfig2 in the second RRCReconfiguration.
    UE configures the additional SCells in accordance with the received
SCellConfigCommon field (comprising ServingCellConfigCommon and
SCellConfigDedicated field (comprising ServingCellConfig that are
included in CellGroupConfig2 in the second RRCReconfiguration.
    ///END///
```

L2_MOBILITY_COMPLETE_ACTIVITIES are as follows. The activities are performed in order.

```
    ///START///
    If the UE was configured with successL2mobility-Config when
connected to the source default PCell, UE store the successful L2
mobility information in VarSuccessL2mobility-Report upon successfully
completing the Random Access procedure triggered for the
L2mobilityConfig in spCellConfig of the MCG.
    UE includes successL2mobility-InfoAvailable in the
RRCReconfigurationComplete message, if the UE has successful L2
mobility information available in VarSuccessL2mobility-Report and if
the RPLMN is included in plmn-IdentityList stored in VarSuccessL2mobility-
Report.
    UE includes successHO-InfoAvailable in the RRCReconfigurationComplete
message, if the UE has successful handover information available in
VarSuccessHO-Report and if the RPLMN is included in plmn-IdentityList
in VarSuccessHO-Report.
    ///END///
```

The UE variable VarSuccessHO-Report includes the successful handover information. VarSuccessHO-Report comprises successHO-Report and plmn-IdentityList.

successHO-Report comprises following information: c-RNTI (the C-RNTI assigned by the target PCell of the handover for which the successful HO report was generated), shr-Cause (the cause of the successful HO report), upInterruptionTimeAtHO (the time elapsed between the time of arrival of the last PDCP PDU received from the source cell and the time of arrival of the first non-duplicate PDCP PDU received from the target cell), MeasResultSuccessHONR for source PCell (Cell level measuremnt results on SS/PBCH of the source PCell), MeasResultSuccessHONR for target PCell (Cell level measurement results on SS /PBCH of the target PCell).

plmn-IdentityList contains the list of EPLMN(Equivalent PLMNs) stored by the UE. The list of EPLMNs is provided by AMF during registration procedure. UE can perform PLMN reselection across EPLMNs without informing the AMF.

The UE variable VarSuccessL2mobility-Report includes the successful L2 mobility information. VarSuccessL2mobility-Report comprises one or more successL2mobility-Report.

successL2mobility-Report comprises following information: default c-RNTI, additional c-RNTI, timestamp (SFN and subframe number corresponding to the time point when L2 mobility is triggered), direction (indicating whether from dmg to amg or vice versa), up Interruption TimeAtL2mobility (the time elapsed between the time of arrival of the last PD CP PDU received from the source cell and the time of arrival of the first non-duplicate PD CP PDU received from the target cell), MeasResultSuccessL2mobilityNR for source PCell (beam level measuremnt results on SS/PBCH of the source PCell), MeasResultSuccessL2mobilityNR for target PCell (beam level measurement results on SS/PBCH of the target PCell).

TRANSMISSION_RECEPTION_ACTIVITIES_ON_ DMG are as follows. The activities are performed continuously.

///START///

For reception of paging message, UE monitors a paging channel of the default PCell. UE monitors PDCCH of the default PCell for the P-RNTI, P-RNTI has a fixed value.

If a PCH assignment has been received on the PDCCH of the default PCell for the P-RNTI, UE attempts to decode the TB on the PCH as indicated by the PDCCH information. If the TB on the PCH has been successfully decoded, the decoded MAC PDU is delivered to upper layers (i.e., RRC sublayer).

PCH is associated with PDCCH and PDSCH.

UE acquires system information in the default PCell. UE monitors PDCCH of the default PCell for the SI-RNTI. If downlink assignment has been received on the PDCCH of the default PCell for the SI-RNTI, UE attempts to decode the TB on DL-SCH as indicated by the PDCCH information. If the TB on the DL-SCH has been successfully decoded, the decoded MAC PDU is delivered to upper layers (i.e., RRC sublayer). SI-RNTI has a fixed value different from P-RNTI.

DL-SCH is associated with PDCCH and PDSCH.

For reception of Short Message, UE monitors PDCCH of the default PCell for the P-RNTI.

If DCI format 1_0 is received in the PDCCH for the P-RNTI, UE performs followings.

If bit 1 (most significant bit) is set to 1, UE determines BCCH modification other than SIB6, SIB7 and SIB8 occurs for the default PCell. UE acquires the SIB1 of the default PCell. UE acquires the SIBs that are included in the si-SchedulingInfo and that UE needs to acquire. UE determines whether UE needs to acquire a SIB based on valueTag associated with the SIB.

If bit 2 is set to 1, UE determines ETWS primary notification and/or an ETWS secondary notification and/or a CMAS notification is indicated. UE immediately re-acquire the SIB1 of the default PCell. UE acquires SIB6 of the default PCell. UE acquires SIB6 of the default PCell immediately if si-SchedulingInfo (in the SIB1) includes scheduling information for SIB6. UE acquires SIB7 of the default PCell immediately if si-SchedulingInfo (in the SIB1) includes scheduling information for SIB7. UE acquires SIB8 of the default PCell immediately if si-SchedulingInfo (in the SIB1) includes scheduling information for SIB8.

For transfer of DTCH/DCCH user information, UE monitors PDCCH of the default PCell and default SCells for C-RNTI of dmg.

TCI state of the PDCCH of the default PCell is indicated among TCI states configured in one or more PDSCH-config in ServingCellConfig of the default PCell.

TCI state of the PDCCH of the default SCell is indicated among TCI states configured in one or more PDSCH-config in ServingCellConfig of the default SCell.

For transfer of DTCH/DCCH user information, UE receives PDSCH of the default PCell or default SCell as indicated by the PDCCH information containing downlink assignment addressed by C-RNTI of dmg.

For transfer of DTCH/DCCH user information, UE transmits PUSCH of the default PCell or default SCell as indicated by the PDCCH information containing uplink grant addressed by C-RNTI.

UE transmits CSI on PUCCH of the default PCell as configured by CSI-MeasConfig included in ServingCellConfig of the default PCell.

UE transmits SRS on the active uplink BWP of the default PCell as configured by SRS-config of the uplink BWP of the default PCell.

The spatial relation between a reference RS and the SRS is indicated by one or more TCI state among TCI states configured in one or more PDSCH-config in ServingCellConfig of the default PCell.

UE transmits SRS on the active uplink BWP of the default SCell as configured by SRS-config of the uplink BWP of the default SCell.

The spatial relation between a reference RS and the SRS is indicated by one or more TCI state among TCI states configured in one or more PDSCH-config in SevingCellConfig of the default SCell.

For transmission power control of PUSCH of default PCell and default SCells, UE monitors PDCCH of the default PCell for type-PUSCH-RNTI of dmg (i.e., tpc-PUSCH-RNTI in PhysicalCellGroupConfig in CellGroupConfig in CellGroupConfig in the first RRCReconfiguration). UE determines PUSCH TPC commands on DCI addressed by tpc-PUSCH-RNTI of dmg and applies the command for PUSCH transmission on default PCells and on default SCells.

For transmission power control of PUCCH of default PCell, UE monitors PDCCH of the default PCell for tpc-PUCCH-RNTI of dmg (i.e., tpc-PUCCH-RNTI in Physical-Cell GroupConfig in CellGroupConfig in the first RRCReconfiguration). UE determines PUCCH TPC commands on DCI addressed by tpc-PUCCH-RNTI of dmg and applies the command for PUCCH transmission on default PCell.

UE determines the maximum transmission power for PUSCH and the maximum transmission power for PUCCH and the maximum transmission power of SRS in the serving cells of dmg based on p-NR-FR1 of dmg (i.e., p-NR-FR1 in PhysicalCellGroupConfig in CellGroupConfig in the first RRCReconfiguration) and on p-UE-FR1 of dmg (i.e., p-UE-FR 1 in PhysicalCellGroupConfig in CellGroupConfig in the first RRCReconfiguration).

For transmission power control of SRS of default PCell, UE monitors PDCCH of the default PCell for tpc-SRS-RNTI of dmg (i.e., tpc-SRS-RNTI in PhysicalCellGroup-Config in CellGroupConfig in the first RRCReconfiguration). UE determines SRS TPC commands for the default PCell on DCI addressed by tpc-SRS-RNTI of dmg and applies the command for SRS transmission on default PCell.

For transmission power control of SRS of a default SCell, UE monitors PDCCH of the default SCell for tpc-SRS-RNTI of dmg (i.e., tpc-SRS-RNTI in PhysicalCellGroup-Config in CellGroupConfig in the first RRCReconfiguration). UE determines SRS TPC commands for the default SCell on DCI addressed by tpc-SRS-RNTI of dmg and applies the command for SRS transmission on the default SCell.

TRANSMISSION_RECEPTION_ACTIVITIES_O-N_AMG are as follows. The activities are performed continuously.

///START///

If the currently active mobility group is amg, UE does not receive paging message and does not monitor paging channel. UE monitor PDCCH of the additional PCell for P-RNTI for Short Message reception but UE does not receive PDSCH for paging message reception.

If the currently active mobility group is amg, UE does not acquire system information other than SIB6 and SIB7 and SIB8.

For reception of Short Message, UE monitors PDCCH of the additional PCell for the P-RNTI.

If DCI format 1_0 is received in the PDCCH of the additional PCell for the P-RNTI, UE performs followings.

If bit 1 (most significant bit) is set to 1, UE determines BCCH modification other than SIB6, SIB7 and SIB8 occurs for the additional PCell. UE does not react on bit 1 being set to 1.

If bit 2 is set to 1, UE determines ETWS primary notification and/or an ETWS secondary notification and/or a CMAS notification is indicated. UE switches to dmg (i.e., UE deactivate the amg and activate the dmg) and immediately re-acquire the SIB1 of the default PCell. UE acquires SIB6 of the default PCell immediately if si-SchedulingInfo (in the SIB1) includes scheduling information for SIB6. UE acquires SIB7 of the default PCell immediately if si-SchedulingInfo (in the SIB1) includes scheduling information for SIB7. UE acquires SIB8 of the default PCell immediately if si-SchedulingInfo (in the SIB1) includes scheduling information for SIB8.

Alternatively, if bit 2 is set to 1, UE immediately re-acquire the SIB1 of the additional PCell. UE acquires SIB6 of the additional PCell immediately if si-SchedulingInfo (in the SIB1) includes scheduling information for SIB6. UE acquires SIB7 of the additional PCell immediately if si-SchedulingInfo (in the SIB1 includes scheduling information for SIB7. UE acquires SIB8 of the additional PCell immediately if si-SchedulingInfo (in the SIB1) includes scheduling information for SIB8.

For transfer of DTCH/DCCH user information, UE monitors PDCCH of the additional PCell and additional SCells.

TCI state of the PDCCH of the additional PCell is indicated among TCI states configured in one or more PDSCH-config in ServingCellConfig of the additional PCell.

TCI state of the PDCCH of the additional SCell is indicated among TCI states configured in one or more PDSCH-config in ServingCellConfig of the additional SCell.

For transfer of DTCH/DCCH user information, UE receives PDSCH of the additional PCell or additional SCell as indicated by the PDCCH information containing downlink assignment addressed by a second C-RNTI.

For transfer of DTCH/DCCH user information, UE transmits PUSCH of the additional PCell or additional SCell as indicated by the PDCCH information containing uplink grant addressed by a C-RNTI of amg.

The C-RNTI of amg is the value of the newUE-Identity in L2mobilityConfig (if newUE-Identity is included in L2mobilityConfig) or the C-RNTI of dmg (if newUE-Identity is not included in L2mobilityConfig).

Same C-RNTI is used for dmg and amg if C-RNTI is not configured for amg.

Different C-RNTI are used for dmg and amg respectively if C-RNTI is configured for amg in L2mobilityConfig.

UE transmits CSI on PUCCH of the additional PCell as configured by CSI-MeasConfig included in ServingCell-Config of the additional PCell (i.e., ServingCellConfig in L2 mobilityConfig in CellGroupConfig2).

UE transmits SRS on the active uplink BWP of the additional PCell as configured by SRS-config of the uplink BWP of the additional PCell (i.e., SRS-config in Serving-CellConfig in L2mobilityConfig in CellGroupConfig2).

The spatial relation between a reference RS and the SRS is indicated by one or more TCI state among TCI states configured in one or more PDSCH-config in ServingCell-Config of the additional PCell.

UE transmits SRS on the active uplink BWP of the additional SCell as configured by SRS-config of the uplink BWP of the additional SCell (i.e., SRS-config in Serving-CellConfig in SCellConfig in CellGroupConfig2).

The spatial relation between a reference RS and the SRS is indicated by one or more TCI state among TCI states configured in one or more PDSCH-config in ServingCell-Config of the additional SCell.

For transmission power control of PUSCH of additional PCell and additional SCells, UE monitors PDCCH of the additional PCell for tpc-PUSCH-RNTI of amg (i.e., tpc-PUSCH-RNTI in PhysicalCellGroupConfig in CellGroupConfig2 in the second RRCReconfiguration). UE determines PUSCH TPC commands on DCI addressed by tpc-PUSCH-RNTI of amg and applies the command for PUSCH transmission on additional PCell and on additional SCells.

For transmission power control of PUCCH of additional PCell, UE monitors PDC CH of the additional PCell for tpc-PUCCH-RNTI of amg (i.e., tpc-PUCCH-RNTI in PhysicalCellGroupConfig in CellGroupConfig2 in the second RRCReconfiguration). UE determines PUCCH TPC commands on DCI addressed by tpc-PUCCH-RNTI of amg and applies the command for PUCCH transmission on additional PCell.

UE determines the maximum transmission power for PUSCH and the maximum transmission power for PUCCH and the maximum transmission power of SRS based on p-NR-FR1 of amg (i.e., p-NR-FR1 in PhysicalCellGroup-Config in CellGroupConfig2 in the second RRCReconfiguration) and on p-UE-FR1 of amg (i.e., p-UE-FR1 in PhysicalCellGroupConfig in CellGroupConfig2 in the second RRCReconfiguration).

For transmission power control of SRS of additional PCell, UE monitors PDCCH of the additional PCell for tpc-SRS-RNTI of amg (i.e., tpc-SRS-RNTI in PhysicalCell-Group Config in CellGroupConfig2 in the second RRCReconfiguration). UE determines SRS TPC commands for the additional PCell on DCI addressed by tpc-SRS-RNTI of amg and applies the command for SRS transmission on additional PCell.

MOBILITY_GROUP_SWITCH_RESPONSE_TRANS-MISSION_ACTIVITIES are as follows. The activities are performed in order.

///START///

UE triggers a MOBILITY_GROUP_SWITCH_RESPONSE MAC CE at third point of time.

If UL-SCH resources are available for a new transmission in an active UL BWP of an activated serving cell of the activated mobility group and if the UL-SCH resources can accommodate the MOBILITY_GROUP_SWITCH_RESPONSE MAC CE plus its subheader, UE generates the MOBILITY_GROUP_SWITCH_RESPONSE MAC CE.

If UL-SCH resources are available for a new transmission in an active UL BWP of an activated serving cell of the activated mobility group and if the UL-SCH resources cannot accommodate the MOBILITY_GROUP_SWITCH_RESPONSE MAC CE plus its subheader and can accommodate the TRUNCATED_MOBILITY_GROUP_SWITCH_RESPONSE MAC CE plus its subheader, UE generates the TRUNCATED_MOBILITY_GROUP_SWITCH_RESPONSE MAC CE.

If UL-SCH resources are available for a new transmission in an active UL BWP of an activated serving cell of the activated mobility group and if the UL-SCH resources cannot accommodate the TRUNCATED_MOBILITY_GROUP_SWITCH_RESPONSE MAC CE plus its subheader, UE trigger SR in the activated PCell of the activated mobility group.

If UL-SCH resources are not available for a new transmission in any of the active UL BWP of the activated serving cell of the activated mobility group, UE triggers SR in the activated PCell of the activated mobility group.

If a MAC PDU is transmitted and this PDU includes a TRUNCATED_MOBILITY_GROUP_SWITCH_RESPONSE MAC CE or MOBILITY_GROUP_SWITCH_RESPONSE MAC CE, UE cancel the pending SR and stop the corresponding sr-ProhibitTimer.

If no valid PUCCH resource is configured for the SR on the active UL BWP of the activated PCell of the activated mobility group, UE initiate a Random Access procedure on the activated PCell.

If valid PUCCH resource is configured for the SR on the active UL BWP of the activated PCell of the activated mobility group, UE performs following actions when UE has an SR transmission occasion on the valid PUCCH resource for SR configured.

If SR_COUNTER is smaller than sr-TransMax, UE signal SR on one valid PUCCH resource for SR and increments SR_COUNTER by 1 and starts the sr-ProhibitTimer.

UE triggers BSR and PHR for the MAC entity associated with the activated mobility group at fourth point of time.

UE transmits the BSR and PHR in an active UL BWP of an active serving cell of the activated mobility group. If the activated mobility group is deactivated before the transmission of BSR and/or of PHR, the triggered BSR and/or PHR are cancelled when the mobility group is deactivated.

If more than one SR configuration is configured, UE performs followings.

If at least one MOBILITY_GROUP_SWITCH_RESPONSE MAC CE is triggered, UE cancel the already triggered MOBILITY_GROUP_SWITCH_RESPONSE MAC CE message, if any, and triggers new MOBILITY_GROUP_SWITCH_RESPONSE MAC CE message.

If MOBILITY_GROUP_SWITCH_RESPONSE MAC CE message has been triggered, and not cancelled and if UL-SCH resources are available for a new transmission and these UL-SCH resources can accommodate the MOBILITY_GROUP_SWITCH_RESPONSE MAC CE message plus its subheader as a result of logical channel prioritization, UE cancel triggered MOBILITY_GROUP_SWITCH_RESPONSE MAC CE message and generates the MOBILITY_GROUP_SWITCH_RESPONSE MAC CE message.

If MOBILITY_GROUP_SWITCH_RESPONSE MAC CE message has been triggered, and not cancelled and if UL-SCH resources are not available for a new transmission, UE triggers a Scheduling Request for MOBILITY_GROUP_SWITCH_RESPONSE MAC CE message without triggering BSR.

UE applies a first SR configuration to the scheduling request procedure triggered for MOBILITY_GROUP_SWITCH_RESPONSE MAC CE message.

UE is configured with one or more SR configurations. The first SR configuration is selected from the one or more SR configurations implicitly or explicitly. UE performs scheduling_request_procedure_for_scheduling_request_procedure_for_MOBILITY_GROUP_SWITCH_RESPONSE.

The first point of time is after the MOBILITY_GROUP_SWITCH_REQUEST MAC CE reception and before n1 slot1s elapsed since the reception of the MAC CE. Alternatively, the first point of time is after HARQ feedback transmission for the MOBILITY_GROUP_SWITCH_REQUEST MAC CE starts and before n2 slot3s elapsed since the end of the HARQ feedback transmission.

Upon receiving the MOBILITY_GROUP_SWITCH_REQUEST MAC CE in slot x, the UE shall be able to receive PDCCH with target TCI state (as indicated by TCI state ID of the serving cell (as indicated by Serving Cell ID at the first slot that is after slot $x+T\_HARQ+(n3+n4)*slot\_number\_subframe$.

Upon receiving the MOBILITY_GROUP_SWITCH_REQUEST MAC CE in slot x, the UE shall be able to transmit PUCCH/CSI with target TCI state (as indicated by TCI state ID) of the serving cell (as indicated by Serving Cell ID) at the first PUCCH occasion that is after $x+T\_HARQ+(n3+n5)*slot\_number\_subframe$.

Upon receiving the MOBILITY_GROUP_SWITCH_REQUEST MAC CE in slot x, the UE shall be able to transmit SRS with target TCI state (as indicated by TCI state ID) of the serving cell (as indicated by Serving Cell ID) at the first SRS occasion that is after slot $x+T\_HARQ+(n3+n4)*slot\_number\_subframe$.

The target TCI state is indicated in the MOBILITY_GROUP_SWITCH_REQUEST MAC CE.

T_HARQ is the timing between DL data transmission and acknowledgement. T_HARQ is the number of slots between PDSCH carrying (or MAC PDU including the MOBILITY_GROUP_SWITCH_REQUEST MAC CE) and HARQ acknowledgement for the PDSCH (or the MAC PDU).

slot_number_subframe is the number of slots per subframe in the BWP of the serving cell. n3 is a constant representing the UE requirement on TCI state change. n4 (T_first-SSB) is a variable representing the variable time until the first SSB is available. n4 is determined based on the time to first SSB transmission after the MAC CE is decoded by the UE. n5 is a variable representing the variable time until the first PUCCH occasion after the first SSB is available.

Upon receiving the MOBILITY_GROUP_SWITCH_REQUEST MAC CE in slot x, the UE shall be able to perform uplink transmission and downlink reception in the serving cells indicated in the MAC CE after (n3+n4) ms elapsed since the end of the HARQ feed back transmission for the MOBILITY_GROUP_SWITCH_REQUEST MAC CE.

The second point of time is after the MOBILITY_GROUP_SWITCH_REQUEST MAC CE reception and before m1 slots elapsed since the reception of the MAC CE. Alter natively, the second point of time is after HARQ feedback transmission for the MOBILITY_GROUP_SWITCH_REQUEST MAC CE starts and before m2 slot3s elapsed since the end of the HARQ feedback transmission.

Upon receiving the MOBILITY_GROUP_SWITCH_RE-QUEST MAC CE in slot x, the UE shall continue to receive PDCCH with old TCI state until slot x+T_HARQ+ n3*slot_number_subframe and stop at slot x+T_HARQ+ n3*slot_number_subframe.

Upon receiving the MOBILITY_GROUP_SWITCH_RE-QUEST MAC CE in slot x, the UE shall be able to transmit PUCCH/CSI with old TCI state until slot x+T_ HARQ +n3*slot_number_subframe and stop at slot x+T_HARQ+n3*slot_number_subframe.

Upon receiving the MOBILITY_GROUP_SWITCH_RE-QUEST MAC CE in slot x, the UE shall be able to transmit SRS with old TCI state until slot x+T_HARQ+ n3*slot_number_subframe and stop at slot x+T_HARQ+ n3*slot_number_subframe.

Upon receiving the MOBILITY_GROUP_SWITCH_RE-QUEST MAC CE in slot x, the UE shall stop uplink transmission and downlink reception when n3 ms is elapsed since the end of the HARQ feedback transmission for the MOBILITY_GROUP_SWITCH_REQUEST MAC CE.

The third point of time is after the second point of time and before k1 slot2s elapsed since the second point of time. Alternatively, the third point of time is after HARQ feedback transmission for the MOBILITY_GROUP_SWITCH_RE-QUEST MAC CE starts and before k2 slot3s elapsed since the end of the HARQ feedback transmission.

The fourth point of time is after the third point of time and before h1 slot2s elapsed since the second point of time. Alternatively, the fourth point of time is after HARQ feedback transmission for the MOBILITY_GROUP_ SWITCH_REQUEST MAC CE starts and before h2 slot3s elapsed since the end of the HARQ feedback transmission.

Following relations hold.

$$n1 = < m1$$

$$n2 = < m2 = < k2 = < h2$$

slot1 is the slot of the DL BWP where MOBILITY_GROUP_SWITCH_REQUEST MAC CE is received. The length of the slot1 is determined by SCS of the DL BWP.

slot2 is the slot of the DL BWP of the default PCell or the additional PCell. The length of the slot2 is determined by SCS of the DL BWP.

slot3 is the slot of the UL BWP where the HARQ feedback for MOBILITY_GROUP_SWITCH_REQUEST MAC CE is transmitted. The length of the slot3 is deter-mined by SCS of the DL BWP.

The priority of logical channels and MAC CEs are as following order (highest priority listed first).

C-RNTI MAC CE or data from UL-CCCH;

MOBILITY_GROUP_SWITCH_RESPONSE MAC CE or TRUNCATED_MOBILITY_GROUP_ SWITCH_RESPONSE MAC CE;

Configured Grant Confirmation MAC CE or MAC CEs for BFR or Multiple Entry Configured Grant Confir-mation MAC CE;

LBT failure MAC CE;

MAC CE for Timing Advance Report;

MAC CE for BSR, with exception of BSR included for padding;

Single Entry PHR MAC CE or Multiple Entry PHR MAC CE;

data from any Logical Channel (including RRCRecon-figurationComplete, except data from UL-CCCH;

MAC CE for Recommended bit rate query;

MAC CE for BSR included for padding;

UECapabilityInformation includes following L3 mobility related capability information and L2 mobility related capability information.

L2mobilityIntraF indicates whether the UE supports intra-frequency L2 mobility. The intra-frequency L2 mobil-ity refers to the case where the centre frequency of a default PCell and a centre frequency of an additional PCell are same.

handoverFDD-TDD indicates whether the UE supports HO (L3 mobility) between FDD and TDD. It is mandated if the UE supports both FDD and TDD.

L2mobilityFDD-TDD indicates whether the UE supports L2 mobility between FDD and TDD. This parameter can only be set if handoverFDD-TDD is supported and if L2mobility IntraF is supported. L2 mobility between FDD and TDD refers to the case where one of a default PCell and an additional PCell is FDD and the other is TDD.

handoverFR1-FR2 indicates whether the UE supports HO between FR1 and FR2-1. Support is mandatory for the UE supporting both FR1 and FR2-1.

L2mobilityFR1-FR2 indicates whether the UE supports L2 mobility between FR1 and FR2-1. This parameter can only be set if handoverFR1-FR2 is supported and if L2mobilityIntraF is supported. L2 mobility between FR1 and FR2-1 refers to the case where one of a default PCell and an additional PCell is FR1 and the other is FR2-1.

handoverFR1-FR2-2 indicates whether the UE supports HO between FR1 and FR2 22-2.

L2mobilityFR1-FR2-2 indicates whether the UE supports L2 mobility between FR1 and FR2-2. This parameter can only be set if handoverFR1-FR2-2 is supported and if L2 mobilityIntraF is supported. L2 mobility between FR1 and FR2-2 refers to the case where one of a default PCell and an additional PCell is FR1 and the other is FR2-2.

handoverFR2-1-FR2-2 indicates whether the UE supports HO between FR2-1 and FR2-2.

L2mobilityFR2-1-FR2-2 indicates whether the UE sup-ports L2 mobility between FR2-1 and FR2-2. This parameter can only be set if handoverFR2-1-FR2-2 is supported and if L2mobilityIntraF is supported. L2 mobility between FR2-1 and FR2-2 refers to the case where one of a default PCell and an additional PCell is FR2-1 and the other is FR2-2.

handoverInterF indicates whether the UE supports inter-frequency HO.

L2mobilityInterF indicates whether the UE supports inter-frequency L2 mobility. inter-frequency L2 mobility refers to the case where centre frequency of a default PCell and a centre frequency of an additional PCell are different.

Above parameters are per-UE parameter.

GroupL2mobility indicates whether the UE supports mobility group based L2 mobility for a bandCombination. Mobility Group based L2 mobility for a bandCombination refers to the case where default PCell and default SCells are configured in a band combination and additional PCell and additional SCells are configured in the band combination (or part of the band combination).

GroupL2mobility is per band combination parameter.

The RadioBearerConfig is used to add signalling radio bearers and data radio bearers. The RadioBearerConfig comprises zero or one or more SRB configuration and zero or one or more DRB configuration. The SRB configuration comprises a SRB identity and a PDCP-Config. The DRB configuration comprises a DRB identity and a PDCP-Config.

A PDCP-Config is used to set the configurable PDCP parameters for a PDCP entity of a radio bearer. The PDCP-Config includes parameters for PDCP sequence number field and a parameter for discard timer and other parameters.

MasterKeyUpdate is to provide parameters for security key derivation. MasterKey Update comprises keySetChangeIndicator (indicating whether UE shall derive a new GNB security key) and NextHopChainingCount (used to update the GNB security key).

CellGroupConfig is used to configure a master cell group (MCG) or secondary cell group (SCG). A cell group comprises of one MAC entity and a set of logical channels with associated RLC entities and a primary cell (SpCell) and one or more secondary cells (SCells). CellGroupConfig includes following fields: zero or one spCellConfig (i.e., serving cell configuration for a default PCell), zero or one or more SCellConfig (i.e., serving cell configuration for a default SCell), one or more RLC-BearerConfig, a MAC-CellGroupConfig, a PhysicalCellGroupConfig, zero or one simultaneousU-TCI-UpdateList1, zero or one simultaneousU-TCI-UpdateList2, zero or one simultaneousU-TCI-UpdateList3, zero or one simultaneousU-TCI-UpdateList4.

A CellGroupConfig is also used to configure a default mobility group.

A CellGroupConfig2 is used to configure an additional mobility group. CellGroupConfig2 includes following fields: zero or one spCellConfig (i.e., serving cell configuration for an additional PCell), zero or one or more SCellConfig (i.e., serving cell configuration f or an additional SCell), one or more RLC-BearerConfig, a MAC-CellGroupConfig, a PhysicalCellGroupConfig, zero or one simultaneousU-TCI-UpdateList1, zero or one simultaneousU-TCI-UpdateList2, zero or one simultaneousU-TCI-UpdateList3, zero or one simultaneousU-TCI-UpdateList4.

Alternatively, CellGroupConfig2 includes following fields: zero or one spCellConfig (i.e., serving cell configuration for an additional PCell), zero or one or more SCellConfig (i.e., serving cell configuration for an additional SCell), zero or one simultaneousU-TCI-UpdateList1, zero or one simultaneousU-TCI-UpdateList2, zero or one simultaneousU-TCI-UpdateList3, zero or one simultaneousU-TCI-UpdateList4.

simultaneousU-TCI-UpdateList1, simultaneousU-TCI-UpdateList2, simultaneousU-TCI-UpdateList3 and simultaneousU-TCI-UpdateList4 are list of serving cells which can be updated simultaneously for TCI relation with a MAC CE. The different lists shall not contain same serving cells. Each list contains one or more ServCellIndex.

A RLC-BearerConfig is used to configure an RLC entity and a corresponding logic al channel in MAC and the linking to a PDCP entity.

The RLC-BearerConfig comprises a first identity and a second identity and a RLC-Config and a LogicalChannelConfig.

The first identity is logical channel identity. The first identity is the identity corresponding to the rlc-Bearer. The second identity is either a SRB identity or a DRB identity.

The second identity is the identity corresponding to the radio bearer that the rle-Bearer is connected to.

The RLC-Config is used to specify the RLC configuration. The RLC-Config includes parameter for the RLC sequence number field and parameter for the reassembly timer and other parameters.

The LogicalChannelConfig is used to configure the logical channel parameters of a logical channel. The LogicalChannelConfig includes parameters for priority and prioritized bit rate and logical channel restrictions.

The MAC-CellGroupConfig is used to configure MAC parameters for a cell group (or mobility group), including DRX. The mac-CellGroupConfig comprises a bsr-Config and a phr-Config and a drx-Config and likes.

The BSR-Config is used to configure buffer status reporting. The BSR-Config comprises parameters for periodic timer and retransmission timer.

The DRX-Config is used to configure DRX related parameters. The DRX-Config includes parameters for DRX timers and time domain offset.

The PHR-Config is used to configure parameters for power headroom reporting. The PHR-Config comprises parameters for timers and a format (e.g., single entry format or multi entry format).

The PhysicalCellGroupConfig is used to configure cell-group specific (or mobility group specific) L1 parameters. The physicalCellGroupConfig comprises a tpc-SRS-RNTI and a tpc-PUCCH-RNTI and a tpc-PUSCH-RNTI and a cs-RNTI and a mes-C-RNTI and a p-UE-FR1 and a p-NR-FR1.

cs-RNTI is RNTI value for downlink SPS and uplink configured grant.

p-NR-FR1 is the maximum total transmit power to be used by the UE in this NR cell group across all serving cells in frequency range 1 (FR1).

p-UE-FR1 is the maximum total transmit power to be used by the UE across all serving cells in frequency range 1 (FR1) across all cell groups.

tpc-PUCCH-RNTI is RNTI used for PUCCH TPC commands on DCI.

tpc-PUSCH-RNTI is RNTI used for PUSCH TPC commands on DCI.

tpc-SRS-RNTI is RNTI used for SRS TPC commands on DCI.

UE adjust its uplink transmission power based on TPC command on DCI.

DCI format 2_2 with CRC scrambled by a TPC-PUCCH-RNTI or by a TPC-PUSCH-RNTI or TPC-SRS-RNTI carries a plurality of TPC commands. Each of the plurality of TPC commands is mapped to a specific UE.

UE adjusts PUCCH transmission power of the default PCell by the amount indicated in the TPC command included in the DCI format 2_2 with CRC scrambled by a first TPC-PUCCH-RNTI received in the default PCell.

UE adjusts PUSCH transmission power of a serving cell of dmg by the amount indicated in the TPC command included in the DCI format 2_2 with CRC scrambled by a first TPC-PUSCH-RNTI received in the serving cell.

UE adjusts SRS transmission power of a serving cell of dmg by the amount indicated in the TPC command included in the DCI format 2_2 with CRC scrambled by a first TPC-SRS-RNTI received in the serving cell.

UE adjusts PUCCH transmission power of the additional PCell by the amount indicated in the TPC command included in the DCI format 2_2 with CRC scrambled by a second TPC-PUCCH-RNTI received in the additional PCell.

UE adjusts PUSCH transmission power of a serving cell of amg by the amount indicated in the TPC command included in the DCI format 2_2 with CRC scrambled by a second TPC-PUSCH-RNTI received in the serving cell.

UE adjusts SRS transmission power of a serving cell of amg by the amount indicated in the TPC command included in the DCI format 2_2 with CRC scrambled by a second TPC-SRS-RNTI received in the serving cell.

The first TPC-PUCCH-RNTI is configured by (indicated in) the PhysicalCellGroupConfig of the first RRCReconfiguration.

The first TPC-PUSCH-RNTI is configured by (indicated in) the PhysicalCellGroupConfig of the first RRCReconfiguration.

The first TPC-SRS-RNTI is configured by (indicated in) the PhysicalCellGroupConfig of the first RRCReconfiguration.

The second TPC-PUCCH-RNTI is configured by (indicated in) the PhysicalCellGroupConfig of the second RRCReconfiguration.

The second TPC-PUSCH-RNTI is configured by (indicated in) the PhysicalCellGroupConfig of the second RRCReconfiguration.

The second TPC-SRS-RNTI is configured by (indicated in) the PhysicalCellGroupConfig of the second RRCReconfiguration.

spCellConfig is parameters for the SpCell of this cell group (PCell of MCG or PSCell of SCG). spCellConfig includes following fields: a servCellIndex, a ReconfigurationWithSync or a L2mobilityConfig, a SSB-MTC and a ServingCellConfig.

SCellConfig is parameters for the SCell. spCellConfig includes following fields: a sCellIndex, a ServingCellConfigCommon, a SSB-MTC and a ServingCellConfig.

The SCellIndex is a short identity to identify an SCell.

The Reconfiguration WithSync is parameters for the SpCell. If spCellConfig in CellGroupConfig in RRCReconfiguration includes Reconfiguration WithSync, handover is initiated. The Reconfiguration WithSync includes following fields: a ServingCellConfigCommon, a newUE-Identity, t304 and a rach-ConfigDedicated.

newUE-Identity indicates the C-RNTI to be used in the target cell (and in the new dmg) after L3 handover.

The Reconfiguration WithSync is parameters for the default PCell.

The first C-RNTI is the C-RNTI for dmg. The first C-RNTI is the C-RNTI allocated to default PCell. The first C-RNTI is indicated in RRCReconfiguratino1.

The L2mobilityConfig is parameters for the additional PCell. The L2mobilityConfig includes following fields: a ServingCellConfigCommon, a newUE-Identity, t3041 and a rach-ConfigDedicated.

The second C-RNTI is the C-RNTI for amg. The second C-RNTI is the C-RNTI al located to additional PCell. The second C-RNTI is indicated in RRCReconfiguratino2.

The ServingCellConfigCommon is used to configure cell specific parameters of a terminal's serving cell.

The servingCellConfigCommon comprises parameters such as a ssb-PositionsInBurst and a SubcarrierSpacing and other IEs.

The ssb-PositionsInBurst indicates the time domain positions of the transmitted SS-blocks in a half frame with SS/PBCH blocks. The first/leftmost bit corresponds to SS/PBC H block index 0 and the second bit corresponds to SS/PBCH block index 1 and so on. Value 0 in the bitmap indicates that the corresponding SS/PBCH block is not transmitted while value 1 indicates that the corresponding SS/PBCH block is transmitted.

The SubcarrierSpacing indicates the subcarrier spacing of SSB.

ServingCellConfigCommon includes one DownlinkConfigCommon and two UplinkConfigCommon. One UplinkConfigCommon is for a NUL (normal uplink) and the other UplinkConfigCommon is for a SUL (supplementary uplink). UplinkConfigCommon for a SUL is located after UplinkConfigCommon is for a NUL.

DownlinkConfigCommon includes FrequencyInfoDL and BWP-DownlinkCommon. BWP-DownlinkCommon is for the initial DL BWP and includes PDCCH-ConfigCommon and PDSCH-ConfigCommon.

UplinkConfigCommon includes FrequencyInfoUL and TimeAlignmentTimer and BWP-UplinkCommon. BWP-UplinkCommon is for the initial UL BWP. BWP-UplinkCommon includes RACH-ConfigCommon and PUSCH-ConfigCommon and PUCCH-ConfigCommon and a plurality of RACH-ConfigCommon-fc.

DownlinkConfigCommon is a common downlink configuration of the serving cell. It consists of subfields such as FrequencyInfoDL and BWP-DownlinkCommon.

FrequencyInfoDL is a basic parameter of a downlink carrier. It consists of subfields such as a frequency band list and carrier bandwidth for each SCS.

BWP-DownlinkCommon is the configuration of the second downlink IBWP. It consists of subfields such as BWP, PDCCH-ConfigCommon, and PDSCH-ConfigCommon. The first IBWP has a frequency domain corresponding to the first CORESET #0 of the MIB and has subcarrier spacing indicated by the MIB. The first IBWP is the IBWP indicated by the MIB and receiving 1, the second IBWP is the IBWP indicated by the 1 and receiving the 2, paging, random access response message, and the like.

BWP is IE that configures general parameters of BWP. It consists of subfields such as locationAndBandwidth indicating the bandwidth and location of the BWP, and subcarrierSpacing indicating the SCS of the BWP.

The ServingCellConfig is used to configure the terminal with a serving cell. The ServingCellConfig comprises terminal specific parameters and cell specific parameters. The ServingCellConfig comprises the configuration information for additional bandwidth parts. The terminal specific parameters comprise a csi-MeasConfig.

ServingCellConfig includes a BWP-DownlinkDedicated (for the second initial downlink BWP) and zero or one or more BWP-Downlink IEs (for dedicate downlink BWPs) and a UplinkConfig IE (for normal uplink) and a UplinkConfig IE (for supplementary uplink) and a CSI-MeasConfig. The UplinkConfig IE includes a BWP-UplinkDedicated (for the second initial uplink BWP) and zero or one or more BWP-Uplink IEs (for dedicate uplink BWPs).

A BWP-Downlink consists of a BWP-Id IE and a BWP-DownlinkCommon IE and a BWP-DownlinkDedicated IE.

A BWP-Uplink consists of a BWP-Id IE and a BWP-UplinkCommon IE and a BW P-UplinkDedicated IE.

A BWP-Downlink Dedicated consists of a PDCCH-Config and a PDSCH-Config. The PDCCH-Config is used to configure UE specific PDCCH parameters such as control resource sets (CORESET), search spaces and additional parameters for acquiring the PDCCH. The PDSCH-Config is used to configure the UE specific PDSCH parameters.

A BWP-UplinkDedicated consists of a PUCCH-Config and a PUSCH-Config and a ul-TCIState. The PUCCH- Config is used to configure UE specific PUCCH parameters. The PUSCH-Config is used to configure the UE specific PUSCH parameters.

The CSI-MeasConfig is used to configure followings.

1: CSI-RS (reference signals) belonging to the serving cell in which CSI-MeasConfig is included; and 2: channel state information reports to be transmitted on PUCCH on the serving cell in which CSI-MeasConfig is associated with; and 3: channel state information reports on PUSCH triggered by DCI received on the serving cell in which CSI-MeasConfig is associated with.

The CSI-MeasConfig includes following fields: a csi-ReportConfigToAddModList (including one or more csi-ReportConfig), a csi-ResourceConfigToAddModList (including one or more csi-ResourceConfig), nzp-CSI-RS-ResourceSetToAddModList (including one or more nzp-CSI-RS-ResourceSet), nzp-CSI-RS-ResourceToAddModList (including one or more nzp-CSI-RS-Resource and other fields).

The CSI-ReportConfig is used to configure followings.

1: a periodic or semi-persistent report sent on PUCCH on the cell in which the CSI-ReportConfig is associated with; or 2: a semi-persistent or aperiodic report sent on PUSCH triggered by DCI received on the cell in which the CSI-ReportConfig is associated with.

The CSI-ReportConfig includes following fields.

reportConfigId field indicates the identity of the CSRI-ReportConfig (or CSI report setting).

carrier field indicates in which serving cell the CSI-ResourceConfig are to be found. If the field is absent, the resources are on the same serving cell as this report configuration.

cqi-FormatIndicator field indicates whether the UE shall report a single (wideband) or multiple (subband) CQI.

nrofReportedRS field indicates the number (N) of measured RS resources to be reported per report setting in a non-group-based report.

p0alpha indicates the index of the p0-alpha set determining the power control for this CSI report transmission.

reportConfigType indicates time domain behavior of reporting configuration. It has a choice structure between periodic and semiPersistentOnPUCCH and semiPersistentOnPUSCH and aperiodic.

reportFreqConfiguration indicates Reporting configuration in the frequency domain.

resourcesForChannelMeasurement indicates a CSI-ResourceConfigId. It is resources for channel measurement. It is csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.

pucch-Resource is PUCCH resource for the associated uplink BWP. Only PUCCH-Resource of format 2, 3 and 4 is supported. The actual PUCCH-Resource is configured in PUCCH-Config and referred to by its ID.

The CSI-ResourceConfig defines a group of one or more NZP-CSI-RS-ResourceSet, CSI-IM-ResourceSet and/or CSI-SSB-ResourceSet. It includes following fields: csi-ResourceConfigId. csi-RS-ResourceSetList (including one or more NZP-CSI-RS-ResourceSetIds and others), bwp-Id The NZP-CSI-RS-ResourceSet is a set of Non-Zero-Power (NZP) CSI-RS resources (their IDs) and set-specific parameters. It includes repetition (indicating whether repetition is on/off), trs-Info (indicating that the antenna port for all NZP-CSI-RS resources in the CSI-RS resource set is same), one or more nzp-CSI-RS-Resource.

The NZP-CSI-RS-Resource is used to configure Non-Zero-Power (NZP) CSI-RS transmitted in the cell where the IE is included and which the UE may be configured to measure on. It includes NZP-CSI-RS-ResourceId, periodicityAndOffset, powerControlOffset, qcl-InfoPeriodicCSI-RS and resourceMapping qcl-InfoPeriodicCSI-RS contains a reference to one TCI-State in TCI-States for providing the QCL source and QCL type. For periodic CSI-RS, the source can be SSB or another periodic-CSI-RS.

resourceMapping indicates OFDM symbol location (s in a slot and subcarrier occupancy in a PRB of the CSI-RS resource.

The PDSCH-Config is used to configure the UE specific PDSCH parameters. It includes following fields.

dataScramblingIdentityPDSCH indicates Identifier used to initialize data scrambling (c_init) for PDSCH.

maxMIMO-Layers indicates the maximum number of MIMO layers to be used for PDSCH in this DL BWP. If not configured, the UE uses the maxMIMO-Layers configuration in IE PDSCH-ServingCellConfig of the serving cell to which this BWP belongs, when the UE operates in this BWP.

tci-StatesToAddModList is a list of Transmission Configuration Indicator (TCI) states indicating a transmission configuration which includes QCL-relationships between the DL RSs in one RS set and the PDSCH DMRS ports. A TCI-State includes following IEs: a TCI-StateId and one or two QCL-Info.

QCL-Info IE includes a mobilityGroupIndicatorfield (indicating UE's mobility group which the referenceSignal is configured), a cell field (indicating UE's serving cell in which the referenceSignal is configured) and a bwp-Id field (indicating the DL BWP which the RS is located in) and a referenceSignal (indicating reference signal with which quasi-collocation information is provided). The referenceSignal field includes either NZP-CSI-RS-ResourceId or a SSB-Index.

A QCL-Info is associated with a referenceSignal and corresponds to a TCI-State.

If the mobilityGroupIndicator is absent, it applies to the mobility group in which the TCI-State is configured.

If the cell is absent, it applies to the serving cell in which the TCI-State is configured.

The mobility group in which the TCI state is configured is the mobility group which is configured by a CellGroupConfig2. The CellGroupConfig2 includes a ServingCellConfig. The ServingCellCofnig includes a BWP-DownlinkDedicated. The BWP-DownlinkDedicated includes a PDSCH-Config. The PDSCH-Config includes a tci-stateToAddModList. The tci-stateToAddModList includes a TCI-State IE corresponding to the TCI-State.

The serving cell in which the TCI state is configured is the serving cell which is configured by a ServingCellConfig. The ServingCellCofnig includes a BWP-DownlinkDedicated. The BWP-DownlinkDedicated includes a PDSCH-Config. The PDSCH-Config includes a tci-stateToAddModList. The tci-stateToAddModList includes a TCI-State IE corresponding to the TCI-State.

The SSB-MTC is used to configure measurement timing configurations, i.e., timing occasions at which the terminal measures SSBs. The SSB-MTC comprises a periodicityAndOffset and a duration.

The duration indicates duration of the measurement window in which to receive SS/PBCH blocks.

periodicityAndOffset indicates periodicity and offset of the measurement window in which to receive SS/PBCH blocks.

For each mobility group, UE can be configured with zero or more SR configurations.

Each SR configuration corresponds to one or more logical channels and/or to SCell beam failure recovery and/or to MOBILITY_GROUP_SWITCH_RESPONSE MAC CE. Each logical channel, SCell beam failure recovery may be mapped to zero or one SR configuration, which is configured by RRC. MOBILITY_GROUP_SWITCH_RESPONSE MAC CE may be mapped to at least one SR configuration. The SR configuration of the logical channel that triggered a BSR or the SCell beam failure recovery or MOBILITY_GROUP_SWITCH_RESPONSE MAC CE is considered as corresponding SR configuration for the triggered SR.

A scheduling_request_procedure_for_ MOBILITY_GROUP_SWITCH_RESPON SE is as follows.

If an SR is triggered by MOBILITY_GROUP_SWITCH_RESPONSE MAC CE and there are no other SRs pending corresponding to the same SR configuration, the UE/MAC entity shall set the SR_COUNTER of the corresponding SR configuration to 0.

When an SR is triggered, it shall be considered as pending until it is cancelled.

If the SR is triggered by MOBILITY_GROUP_SWITCH_RESPONSE MAC CE and a MAC PDU is transmitted and the MAC PDU includes a Type2Gap L2 request, UE cancel the pending SR and stop the sr-ProhibitTimer.

Only PUCCH resources on a BWP which is active at the time of SR transmission occasion are considered valid.

If the MAC entity/UE has no valid PUCCH resource configured for the pending SR, UE initiates a Random Access procedure on the SpCell (additional PCell during the second period, default PCell during the first period and the third period and cancel the pending SR.

If the MAC entity/UE has valid PUCCH resource configured for the pending SR and if sr-ProhibitTimer is not running at the time of the SR transmission occasion for SR configured and if the PUCCH resource for the SR transmission occasion does not overlap with a measurement gap and if SR_COUNTER is smaller than sr-TransMax, UE performs following actions; UE signal the SR on one valid PUCCH resource for SR and UE increments SR_COUNTER by 1 and UE starts the sr-ProhibitTimer.

The valid PUCCH resource configured for the SR triggered by MOBILITY_GROUP_SWITCH_RESPONSE MAC CE is the PUCCH resource on the active UL BWP and associated with the SR configuration selected for MOBILITY_GROUP_SWITCH_RESPONSE MAC CE.

During the second period, UE applies a SR configuration selected from SR configurations in the MAC-CellGroup-Config in the CellGroupConfig2 in RRCReconfiguation2 (i.e. SR configurations configured for the amg.

During the first period and the third period, UE applies a SR configuration selected from SR configurations in the MAC-CellGroupConfig in the CellGroupConfig in RRCReconfiguation1 (i.e. one of SR configurations configured for the dmg.

The MAC-CellGroupConfig is used to configure MAC parameters for a cell group, including DRX and SR configurations.

The MAC-CellGroupConfig includes a schedulingRequestToAddModList field (List of Scheduling Request configurations to add or modify and a schedulingRequestToReleaseList field (List of Scheduling Request configurations to release and a schedulingRequestID-BFR-SCell field (the scheduling request configuration applicable for BFR on SCell and a schedulingRequestID-MGS field (the scheduling request configuration applicable for MOBILITY_GROUP_SWITCH_RESPONSE MAC CE. The SchedulingRequestID-BFR-SCell field and schedulingRequestID-MGS field includes corresponding SchedulingRequestID respectively.

The schedulingRequestToAddModList field comprises one or more SchedulingRequestToAddMod IEs.

A SchedulingRequestToAddMod IE comprises following fields: schedulingRequestId, sr-ProhibitTimer (Prohibit timer for SR transmission on PUCCH, sr-TransMax (Maximum number of SR transmissions The schedulingRequestToReleaseList field comprises one or more schedulingRequestId.

The PUCCH-Config is used to configure UE specific PUCCH parameters (per BWP.

The PUCCH-Config comprises following fields.

A resourceSetToAddModList field (Lists for adding PUCCH resource sets); comprising one or more PUCCH-ResourceSet and a resourceSetToReleaseList field (Lists for releasing PUCCH resource sets); comprising one or more PUCCH-ResourceSetId and a spatialRelationInfoToAddModList field (Configuration of the spatial relation between a reference RS and PUCCH); comprising one or more PUCCH-SpatialRelationInfo and a spatialRelationInfoToReleaseList field (Lists of spatial relation configurations between a reference RS and PUCCH to be released by the UE); comprising one or more PUCCH-SpatialRelationInfold.

A resourceToAddModList field (Lists for adding PUCCH resources applicable for the UL BWP and serving cell in which the PUCCH-Config is defined); comprising one or more PUCCH-Resource and a resourceToReleaseList field (Lists for releasing PUCCH resources applicable for the UL BWP and serving cell in which the PUCCH-Config is defined); comprising one or more PUCCH-ResourceId.

A schedulingRequestResourceToAddModList field (List for adding scheduling request resource for the UL BWP and serving cell in which the PUCCH-Config is defined) and a schedulingRequestResourceToReleaseList field (List for releasing scheduling request resource for the UL BWP and serving cell in which the PUCCH-Config is defined).

The SchedulingRequestResourceConfig determines physical layer resources on PUCCH where the UE may send the dedicated scheduling request. A SchedulingRequestResourceConfig is associated with a SchedulingRequestConfig. A SchedulingRequestResourceConfig comprises following fields.

schedulingRequestResourceId field (used to identify scheduling request resources on PUCCH), schedulingRequestID field (The ID of the SchedulingRequestConfig that uses this scheduling request resource), periodicityAndOffset (SR periodicity and offset in number of symbols or slots) and resource (ID of the PUCCH resource in which the UE shall send the scheduling request). The actual PUCCH-Resource is configured in PUCCH-Config of the same UL BWP and serving cell as this SchedulingRequestResourceConfig.

The PUCCH-ResourceSet comprises following fields. A pucch-ResourceSetId field and a resourceList field (one or more PUCCH-ResourceId).

The PUCCH-Resource comprises following fields. A pucch-ResourceId field (Identifier of the PUCCH resource), a startingPRB field, a nrofSymbols field (the number of symbols used per PUCCH resource) and a nrofPRBs field (the number of PRBs used per PUCCH resource).

The PUCCH-SpatialRelationInfo is used to configure the spatial setting for PUCCH transmission and the parameters for PUCCH power control. The PUCCH-SpatialRelationInfo comprises following fields: pucch-SpatialRelationInfold, servingCellId, referenceSignal and pucch-PathlossReferenceRS-Id.

ServingCellId field indicates the serving cell where the referenceSignal is configured. If this field is absent, UE applies the ServCellId of the serving cell in which this PUCCH-SpatialRelationInfo is configured.

ReferenceSignal field indicates a SSB-Index or a NZP-CSI-RS-ResourceId.

pucch-PathlossReferenceRS-Id field indicates the pucch-PathlossReferenceRS to be used for PUCCH power control.

A spatial setting for a PUCCH transmission by a UE is provided by a PUCCH-SpatialRelationInfo.

DCI format 1_0 is used for the scheduling of PDSCH in one DL cell. The following information is transmitted by means of the DCI format 1_0 with CRC scrambled by P-RNTI: Short Messages Indicator, Short Messages, Frequency domain resource assignment, Time domain resource assignment and other information.

Short Messages can be transmitted on PDCCH using P-RNTI with or without associated Paging message using Short Message field in DCI format 1_0.

Below table defines Short Messages. Bit 1 is the most significant bit.

TABLE 5

| Bit | Short Message |
| --- | --- |
| 1 | systemInfoModification |
|   | If set to 1: indication of a BCCH modification other than SIB6, SIB7 and SIB8. |
| 2 | etwsAndCmasIndication |
|   | If set to 1: indication of an ETWS primary notification and/or an ETWS secondary notification and/or a CMAS notification. |
| 3 | stopPagingMonitoring |
|   | This bit can be used for only operation with shared spectrum channel access and if nrofPDCCH-MonitoringOccasionPerSSB-InPO is present. |
| 4 | systemInfoModification-eDRX |
|   | If set to 1: indication of a BCCH modification other than SIB6, SIB7 and SIB8. This indication applies only to UEs using eDRX cycle longer than the BCCH modification period. |
| 5-8 | Not used in this release of the specification, and shall be ignored by UE if received. |

The MOBILITY_GROUP_SWITCH_REQUEST MAC CE comprises a MOBILITY_GROUP_ID_FIELD and a RAMDOM_ACCESS_REQUIRED_FIELD and one or more TCI_STATE_FIELD_GROUP_FIELD_FIELDs.

The MOBILITY_GROUP_ID_FIELD indicates the identity of the mobility group for which the MAC CE applies. The MOBILITY_GROUP_ID_FIELD indicates the identity of target mobility group for L2 mobility. Value 0 corresponds to the default mobility group (or default PCell. Other values correspond to additional mobility groups (or additional PCell).

The RAMDOM_ACCESS_REQUIRED_FIELD indicates whether Random Access procedure is to be performed in the PCell of the mobility group to be activated (default PCell if dmg is activated and additional PCell if amg is activated.

A TCI_STATE_FIELD_GROUP_FIELD comprises a SERVING_CELL_ID_FIELD and a DL_BWP_ID field and a UL_BWP_ID field and one or two TCI_state_ID fields.

The SERVING_CELL_ID_FIELD indicates the identity of the Serving Cell that are activated upon mobility group switching and for which the DL_BWP_ID field and the UL_BWP_ID field and one or two TCI_state_ID fields applies.

The DL_BWP_ID field indicates a DL BWP that is first active upon mobility group switching and the DL BWP for which the corresponding TCI state applies. The UL_BWP_ID field indicates a UL BWP that is first active upon mobility group switching and the UL BWP for which the corresponding TCI state applies.

If two TCI_state_ID fields are included, the first TCI_state_ID field indicates the TCI state of the DL BWP indicated by the DL_BWP_ID field and the second TCI_state_ID field indicates the TCI state of the UL BWP indicated by the UL_BWP_ID field.

If a TCI_state_ID fields is included, the TCI_state_ID field indicates the joint TCI state of the DL BWP indicated by the DL_BWP_ID field and the UL BWP indicated by the UL_BWP_ID field.

The first MAC CE is a MOBILITY_GROUP_SWITCH_REQUEST MAC CE instructing a mobility group switch from a amg to a dmg (or L2 switch from an additional PCell to a default PCell).

The second MAC CE is a MOBILITY_GROUP_SWITCH_REQUEST MAC CE instructing a mobility group switch from a dmg to a amg (or L2 switch from a default PCell to an additional PCell).

The MOBILITY_GROUP_SWITCH_RESPONSE MAC CE comprises a MOBILITY_GROUP_ID_FIELD and one or more echoed_TCI_STATE_FIELD_GROUP_FIELDs.

The MOBILITY_GROUP_ID_FIELD indicates the identity of the source (old) mobility group from which the mobility group switch take place. The MOBILITY_GROUP_ID_FIELD indicates the identity of source mobility group for L2 mobility. Value 0 corresponds to the default mobility group (or default PCell). Other values correspond to additional mobility groups (or additional PCell).

A echoed_TCI_STATE_FIELD_GROUP_FIELD comprises a SERVING_CELL_ID_FIELD and a DL_BWP_ID field and a UL_BWP_ID field and one or two TCI_state_ID fields. The echoed_TCI_STATE_FIELD_GROUP_FIELD contains the TCI_STATE_FIELD_GROUP_FIELD received in the MOBILITY_GROUP_SWITCH_REQUEST MAC CE Alternatively, the MOBILITY_GROUP_SWITCH_RESPONSE MAC CE comprises a MOBILITY_GROUP_ID_FIELD and zero or one or more RS_ID field groups.

A RS_ID field group comprises a a SERVING_CELL_ID_FIELD and a DL_BWP_ID field and a UL_BWP_ID field and one or two RS_ID fields.

The RS_ID field is set to the index of an SSB (of the corresponding serving cell) with best SS-RSRP (or SS-RSRP) above a configurd threshold.

The TRUNCATED_MOBILITY_GROUP_SWITCH_RESPONSE MAC CE comprises a MOBILITY_GROUP_ID_FIELD and one echoed_TCI_STATE_FIELD_GROUP_FIELDs. The echoed_TCI_STATE_FIELD_GROUP_FIELD is the one associated with the PCell.

Alternatively, the TRUNCATED_MOBILITY_GROUP_SWITCH_RESPONSE MAC CE comprises a MOBILITY_GROUP_ID_FIELD and one RS_ID field groups. The echoed_TCI_STATE_FIELD_GROUP_FIELD is the one associated with the PCell.

The SCell Activation/Deactivation MAC is identified by a MAC subheader with a LCID. It has a fixed size and consists of a single octet containing seven C-fields and one R-field.

Ci field indicates the activation/deactivation status of the SCell with SCellIndex i. The Ci field is set to 1 to indicate that the SCell with SCellIndex i shall be activated. The Ci field is set to 0 to indicate that the SCell with SCellIndex i shall be deactivated.

Upon activation of a SCell, UE activates a BWP indicated as firstActiveBwp of a SCell in a RRCReconfiguration message. The RRCReconfiguration message includes the configuration information of the SCell.

Upon L3 mobility, UE activates a BWP as firstActiveBWP of the target PCell in RRCReconfiguration message1.

Upon L2 mobility, UE activates a BWP indicated in MOBILITY_GROUP_SWITCH_REQUEST MAC CE.

Scrambling sequence is applied to PUSCH transmission. The scrambling sequence is generated by the scrambling sequence generator. The scrambling sequence generator is initialed with C_init. C_init is binary sum (or concatenation of n_ID and n_RNTI).

For a PUSCH in an uplink BWP b of a serving cell s of dmg;

n_ID equals dataScramblingIdentityPUSCH_b_s_dmg if a dataScramblingIdentity PUSCH IE is included in (or is configured by) PUSCH-Config of the BWP b of the serving cells of the dmg. The dataScramblingIdentityPUSCH_b_s_dmg is indicated by the dataScramblingIdentityPUSCH IE in PUSCH-Config of the BWP b of the serving cell s of the dmg.

n_ID equals physical layer cell identity (PCI of the serving cell s of the dmg if a dataScramblingIdentityPUSCH IE is not included in (or is not configured by PUSCH-Config of the BWP b of the serving cell s of the dmg.

n_RNTI equals the C-RNTI of dmg (or C-RNTI of default PCell).

For a PUSCH in an uplink BWP b of a serving cell s of amg;

n_ID equals dataScramblingIdentityPUSCH_b_s_amg if a dataScramblingIdentity PUSCH IE is included in (or is configured by) PUSCH-Config of the BWP b of the serving cells of the amg. The dataScramblingIdentityPUSCH_b_s_amg is indicated by the dataScramblingIdentityPUSCH IE in PUSCH-Config of the BWP b of the serving cell s of the amg.

n_ID equals physical layer cell identity (PCI) of the serving cells of the amg if a dataScramblingIdentityPUSCH IE is not included in (or is not configured by) PUSCH-Config of the BWP b of the serving cells of the amg.

n_RNTI equals the C-RNTI of amg (or C-RNTI of additional PCell) if the C-RNTI is included in (or is configured by) L2mobilityConfig for amg.

n_RNTI equals the C-RNTI of dmg (or C-RNTI of default PCell) if the C-RNTI is not included in (or is not configured by) L2mobilityConfig for amg.

A SRS configuration may be provided for each UL BWP. A SRS configuration may be included in a BWP-DedicatedUplink of a serving cell of a mobility group. The SRS configuration consists of one or more SRS-ResourceSet (hereinafter, SRS resource set). One SRS resource set consists of one or more SRS-Resource (hereinafter, SRS resource.

The SRS resource is defined by srs-ResourceId (SRS resource identifier), startPosition, nrofSymbols, freqDomainShift, freqHopping, periodicityAndOffset, spatialRelationInfo, and the like.

startPosition and nrofSymbols indicate the start position of a symbol in which SRS is transmitted and the number of symbols in which SRS is transmitted in the SRS slot.

freqDomainShift and freqHopping define the frequency resource through which the SRS is transmitted in relation to the frequency domain of the corresponding BWP.

periodicity AndOffset indicates the periodicity and the slot at which the SRS slot starts. The SRS slot means a slot in which a SRS resource is configured or a slot in which a SRS is transmitted.

spatialRelationInfo defines a spatial domain transmission filter to be applied to SRS transmission and may be set to a downlink reference signal index of a serving cell, an SSB index of a neighboring cell, and the like. spatialRelationInfo is set always to serving cell index 0 (i.e., PCell for RRC_INACTIVE UE. Any serving cell index or neighboring cell can be used for RRC_CONNECTED SRS resource set consists of SRS resource set identifier, SRS resource identifier list, Resource Type, alpha, p0, pathlossReferenceRS and a follow UnifiedTCIstateSRS.

followUnifiedTCIstateSRS is enumerated with a single value. If this field is present (or set to enabled) for a SRS resource set, UE applies to the SRS resource set (or SRS resource of the SRS resource set) one or more TCI states indicated in a PDSCH-config.

If this field is absent for a SRS resource set, UE applies to the SRS resources of the SRS resource set a spatialRelationInfo indicated in the SRS resource.

SRS resource identifier list is the list of SRS resource identifiers composing the SRS resource set.

Resource Type indicates one of "periodic" and "semi-persistent" and "aperiodic". In the present disclosure, a semi-persistent SRS resource set will be described as an example. For SRS resource set of which ResourceType is indicated as semi-persistent, SRS transmission of SRS resource set starts only after a specific control message instructs transmission. Only periodic or semi-persistent are applicable for the UE in RRC_INACTIVE.

alpha, p0 and pathlossReferenceRS are parameters for transmission power control of SRS. alpha and p0 are power offsets that are added when determining SRS transmission power, and pathlossReferenceRS provides path loss when determining SRS transmission power. is the reference signal.

At some point of time, the UE receives a SRS Activation/Deactivation MAC CE instructing to start transmission of a specific SRS resource set from the GNB. UE activates/deactivates the SRS resource set of the mobility group where the MAC CE is received.

The SRS Activation/Deactivation MAC CE consists of an A/D field, a Cell ID field, a BWP ID field, a SUL field, and a SRS Resource Set ID.

The A/D field indicates whether to activate or deactivate the indicated SRS resource set.

The Cell ID field indicates the identifier of the serving cell to which the SRS resource set to be activated/deactivated belongs. The serving cell is the cell of the mobility group where the MAC CE is received. The serving cell is the cell of the currently active mobility group. The serving cell is one of the currently active serving cells.

The BWP ID field indicates the identifier of the BWP to which the SRS resource set to be activated/deactivated belongs.

The SUL field indicates whether the MAC CE is applied to a NUL carrier configuration or a SUL carrier configuration. Or it indicates whether the activated or deactivated SRS resource set is an SRS resource set of SUL or an SRS resource set of NUL.

The SRS Resource Set ID field is an identifier of the SRS resource set to be activated or deactivated.

NUL is normal uplink and SUL is supplementary uplink. One serving cell may have only NUL or may have NUL and SUL. The SUL is configured in the low frequency band comparing to the NUL to increase the uplink coverage of the cell.

The UE transmits a SRS in the activated SRS resource set. The UE transmits the SRS from SRS resources belonging to the SRS resource set by applying the transmission power control parameter of the SRS resource set. The SRS resources are periodically generated according to periodicity AndOffset.

The IE PUSCH-Config is used to configure UE specific PUSCH parameters applicable to a BWP.

It consists of dataScramblingIdentityPUSCH field, pusch-PowerControl field, pusch-TimeDomainAllocationList field, mcs-Table field and frequencyHopping field and other S.

dataScramblingIdentityPUSCH field indicates an identifier used to initalize data scrambling (c_init for PUSCH). If the field is absent, UE applies the physical cell ID.

mcs-Table field indicates which MCS table UE shall use for PUSCH. If the field is absent UE applies the value 64QAM.

frequencyHopping indicates frequency hopping scheme to be applied. The value intraSlot enables 'Intra-slot frequency hopping' and the value interSlot enables 'Inter-slot frequency hopping'. If the field is absent, frequency hopping is not configured.

PUSCH-PowerControl is used to configure UE specific power control parameter for PUSCH. It consists of p0-AlphaSets field and p0-NominalWithoutGrant field.

p0-AlphaSets field includes a plurality of P0-PUSCH-AlphaSet IEs. A P0-PUSCH-AlphaSet IE comprises a p0-PUSCH-AlphaSetId field and a p0 field.

p0 field indicates P0 value for PUSCH with grant (except msg3) in steps of 1 dB. When the field is absent UE applies the value 0.

p0-NominalWithoutGrant field indicates P0 value for UL grant-free PUSCH (configured grant based PUSCH).

UE monitors PDCCH addressed by a C-RNTI based at least in part on a SearchSpace indicated in a PDCCH-config of the currently active DL BWP of a serving cell.

UE performs PUSCH transmission based on PUSCH-Config and PUSCH-ConfigCommon of the currently active UL BWP of a serving cell.

The C-RNTI is first C-RNTI if the current PCell is the default PCell (and the current mg is $\frac{a}{s}$).

The C-RNTI is second C-RNTI if the current PCell is the additional PCell (and the current mg is amg) and the second C-RNTI is indicated in the second RRCReconfiguration.

The C-RNTI is first C-RNTI if the current PCell is the additional PCell (and the current mg is amg) and the second C-RNTI is not indicated in the second RRCReconfiguration.

The PDCCH-config is the one indicated in the first RRCReconfiguration if the current PCell is the default PCell (and the current mg is dmg).

The PDCCH-config is the one indicated in the second RRCReconfiguration if the current PCell is the additional PCell (and the current mg is amg).

The PUSCH-config is the one indicated in the first RRCReconfiguration if the current PCell is the default PCell (and the current mg is dmg).

The PUSCH-config is the one indicated in the second RRCReconfiguration if the current PCell is the additional PCell (and the current mg is amg).

The PUSCH-configCommon is the one indicated in the first RRCReconfiguration if the current PCell is the default PCell (and the current mg is dmg).

The PUSCH-configCommon is the one indicated in the second RRCReconfiguration if the current PCell is the additional PCell (and the current mg is amg).

The serving cell is the default PCell if the current PCell is the default PCell (and the current mg is dmg).

The serving cell is the additional PCell if the current PCell is the additional PCell (and the current mg is amg).

Upon receiving DCI including uplink grant in a serving cell of a mg, UE determines time domain relationship between the PDCCH and the PUSCH based at least in part on Z.

If pusch-TimeDomainResourceAllocationList is include in a PUSCH-Config of active UL BWP of the serving cell of the mg, Z is pusch-TimeDomainResourceAllocationList in the PUSCH-Config.

If pusch-TimeDomainResourceAllocationList is not include in a PUSCH-Config of active UL BWP of the serving cell of the mg and pusch-TimeDomainResource Allocation is included in a PUSCH-ConfigCommon of the serving cell of the mg, Z is pusch-TimeDomainResource AllocationList in the PUSCH-ConfigCommon.

If pusch-TimeDomainResource AllocationList is not included in the PUSCH-ConfigCommon of the serving cell of the mg and pusch-TimeDomainResource AllocationList is not included in the PUSCH-Config of active uplink BWP of the serving cell of the mg, Z is default PUSCH time domain resource allocation table.

UE determines uplink transmission power of PUSCH based at least in part on a P0-PUSCH and a Alphaincluded in the PUSCH-Config.

UE determines the PUSCH transmission power by summing offset, pathloss and other parameters related with number of PRBs and power control commands.

offset is sum of P0-PUSCH and Alpha.

UE performs PUSCH transmission based at least in part on the transmission power and time domain relationship determined above.

The RRCReconfiguration1 is a RRC message including a servingCellConfig and a servingCellConfigCommon of the first cell.

The RRCReconfiguration1 is a RRC message including Reconfiguration WithSync.

The RRCReconfiguration1 is a RRC message received by the UE in a cell that is different from the first cell.

The RRCReconfiguration1 is a RRC message instructing L3 mobility from the current serving cell to the first cell.

The RRCReconfiguration2 is a RRC message including a servingCellConfig and a servingCellConfigCommon of the second cell.

The RRCReconfiguration2 is a RRC message including L2mobilityConfig.

The RRCReconfiguration2 is a RRC message received by the UE in a cell that is different from the second cell.

The RRCReconfiguration2 is a RRC message instructing L2 mobility between the current serving cell and the second cell.

The RRCReconfiguration3 is a RRC message including a first PCell change information indicating that default PCell change is needed and a second PCell change information indicating which additional PCell is new default PCell and a third PCell change information indicating whether the current default PCell is released or is a new additional PCell.

The RRCReconfiguration3 is a RRC message received by the UE in the first cell or in the second cell.

The RRCReconfiguration3 is a RRC message instructing default PCell change from the current default PCell to one of additional PCells.

The RRCReconfiguration3 is a RRC message instructing default PCell change from the first cell to the second cell.

The RRCReconfiguration3 is a RRC message instructing additional PCell change from the current additional PCell to the default PCell.

The RRCReconfiguration3 is a RRC message instructing additional PCell change from the second cell to the first cell.

The RRCRecofiguration4 is a RRC message instructing release of an additional PCell.

The RRCReconfiguration4 includes an additional PCell release information. The additional PCell release information includes an index (or identifier of the additional PCell to be released.

The first cell is a default PCell or a default PSCell.

The second cell is an additional PCell or an additional PSCell.

The second cell is an additional PCell if the first cell is a default PCell.

The second cell is an additional PSCell if the first cell is a default PSCell.

A default PCell is the cell, operating on the primary frequency, in which the UE either performs the initial connection establishment procedure or initiates the connection re-establishment procedure, or the cell indicated as the primary cell in the handover procedure.

An additional PCell is the cell, operating on the primary frequency, indicated as an additional primary cell in L2 mobility procedure.

Only one default PCell is configured for a UE in RRC_CONNECTED. UE in RRC_CONNECTED is always configured with the default PCell. A default PCell is established when UE enters into RRC_CONNECTED state. The default PCell is changed by a RRCReconfiguratino1. The default PCell changes from a cell to another cell when UE receives a RRCReconfiguration1. The default PCell changes from a cell to another cell when UE receives a RRCReconfiguration3.

The default PCell is released when UE leaves RRC_CONNECTED state (i.e., when UE enters into RRC_INACTIVE or RRC_IDLE. The default PCell is released when UE receives a RRCRelease.

Zero or one or more additional PCell is configured for a UE in RRC_CONNECTED. An additional PCell is established by a RRCReconfiguration2. An additional PCell is released when UE receives RRCReconfiguration4. An additional PCell is changed to a default PCell when UE receives RRCReconfiguration3.

The terminal receives a first RRCReconfiguration from the base station.

/The first RRCReconfiguration includes followings.

//a first RadioBearerConfig and one or more default RLC-BearerConfig and a default MAC-CellGroupConfig and a first physicalCellGroupConfig and a default PCell configuration information and zero or one or more a default SCell configuration information.

The terminal performs transmission and reception on the default PCell or the default SCell based on the first RadioBearerConfig and one or more default RLC-BearerConfig and a default MAC-CellGroupConfig and a default physicalCellGroupConfig and a default PCell configuration information and zero or one or more a default SCell configuration information.

The terminal performs transmission and reception on the default PCell and the default SCell based on the first parameters and the third parameters.

/The first parameters are part of parameters included in the following IEs.

//the first RadioBearerConfig and one or more default RLC-BearerConfig and a default MAC-CellGroupConfig and a first physicalCellGroupConfig and a default PCell configuration information and zero or one or more a default SCell configuration information.

/The third parameters are part of parameters included in the following IE.

//the first RadioBearerConfig.

/The second RRCReconfiguration includes followings.

//one or more additional RLC-BearerConfig and an additional MAC-CellGroupConfig and an second physicalCellGroupConfg and an additional PCell configuration information and zero or one or more an additional SCell configuration information.

The terminal performs transmission and reception on the additional PCell or the additional SCell based on the first RadioBearerConfig and one or more additional RLC-BearerConfig and the additional MAC-CellGroupConfig and the second physicalCellGroupConfig and the additional PCell configuration information and zero or one or more the additional SCell configuration information.

The terminal performs transmission and reception on the additional PCell and the additional SCell based on the second parameters and the third parameters.

/The second parameters are part of parameters included in one or more additional RLC-BearerConfig and the additional MAC-CellGroupConfig and the second physicalCell GroupConfig and the additional PCell configuration information and zero or one or more additional SCell configuration information.

The second RRCReconfiguration includes an additional physicalCellGroupConfg and an additional PCell configuration information and zero or one or more an additional SCell configuration information.

The terminal performs transmission and reception on the additional PCell and the additional SCell based on the first RadioBearerConfig and one or more default RLC-Bearer Config and the default MAC-CellGroupConfig and the second physicalCellGroupConfig and the additional PCell configuration information and zero or one or more additional SCell configuration information.

The terminal performs transmission and reception on the default PCell and the default SCell based on the first RadioBearerConfig and one or more default RLC-BearerConfig and the default MAC-CellGroupConfig and the first physicalCellGroupConfig and the default PCell configuration information and zero or one or more default SCell configuration information.

The RadioBearerConfig is used to add signalling radio bearers and data radio bearers. The RadioBearerConfig includes zero or one or more SRB configuration and zero or one or more DRB configuration. The SRB configuration includes a SRB identity and a PDCP-Config. The DRB configuration includes a DRB identity and a PDCP-Config.

The PDCP-Config is used to set the configurable PDCP parameters. The PDCP-Config includes IEs such as a parameter for the size of PDCP sequence number field and a parameter for the length of discard timer.

The RLC-BearerConfig is used to configure an RLC entity and a corresponding logical channel in MAC and the linking to a PDCP entity.

The RLC-BearerConfig includes a first identity and a second identity and a RLC-Config and a LogicalChannel-Config.

The first identity is a logical channel identity. The second identity is either a SRB identity or a DRB identity.

The RLC-Config is used to specify the RLC configuration. The RLC-Config includes IEs such as parameter for the size of the RLC sequence number field and the length of reassembly timer.

The LogicalChannelConfig is used to configure the logical channel parameters. The LogicalChannelConfig includes IEs such as a parameter for priority and a parameter for prioritized bit rate and parameters for logical channel restrictions.

The MAC-CellGroupConfig is used to configure MAC parameters for a cell group (or mobility group, including DRX. The mac-CellGroupConfig includes a bsr-Config and a phr-Config and a drx-Config and other IEs.

The BSR-Config is used to configure buffer status reporting. The BSR-Config includes a parameter for periodic timer length and a parameter for retransmission timer length.

The DRX-Config is used to configure DRX related parameters. The DRX-Config includes parameters for DRX timers and a parameter for time domain offset.

The PHR-Config is used to configure parameters for power headroom reporting. The PHR-Config includes parameters for timers and a parameter for a format (i.e., single entry PHR format or multi entry PHR format.

The IE PhysicalCellGroupConfig is used to configure cell-group specific L1 parameters. The physicalCellGroup-Config includes IEs such as a tpc-SRS-RNTI field and a tpc-PUCCH-RNTI field and a tpc-PUSCH-RNTI field and a cs-RNTI field and a mes-C-RNTI field and a p-UE-FR1 field and a p-NR-FR1 field.

The cs-RNTI field contains a RNTI value for downlink SPS and uplink configured grant.

The p-NR-FR1 field indicates the maximum total transmit power to be used by the terminal in this NR cell group (and in this mobility group) across all serving cells in frequency range 1 (FR1).

The p-UE-FR1 field indicates the maximum total transmit power to be used by the terminal across all serving cells in frequency range 1 (FR1) across all cell groups.

The tpc-PUCCH-RNTI field contains a RNTI used for PUCCH TPC commands on DCI.

The tpc-PUSCH-RNTI field contains RNTI used for PUSCH TPC commands on DCI.

The tpc-SRS-RNTI field contains RNTI used for SRS TPC commands on DCI.

The default PCell configuration information includes a servingCellConfig and a servingCellConfigCommon and a SSB-MTC for the default PCell.

The default SCell configuration information includes a servingCellConfig and a servingCellConfigCommon and a SSB-MTC for the default SCell.

The ServingCellConfig is used to configure the terminal with a serving cell.

The ServingCellConfig includes terminal specific parameters and cell specific parameters.

The ServingCellConfig includes the configuration information for additional band width parts.

The terminal specific parameters comprise a csi-MeasConfig.

The ServingCellConfigCommon is used to configure cell specific parameters of a terminal's serving cell.

The servingCellConfigCommon includes parameters such as a ssb-PositionsInBurst and a SubcarrierSpacing and other IEs.

The ssb-PositionsInBurst indicates the time domain positions of the transmitted SS-blocks in a half frame with SS/PBCH blocks. The first/leftmost bit corresponds to SS/PBCH block index 0 and the second bit corresponds to SS/PBCH block index 1 and so on. Value 0 in the bitmap indicates that the corresponding SS/PBCH block is not transmitted while value 1 indicates that the corresponding SS/PBCH block is transmitted.

The SubcarrierSpacing indicates the subcarrier spacing of SSB in the initial BWP.

The SSB-MTC is used to configure measurement timing configurations, i.e., timing occasions at which the terminal measures SSBs.

The SSB-MTC includes a periodicity AndOffset and a duration. The duration indicates duration of the measurement window in which to receive SS/PBCH blocks. The periodicity AndOffset indicates periodicity and offset of the measurement window in which to receive SS/PBCH blocks.

Terminal receives, from a first base station, a first RRCReconfiguration.

/The first RRCReconfiguration includes:

//a information related to a first type mobility; and

///the first type mobility is triggered by a RRC message

///the first type mobility causes L1 synchronization to a cell different from the current cell and L2 reset //a serving cell configuration for a first cell; and //a first configuration and a third configuration; and //a first C-RNTI The first RRCReconfiguration is a RRCReconfiguration1.

Terminal receives, from the first base station, a second RRCReconfiguration.

/The second RRCReconfiguration includes:

//a information related to a second type mobility; and

///the second type mobility is triggered by a MAC CE

///the second type mobility causes L1 synchronization to a cell different from the current cell without L2 reset //a serving cell configuration for a second cell; and //a second configuration; and //optionally a second C-RNTI The second RRCReconfiguration is a RRCReconfiguration2.

Terminal receives a downlink signal and transmits an uplink signal in the second cell based on the third configuration and the second configuration during a second period.

Terminal receives the downlink signal and transmits the uplink signal in the first cell based on the third configuration and the first configuration during a first period and during a third period.

The first MAC CE and the second MAC CE includes a first field and a second field and a third field.

/The first field indicates information related to the target cell

/The second field indicates information related to random access procedure

/The third field indicates a BWP and a TCI state

The first MAC CE is received in the second cell and the second MAC CE is received in the first cell.

The first MAC CE instructs the second type mobility to the first cell and the second MAC CE instructs the second type mobility to the second cell.

The first field of the first MAC CE is set to a value related to the first cell and the first field of the second MAC CE is set to a value related to the second cell.

The first period is after reception of a first MAC CE and before reception of a second MAC CE.

The second period is during the second period (after reception of the second MAC CE and before reception of the first MAC CE).

The third period is after reception of the first MAC CE and before reception of the second MAC CE.

The downlink signal is PDSCH.

The third configuration includes a PDCP configuration.

The first configuration includes a PDSCH-config of a first BWP of the first cell.

/The first BWP is the last active DL BWP of the first cell or the first BWP is indicated in the first MAC CE.

The second configuration includes a PDSCH-config of a second BWP of the second cell.

/The second BWP is indicated in the second MAC CE.

The terminal receives the downlink signal in the second cell based on one or more TCI states in the second configuration during the second period The terminal receives the downlink signal in the first cell based on one or more TCI states in the first configuration during the first period and the third period.

The terminal receives the downlink signal in an active DL BWP in the second cell based on dataScramblingIdentityPDSCH in the PDSCH-config of the active DL BWP of the second cell during the second period.

The terminal receives the downlink signal in an active DL BWP in the first cell based on dataScramblingIdentityPDSCH in the PDSCH-config of the active DL BWP of the first cell during the first period and the third period.

The terminal receives the downlink signal in an active DL BWP in the second cell based on a second dataScramblingIdentityPDSCH during the second period.

The second dataScramblingIdentityPDSCH is one of one or more dataScramblingIdentityPDSCH included in the second configuration.

The second configuration includes one or more PDSCH-configs.

Each of one or more PDSCH-configs corresponds to a DL BWP and includes a dataScramblingIdentityPDSCH.

The second dataScramblingIdentityPDSCH is the one included in the PDSCH-config of the active DL BWP of the second configuration.

The terminal receives the downlink signal in an active DL BWP in the first cell based on a first dataScramblingIdentityPDSCH during the first period and the third period.

The first dataScramblingIdentityPDSCH is one of one or more dataScramblingIdentityPDSCH included in the first configuration.

The first configuration includes one or more PDSCH-configs.

Each of one or more PDSCH-configs corresponds to a DL BWP and includes a dataScramblingIdentityPDSCH.

The first dataScramblingIdentityPDSCH is the one included in the PDSCH-config of the active DL BWP of the first configuration.

If maxMIMO-Layers IE is present in the PDSCH-config of the active DL BWP of the second cell, the terminal receives the downlink signal in the active DL BWP in the second cell based on maxMIMO-Layers in the PDSCH-config of the DL BWP of the second cell during the second period.

If maxMIMO-Layers IE is not present in the PDSCH-config of the active DL BWP of the second cell, the terminal receives the downlink signal in the active DL BWP in the second cell based on maxMIMO-Layers in the PDSCH-ServingCellConfig of the second cell during the second period.

If maxMIMO-Layers IE is present in the PDSCH-config of the active DL BWP of the first cell, the terminal receives the downlink signal in the active DL BWP in the first cell based on maxMIMO-Layers in the PDSCH-config of the DL BWP of the first cell during the first period and the third period.

If maxMIMO-Layers IE is not present in the PDSCH-config of the active DL BWP of the first cell, the terminal receives the downlink signal in the active DL BWP in the first cell based on maxMIMO-Layers in the PDSCH-ServingCellConfig of the first cell during the first period and the third period.

If second maxMIMO-Layers IE is present in the second configuration, the terminal receives the downlink signal in the active DL BWP in the second cell based on the second maxMIMO-Layers1 during the second period.

If second maxMIMO-Layers1 IE is not present in the second configuration, the terminal receives the downlink signal in the active DL BWP in the second cell based on second maxMIMO-Layers2 of the second configuration during the second period.

The second maxMIMO-Layers1 is one of one or more maxMIMO-LayersIs included in the second configuration.

The second maxMIMO-Layers1 is the one included in the PDSCH-config of the active DL BWP of the second cell of the second configuration.

The second maxMIMO-Layers2 is one of one or more maxMIMO-Layers2s included in the second configuration.

The second maxMIMO-Layers2 is the one included in the PDSCH-ServingCellConfig of the second cell of the second configuration.

If first maxMIMO-Layers1 IE is present in the first configuration, the terminal receives the downlink signal in the active DL BWP in the first cell based on the first maxMIMO-Layers1 during the first period and the third period.

If first maxMIMO-Layers1 IE is not present in the first configuration, the terminal receives the downlink signal in the active DL BWP in the first cell based on first maxMIMO-Layers2 of the first configuration during the first period and the third period.

The first maxMIMO-Layers1 is one of one or more maxMIMO-Layers1s included in the first configuration.

The first maxMIMO-Layers1 is the one included in the PDSCH-config of the active DL BWP of the first cell of the first configuration.

The first maxMIMO-Layers2 is one of one or more maxMIMO-Layers2s included in the first configuration.

The first maxMIMO-Layers2 is the one included in the PDSCH-ServingCellConfig of the first cell of the first configuration.

The uplink signal is PUSCH

The third configuration includes a PDCP configuration

The first configuration includes a PUSCH-config of a first UL BWP of the first cell and a PDSCH-Config of a first DL BWP of the first cell.

The first configuration includes one or more PUSCH-Config and one or more PDSCH-Config.

Each of one or more PUSCH-Config corresponds to a UL BWP.

Each of one or more PDSCH-Config corresponds to a DL BWP.

/The first UL BWP is the last active UL BWP of the first cell or the first UL BWP is the one indicated in the first MAC CE.

/The first DL BWP is the last active DL BWP of the first cell or the first DL BWP is the one indicated in the first MAC CE.

The second configuration includes a PUSCH-config of a second UL BWP of the second cell and a PDSCH-Config of a second DL BWP of the second cell.

The second configuration includes one or more PUSCH-Config and one or more P DSCH-Config.

Each of one or more PUSCH-Config corresponds to a UL BWP.

Each of one or more PDSCH-Config corresponds to a DL BWP.

/The second UL BWP and the second DL BWP are those indicated in the second MAC CE.

The terminal transmits the uplink signal in the first cell based on one or more TCI states in the first PDSCH-config and based on an offset determined from the first PUSCH-Config in the first configuration during the first period and the third period.

/The first PDSCH-Config is the PDSCH configuration of the first downlink BWP of the first cell.

/The first PUSCH-Config is the PUSCH configuration of the first uplink BWP of the first cell.

/The first PDSCH-Config and the first PUSCH-Config are included in the first configuration.

The terminal transmits the uplink signal in the second cell based on one or more TCI states in the second PDSCH-config and based on an offset determined from the second PUSCH-Config in the second configuration during the second period.

/The second PDSCH-Config is the PDSCH configuration of the second downlink BWP of the second cell.

/The second PUSCH-Config is the PUSCH configuration of the second uplink BWP of the second cell.

/The second PDSCH-Config and the second PUSCH-Config are included in the second configuration.

The terminal transmits the uplink signal in a first uplink BWP in the first cell based on a first n_RNTI and a first n_ID during the first period and the third period.

/The first n_RNTI is the first C-RNTI (or default C-RNTI that was allocated in the first RRCReconfiguration message).

/The first RRCReconfiguration message is RRCReconfiguration1.

/The first n_ID is a first dataScramblingIdentityPUSCH if the first dataScrambling IdentityPUSCH is indicated in the PUSCH-Config in the first RRCReconfiguration message.

/The first n_ID is PCI of the first cell if the first dataScramblingIdentityPUSCH is not indicated in the first PUSCH-Config in the first RRCReconfiguration message.

/The first PUSCH-Config is the PUSCH configuration of the first uplink BWP of the first cell.

/The first PUSCH-Config and the first C-RNTI and the PCI of the first cell are included in the first configuration.

/The first configuration includes one or more PUSCH-Config and one or more PCIs and a single first C-RNTI.

/One of one or more PUSCH-Config corresponds to an UL BWP. One of one or more PCI corresponds to a serving cell.

The terminal transmits the uplink signal in a second uplink BWP in the second cell based on a second n_RNTI and a second n_ID during the second period.

/The second n_RNTI is the second C-RNTI (or additional C-RNTI) that was allocated (or included or indicated) in the second RRCReconfiguration message.

/The second n_RNTI equals the first n_RNTI if the second C-RNTI is not allocated (or if the second C-RNTI is not allocated or included or indicated in the second RRCReconfiguration message).

/The second RRCReconfiguration message is RRCReconfiguration2.

/The second n_ID is a second dataScramblingIdentity-PUSCH if the second dataScramblingIdentityPUSCH is indicated in the second PUSCH-Config in the second RRCReconfiguration message.

/The second n_ID is PCI of the second cell if the second dataScramblingIdentityPUSCH is not indicated in the second PUSCH-Config in the second RRCReconfiguration message.

//The second PUSCH-Config is the PUSCH configuration of the second uplink BWP of the second cell.

//The second PUSCH-Config and the second C-RNTI and the PCI of the second cell are included in the second configuration.

/The second configuration includes one or more PUSCH-Config and one or more PCIs and a single second C-RNTI or a single first C-RNTI.

/Each of one or more PUSCH-Config corresponds to an UL BWP. Each of one or more PCI corresponds to a serving cell.

The downlink signal is PDCCH

The third configuration includes a PDCP configuration

The first configuration includes a PDCCH-config for a first DL BWP of the first cell.

/The first DL BWP is the last active DL BWP of the first cell or the first DL BWP is the one indicated in the first MAC CE.

The second configuration includes a PDCCH-config for a second DL BWP of the second cell.

/The second DL BWP is the last active DL BWP of the second cell or the second DL BWP is indicated in the second MAC CE.

The PDCCH-config for a BWP includes at least one SearchSpace and at least one CORESET The terminal receives the downlink signal in the first cell based on SearchSpace and CORESET in the first configuration during the first period and the third period.

The terminal receives the downlink signal in the first cell based on the first C-RNTI.

The terminal receives the downlink signal in the second cell based on SearchSpace and CORESET in the second configuration during the second period.

The terminal receives the downlink signal in the second cell based on the first C-RNTI if the second C-RNTI is not included in (or indicated in or configured by) the second RRCReconfiguration.

The terminal receives the downlink signal in the second cell based on the second C-RNTI if the second C-RNTI is included in (or indicated in or configured by) the second RRCReconfiguration.

The first configuration includes one or more PDCCH-Config and a C-RNTI.

Each of one or more PDCCH-Config corresponds to a DL BWP and includes one or more SearchSpace and one or more CORESET.

The first SearchSpace is, among one or more SearchSpace in the first configuration, the one associated with the first DL BWP.

The first CORESET is, among one or more CORESET in the first configuration, the one associated with the first DL BWP.

The second configuration includes one or more PDCCH-Config and optionally a C-RNTI.

Each of one or more PDCCH-Config corresponds to a DL BWP and includes one or more SearchSpace and one or more CORESET.

The second SearchSpace is, among one or more SearchSpace in the second configuration, the one associated with the second DL BWP.

The second CORESET is, among one or more CORESET in the second configuration, the one associated with the second DL BWP.

The uplink signal is PUCCH

The third configuration includes a PDCP configuration

The first configuration includes a PUCCH-config for a first UL BWP of the first cell and a CSI-MeasConfig of the first cell.

/The first UL BWP is the last active UL BWP of the first cell or the first UL BWP is the one indicated in the first MAC CE.

The second configuration includes a PUCCH-config for a second UL BWP of the second cell and a CSI-MeasConfig of the second cell.

/The second UL BWP is indicated in the second MAC CE.

The terminal transmits the uplink signal in the first cell based on the PUCCH-config of the first UL BWP and the CSI-MeasConfig of the first cell (or based on PUCCH-config and CSI-MeasConfig in the first configuration during the first period and the third period.

/The terminal transmits the uplink signal in the first cell based on one or more spatialRelationInfo in the first PUCCH-config.

/The terminal transmits in the first cell the uplink signal in a resource associated with a first resource ID.

//The first resource ID is indicated in the first PUCCH-config.

//The resource associated with the first resource ID is indicated in the first CSI-MeasConfig.

The terminal transmits the uplink signal in the second cell based on the PUCCH-config of the second UL BWP and the CSI-MeasConfig of the second cell (or based on PUCCH-config and CSI-MeasConfig in the second configuration) during the second period.

/The terminal transmits the uplink signal in the second cell based on one or more spatialRelationInfo in the second PUCCH-config.

/The terminal transmits in the second cell the uplink signal in a resource associated with a second resource ID.

//The second resource ID is indicated in the second PUCCH-config.

//The resource associated with the second resource ID is indicated in the second CSI-MeasConfig.

The first configuration includes one or more PUCCH-Config and one or more CSI-MeasConfig.

Each of one or more PUCCH-Config corresponds to a UL BWP

Each of one or more PUCCH-Config includes a resource ID and one or more spatialRelationInfo.

Each of one of more CSI-MeasConfig corresponds to a serving cell.

Each of one or more CSI-MeasConfig includes one or more resource information.

The first PUCCH-Config is, among one or more PUCCH-Config in the first configuration, the one associated with the first UL BWP of the first cell.

The first CSI-MeasConfig is, among one or more CSI-MeasConfig in the first configuration, the one associated with the first cell.

The second configuration includes one or more PUCCH-Config and one or more CSI-MeasConfig.

Each of one or more PUCCH-Config corresponds to a UL BWP.

Each of one or more PUCCH-Config includes a resource ID and one or more spatialRelationInfo.

Each of one of more CSI-MeasConfig corresponds to a serving cell.

Each of one or more CSI-MeasConfig includes one or more resource information.

The second PUCCH-Config is, among one or more PUCCH-Config in the second configuration, the one associated with the second UL BWP of the second cell.

The second CSI-MeasConfig is, among one or more CSI-MeasConfig in the second configuration, the one associated with the second cell.

The uplink signal is SR

The third configuration includes a PDCP configuration

The first configuration includes a PUCCH-config for a first UL BWP of the first cell and a mac-CellGroupConfig of the default mobility group.

/The first UL BWP is the last active UL BWP of the first cell or the first UL BWP is the one indicated in the first MAC CE.

/The first cell is a default PCell.

/The mac-CellGroupConfig of the default mobility group includes one or more SR configurations.

//Each of one or more SR configurations includes an identifier1 (SchedulingRequestId) and a first timer value (sr-ProhibitTimer) and a first counter value (sr-TransMax).

/The PUCCH-Config of the first UL BWP includes one or more SR resource configurations.

//Each of one or more SR resource configurations includes an identifier2 (schedulingRequestResourceId) and an identifier1 (SchedulingRequestId) and an identifier3 (pucch-ResourceId) and a parameter representing periodicity and offset in number of symbols or slots.

The second configuration includes a PUCCH-config for a second UL BWP of the second cell and a mac-CellGroupConfig of the additional mobility group.

/The second UL BWP is indicated in the second MAC CE.

/The second cell is an additional PCell.

/The mac-CellGroupConfig of the additional mobility group includes one or more SR configurations.

//Each of one or more SR configurations includes an identifier1 (SchedulingRequestId) and a first timer value (sr-ProhibitTimer) and a first counter value (sr-TransMax).

/The PUCCH-Config of the second UL BWP includes one or more SR resource configurations.

//Each of one or more SR resource configurations includes an identifier2 (schedulingRequestResourceId) and an identifier1 (SchedulingRequestId) and an identifier3 (pucch-ResourceId) and a parameter representing periodicity and offset in number of symbols or slots.

The first configuration is included in the first RRCReconfiguration message.

The second configuration is included in the second RRCReconfiguration message.

The first RRCReconfiguration message is a RRCReconfiguration1.

The second RRCReconfiguration message is a RRCReconfiguration2.

The terminal transmits the uplink signal in the first cell based on the PUCCH-config of the first UL BWP and the a mac-CellGroupConfig of the dmg during the first period and the third period.

/The terminal transmits the uplink signal in the first cell based on one or more spatialRelationInfo in the PUCCH-config.

/The terminal determines the resource for the uplink signal based on the identifier1 indicated in a SR configuration of the mac-CellGroupConfig and the identifier1 and the identifier3 indicated in a SR resource configuration of the PUCCH-Config //The mac-CellGroupConfig and the PUCCH-Config are those included in the first configuration.

//One mac-CellGroupConfig and one or more PUCCH-Config are included in the first configuration (in the first RRCReconfiguration)

//Each PUCCH-Config is the PUCCH configuration of an UL BWP of default PCell or a default SCell.

//The PUCCH-Config is the PUCCH configuration of the first UL BWP of default PCell The terminal transmits the uplink signal in the second cell based on the PUCCH-config of the second UL BWP and the a mac-CellGroupConfig of the amg during the second period.

/The terminal transmits the uplink signal in the second cell based on one or more spatialRelationInfo in the PUCCH-config.

/The terminal determines the resource for the uplink signal based on the identifier indicated in a SR configuration of the mac-CellGroupConfig and the identifier1 and the identifier3 indicated in a SR resource configuration of the PUCCH-Config //The mac-CellGroupConfig and the PUCCH-Config are those included in the second configuration.

//One mac-CellGroupConfig and one or more PUCCH-Config are included in the second configuration (in the second RRCReconfiguration)

//Each PUCCH-Config is the PUCCH configuration of an UL BWP of additional PCell or an additional SCell.

//The PUCCH-Config is the PUCCH configuration of the second UL BWP of additional PCell The terminal is configured with, for each mobility group, h SR configurations and j SR resource configurations and k PUCCH resource configurations and m serving cells and n UL BWPs. h and j and k are integers equal to or greater than zero. m and n are integers equal to or greater than one. h and j and k and m and n can be different from or equal to each other.

Each of h SR configurations consists of an identifier1 (SchedulingRequestId) and a first timer value (sr-Prohibit-Timer) and a first counter value (sr-TransMax).

Each of h SR configurations is applied to the terminal in one or more UL BWPs. Each of j SR resource configurations is applied to the terminal in an UL BWP associated with the SR resource configuration. Each of k PUCCH resource configurations is applied to the terminal in an UL BWP associated with the PUCCH resource configuration.

The one or more UL BWP is the SpCell's UL BWP for which at least one SR resource configuration is configured.

The UL BWP associated with a SR resource configuration is the UL BWP for which the SR resource configuration is configured.

The UL BWP associated with PUCCH resource configuration is the UL BWP for which the PUCCH resource configuration is configured.

Each of m SR resource configurations consists of an identifier2 (schedulingRequestResourceId) and an identifier1 (SchedulingRequestId) and an identifier3 (pucch-ResourceId) and a parameter representing periodicity and offset in number of symbols or slots.

A SR resource configuration and a SR configuration are associated with each other if they have a same identifier1.

A SR configuration is associated with a PUCCH resource configuration if the PUCCH resource configuration is indicated in the associated SR resource configuration.

A first RRCReconfiguration message includes a CellGroupConfig for dmg.

A second RRCReconfiguration message includes a CellGroupConfig for amg.

A CellGroupConfig includes a mac-CellGroupConfig and one or more ServingCellConfig.

A ServingCellConfig includes one or more BWP-UplinkDedicated.

A SR configuration is included in mac-CellGroupConfig in CellGroupConfig.

A PUCCH-Config is included in a BWP-UplinkDedicated.

A PUCCH-Config includes zero or more SR resource configurations and zero or more PUCCH-Resource configurations.

A SR resource configuration is included in a PUCCH-Config in a BWP-UplinkDedicated in a ServingCellConfig in a CellGroupConfig.

A PUCCH-resource configuration is included in a PUCCH-Config in a BWP-UplinkDedicated in a ServingCellConfig in a CellGroupConfig.

Terminal transmits a SR on PUCCH resource determined based on the identifier1 and the identifier2 and the identifier3.

The uplink signal is SRS

The third configuration includes a PDCP configuration

The first configuration includes a SRS-config for a first UL BWP of the first cell and a PDSCH-config for a first DL BWP.

/The first UL BWP is the last active UL BWP of the first cell or the first UL BWP is the one indicated in the first MAC CE.

/The first DL BWP is the last active DL BWP of the first cell or the first DL BWP is the one indicated in the first MAC CE.

The second configuration includes a SRS-config for a second UL BWP of the second cell and a PDSCH-config for a second DL BWP.

/The second UL BWP and the second DL BWP are indicated in the second MAC CE.

The terminal transmits the uplink signal in the first cell based on the SRS-config of the first UL BWP during the first period and the third period, if the SRS-config in the first configuration does not include a followUnifiedTCIstateSRS.

/The terminal transmits in the first cell the uplink signal based on one or more spatialRelationInfo in the SRS-config of the first DL BWP of the first cell.

/The terminal transmits in the first cell the uplink signal in a resource indicated in the SRS-Config of the first UL BWP of the first cell.

The terminal transmits the uplink signal in the second cell based on the SRS-config of the second UL BWP during the second period if the SRS-config in the second configuration does not include a follow UnifiedTCIstateSRS.

/The terminal transmits the uplink signal in the second cell based on one or more spatialRelationInfo in the SRS-config of the second UL BWP of the second cell/The terminal transmits in the first cell the uplink signal in a resource indicated in the SRS-Config of the second UL BWP of the second cell.

The terminal transmits the uplink signal in the first cell based on the SRS-config of the first UL BWP of the first cell and the PDSCH-Config of the first DL BWP of the first cell during the first period and the third period, if the SRS-config includes a follow UnifiedTCIstateSRS.

/The terminal transmits the uplink signal in the first cell based on one or more TCI states in the PDSCH-config of the first DL BWP of the first cell.

/The terminal transmits in the first cell the uplink signal in a resource indicated in the SRS-Config of the first UL BWP of the first cell.

The terminal transmits the uplink signal in the second cell based on the SRS-config of the second UL BWP of the second cell and the PDSCH-Config of the second DL BWP of the second cell, if the SRS-config includes a follow UnifiedTCIstateSRS.

/The terminal transmits the uplink signal in the second cell based on one or more TCI states in the PDSCH-config of the second DL BWP of the second cell.

/The terminal transmits in the first cell the uplink signal in a resource indicated in the SRS-Config of the second UL BWP of the second cell.

The uplink signal is PUSCH

The third configuration includes a PDCP configuration

The first configuration includes a PUSCH-config of a first UL BWP of the first cell and a PCI of the first cell and a first C-RNTI.

/The first UL BWP is the last active UL BWP of the first cell or the first UL BWP is the one indicated in the first MAC CE.

/The PCI of the first cell is included in the serving cell configuration of the first cell.

The second configuration includes a PUSCH-config of a second UL BWP of the second cell and a PCI of the second cell and a second C-RNTI.

/The second UL BWP is indicated in the second MAC CE.

/The PCI of the second cell is included in the serving cell configuration of the second cell.

The terminal transmits the uplink signal in the first cell based on a first scrambling sequence during the first period and the third period.

/The first scrambling sequence is generated based on the first C-RNTI and a first dataScramblingIdentityPUSCH if the first dataScramblingIdentityPUSCH is included in the PUSCH-Config of the first UL BWP of the first cell /The first scrambling sequence is generated based on the first C-RNTI and the PCI of the first cell if the first dataScramblingIdentityPUSCH is not included in the PUSCH-Config of the first UL BWP of the first cell The terminal transmits the uplink signal in the second cell based on a second scram bling sequence during the second period.

/The second scrambling sequence is generated based on the second C-RNTI and a second dataScramblingIdentity-PUSCH if the second dataScramblingIdentityPUSCH is included in the PUSCH-Config of the second UL BWP of the second cell and the second C-RNTI is included in the second RRCReconfiguration /The second scrambling sequence is generated based on the second C-RNTI and the PCI of the second cell if the second dataScramblingIdentityPUSCH is not included in the PUSCH-Config of the second UL BWP of the second cell and the second C-RNTI is included in the second RRCReconfiguration /The second scrambling sequence is generated based on the first C-RNTI and a second dataScramblingIdentity-PUSCH if the second dataScramblingIdentityPUSCH is included in the PUSCH-Config of the second UL BWP of the second cell and the second C-RNTI is not included in the second RRCReconfiguration /The second scrambling sequence is generated based on the first C-RNTI and the PCI of the second cell if the second dataScramblingIdentityPUSCH is not included in the PUSCH-Config of the second UL BWP of the second cell and the second C-RNTI is not included in the second RRCReconfiguration The terminal receives from the base station a first RRCReconfiguration.

/The first RRCReconfiguration includes a PDCP-Config for a DRB and a default RLC-BearerConfig and a default MAC-MainConfig. The first RRCReconfiguration is RRCReconfiguration1.

The terminal establishes a PDCP entity for a DRB in accordance with the PDCP-Config included in the first RRCReconfiguration.

The terminal establishes a default RLC entity in accordance with a default RLC-BearerConfig included in the first RRCReconfiguration.

The terminal configures a default MAC entity with a default logical channel in accordance with the default RLC-BearerConfig included in the first RRCReconfiguration.

The terminal associates the default logical channel with the PDCP entity of the DRB in accordance with the default RLC-BearerConfig included in the first RRCReconfiguration.

The terminal performs transmission and reception of PDCP PDUs of the DRB via the default RLC entity and the default logical channel and the default MAC entity.

The terminal receives from the base station a second RRCReconfiguration.

/The second RRCReconfiguration includes an additional RLC-BearerConfig for the DRB and an additional MAC-MainConfig.

The terminal creates an additional MAC entity with the same configuration as the default MAC entity (in accordance with the default MAC-MainConfig) and reconfigures the MAC main configuration for the additional MAC entity in accordance with the received additional MAC-CellGroup-Config if L2mobilityConfig is included in (or indicated in or configured by) the second RRCReconfiguration (or if the second RRCReconfiguration is a RRCReconfiguration2).

The terminal reconfigures the MAC main configuration for the default MAC entity in accordance with the received additional MAC-CellGroupConfig if L2mobilityConfig is not included in (or not indicated in or not configured by) the second RRCReconfiguration (or if the second RRCReconfiguration is not a RRCReconfiguration2).

The terminal establishes an additional RLC entity for the DRB with the same configuration as the default RLC entity (in accordance with the default RLC-BearerConfig and reconfigures the additional RLC entity in accordance with the received additional RLC-BearerConfig if L2mobilityConfig is included in (or indicated in or configured by) the second RRCReconfiguration (or if the second RRCReconfiguration is a RRCReconfiguration2).

The terminal reconfigures the default RLC entity in accordance with the received additional RLC-BearerConfig if L2mobilityConfig is not included in (or indicated in or configured by) the second RRCReconfiguration (or if the second RRCReconfiguration is not a RRCReconfiguration2).

The terminal establishes an additional logical channel with the same configuration as the default logical channel and reconfigures the additional logical channel in accordance with the received additional MAC-LogicalChannel-Config in the second RRCReconfiguration if L2mobilityConfig is included in (or indicated in or configured by) the second RRCReconfiguration (or if the second RRCReconfiguration is a RRCReconfiguration2).

The terminal reconfigures the default logical channel in accordance with the received additional MAC-LogicalChannelConfig in the second RRCReconfiguration if L2mobilityConfig is not included in (or indicated in or configured by) the second RRCReconfiguration (or if the second RRCReconfiguration is not a RRCReconfiguration2).

The terminal performs transmission and reception of PDCP PDUs of the DRB via the additional RLC entity and the additional logical channel and the additional MAC entity during the second period and via the default RLC entity and the default logical channel and the default MAC entity during the first period and the third period.

The terminal performs buffer status reporting based on the BSR-Config in the MAC-CellGroupConfig in the first RRCReconfiguration during the first period and the third period.

The terminal performs buffer status reporting based on the BSR-Config in the MAC-CellGroupConfig in the second RRCReconfiguration during the second period.

If a second MAC CE is received, the terminal stops buffer status reporting based on the BSR-Config in the MAC-CellGroupConfig in the first RRCReconfiguration and starts buffer status reporting based on the BSR-Config in the MAC-CellGroupConfig in the second RRCReconfiguration.

If a first MAC CE is received, the terminal stops buffer status reporting based on the BSR-Config in the MAC-CellGroupConfig in the second RRCReconfiguration and starts buffer status reporting based on the BSR-Config in the MAC-CellGroupConfig in the first RRCReconfiguration.

If a second MAC CE is received, the terminal triggers BSR based on the BSR-Config in the MAC-CellGroupConfig in the second RRCReconfiguration.

If a first MAC CE is received, the terminal triggers BSR based on the BSR-Config in the MAC-CellGroupConfig in the first RRCReconfiguration.

The terminal performs power headroom reporting based on the PHR-Config in the MAC-CellGroupConfig in the first RRCReconfiguration during the first period and the third period.

The terminal performs power headroom reporting based on the PHR-Config in the MAC-CellGroupConfig in the second RRCReconfiguration during the second period.

If a second MAC CE is received, the terminal stops power headroom reporting based on the PHR-Config in the MAC-CellGroupConfig in the first RRCReconfiguration and starts power headroom reporting based on the PHR-Config in the MAC-CellGroupConfig in the second RRCReconfiguration.

If a first MAC CE is received, the terminal stops power headroom reporting based on the PHR-Config in the MAC-CellGroupConfig in the second RRCReconfiguration and starts power headroom reporting based on the PHR-Config in the MAC-CellGroupConfig in the first RRCReconfiguration.

If a second MAC CE is received, the terminal triggers PHR based on the PHR-Config in the MAC-CellGroupConfig in the second RRCReconfiguration.

If a first MAC CE is received, the terminal triggers PHR based on the PHR-Config in the MAC-CellGroupConfig in the first RRCReconfiguration.

The terminal performs DRX operation based on the DRX-Config in the MAC-CellGroupConfig in the first RRCReconfiguration during the first period and the third period.

The terminal performs DRX operation based on the DRX-Config in the MAC-CellGroupConfig in the second RRCReconfiguration during the second period.

If a second MAC CE is received, the terminal stops DRX operation based on the DRX-Config in the MAC-CellGroupConfig in the first RRCReconfiguration and starts DRX operation based on the DRX-Config in the MAC-CellGroupConfig in the second RRCReconfiguration.

If a first MAC CE is received, the terminal stops DRX operation based on the DRX-Config in the MAC-CellGroupConfig in the second RRCReconfiguration and starts DRX operation based on the DRX-Config in the MAC-CellGroupConfig in the first RRCReconfiguration.

The terminal receives PUCCH TPC commands on DCI based on tpc-PUCCH-RNTI in the PhysicalCellGroupConfig in the first RRCReconfiguration during the first period and the third period.

The terminal receives PUCCH TPC commands on DCI based on tpc-PUCCH-RNTI in the PhysicalCellGroupConfig in the second RRCReconfiguration during the second period.

If a second MAC CE is received, the terminal stops using tpc-PUCCH-RNTI in the PhysicalCellGroupConfig in the first RRCReconfiguration and starts using tpc-PUCCH-RNTI in the PhysicalCellGroupConfig in the second RRCReconfiguration.

If a first MAC CE is received, the terminal stops using tpc-PUCCH-RNTI in the PhysicalCellGroupConfig in the second RRCReconfiguration and starts using tpc-PUCCH-RNTI in the PhysicalCellGroupConfig in the first RRCReconfiguration.

The terminal receives PUCCH TPC commands on DCI based on tpc-SRS-RNTI in the PhysicalCellGroupConfig in the first RRCReconfiguration during the first period and the third period.

The terminal receives PUCCH TPC commands on DCI based on tpc-SRS-RNTI in the PhysicalCellGroupConfig in the second RRCReconfiguration during the second period.

If a second MAC CE is received, the terminal stops using tpc-SRS-RNTI in the PhysicalCellGroupConfig in the first RRCReconfiguration and starts using tpc-SRS-RNTI in the PhysicalCellGroupConfig in the second RRCReconfiguration.

If a first MAC CE is received, the terminal stops using tpc-SRS-RNTI in the PhysicalCellGroupConfig in the second RRCReconfiguration and starts using tpc-SRS-RNTI in the PhysicalCellGroupConfig in the first RRCReconfiguration.

The terminal receives PUCCH TPC commands on DCI based on tpc-PUSCH-RNTI in the PhysicalCellGroupConfig in the first RRCReconfiguration during the first period and the third period.

The terminal receives PUCCH TPC commands on DCI based on tpc-PUSCH-RNTI in the PhysicalCellGroupConfig in the second RRCReconfiguration during the second period.

If a second MAC CE is received, the terminal stops using tpc-PUSCH-RNTI in the PhysicalCellGroupConfig in the first RRCReconfiguration and starts using tpc-PUSCH-RNTI in the PhysicalCellGroupConfig in the second RRCReconfiguration.

If a first MAC CE is received, the terminal stops using tpc-PUSCH-RNTI in the PhysicalCellGroupConfig in the second RRCReconfiguration and starts using tpc-PUSCH-RNTI in the PhysicalCellGroupConfig in the first RRCReconfiguration.

The first period and the second period and the third period are consecutive in time domain. The first period and the second period and the third period do not overlap with each other in time domain. The first period and the third period occur when a first MAC CE is received by the UE. The second period occurs when a second MAC CE is received by the UE.

The default mobility group includes a default PCell and zero or more default SCells.

The additional mobility group includes an additional PCell and zero or more additional SCells.

The terminal receives from the base station a first RRCReconfiguration.

/The first RRCReconfiguration includes a configuration information for the default mobility group.

//The configuration information for the default mobility group includes a serving cell configuration information for the default PCell and zero or more serving cell configuration information for the zero or more default SCell.

The terminal monitors a paging channel of the default PCell. The terminal acquires system information via the PDCCH and the PDSCH of the default PCell.

The terminal monitors Short Message transmitted with P-RNTI based on the search space and coreset of the default PCell.

/The search space is indicated by (configured by) SearchSpaceZero IE in ServingCellConfigCommon of the default PCell.

/The coreset is indicated by (configured by) ControlResourceSetZero IE in ServingCellConfigCommon of the default PCell.

The terminal monitors PDCCH of the default PCell and PDCCH of the activated default SCells to receive a DTCH packet or a DCCH packet.

The terminal transmits PUSCH on the default PCell and on the activated default SCells to deliver a DTCH packet or a DCCH packet to the base station.

The terminal receives from the base station a second RRCReconfiguration by receiving PDSCH of the default PCell or PDSCH of the activated default SCells.

/The second RRCReconfiguration includes a configuration information for an additional mobility group.

//The configuration information for the additional mobility group includes a serving cell configuration information for the additional PCell and zero or more serving cell configuration information for the zero or more additional SCells.

The terminal receives a MOBILITY_GROUP_SWITCH_REQUEST MAC CE by receiving PDSCH of the default PCell or PDSCH of an activated default SCell (or by receiving PDSCH of a active serving cell of the currently active mobility group).

/The MOBILITY_GROUP_SWITCH_REQUEST MAC CE includes a MOBILITY_GROUP_ID_FIELD and a RAMDOM_ACCESS_REQUIRED_FIELD and one or more TCI_STATE_FIELD_GROUP_FIELDs.

//The MOBILITY_GROUP_ID_FIELD indicates the identity of the mobility group for which the MAC CE applies. Value 0 corresponds to the default mobility group. Other values correspond to additional mobility groups.

//A TCI_STATE_FIELD_GROUP_FIELD includes a SERVING_CELL_ID_FIELD and a DL_BWP_ID_FIELD and a UL_BWP_ID_FIELD and one or two TCI_STATE_ID_FIELDs.

///The SERVING_CELL_ID_FIELD indicates the identity of the Serving Cell that are activated upon mobility group switching and for which the DL_BWP_ID_FIELD and the UL_BWP_ID_FIELD and one or two TCI_STATE_ID_FIELDs apply.

///The DL_BWP_ID_FIELD indicates a DL BWP that is first active upon mobility group switching and the DL BWP for which the corresponding TCI state applies. The UL_BWP_ID_FIELD indicates a UL BWP that is first active upon mobility group switching and the UL BWP for which the corresponding TCI state applies.

///If two TCI_STATE_ID_FIELDs are included, the first TCI_STATE_ID_FIELD indicates the TCI state of the DL BWP indicated by the DL_BWP_ID_FIELD and the second TCI_STATE_ID_FIELD indicates the TCI state of the UL BWP indicated by the UL_BWP_ID_FIELD.

///If a TCI_STATE_ID_FIELD is included, the TCI_STATE_ID_FIELD indicates the joint TCI state of the DL BWP indicated by the DL_BWP_ID_FIELD and the UL BWP indicated by the UL_BWP_ID_FIELD.

The terminal determines the serving cells to be activated upon mobility group switching based on the received MOBILITY_GROUP_SWITCH_REQUEST MAC CE.

The terminal determines, for each serving cell, the DL BWP to be activated upon mobility group switching based on the received MOBILITY_GROUP_SWITCH_REQUEST MAC CE.

The terminal determines, for each serving cell, the UL BWP to be activated upon mobility group switching based on the received MOBILITY_GROUP_SWITCH_REQUEST MAC CE.

The terminal determines, for each DL BWP, TCI state to be activated (or applied) for PDCCH monitoring upon mobility group switching based on the received MOBILITY_GROUP_SWITCH_REQUEST MAC CE.

The terminal determines, for each UL BWP, TCI state to be activated (or applied) for PUCCH transmission and SRS transmission upon mobility group switching based on the received MOBILITY_GROUP_SWITCH_REQUEST MAC CE.

The TCI state indicated by the TCI_STATE_ID_FIELD is associated with a reference signal of a serving cell s of a mobility group m. The mobility group m is indicated by MOBILITY_GROUP_ID_FIELD. The serving cell s is indicated by SERVING_CELL_ID_FIELD. The TCI_STATE_ID_FIELD indicates a TCI state in the PDSCH-Config of the serving cell indicated by SERVING_CELL_ID_FIELD.

The terminal switches to the mobility group indicated by the MOBILITY_GROUP_ID_FIELD of the MOBILITY_GROUP_SWITCH_REQUEST MAC CE.

The terminal deactivates the mobility group that was active before the reception of the MOBILITY_GROUP_SWITCH_REQUEST MAC CE at a second point of time.

The terminal activates the mobility group that is indicated in the MOBILITY_GROUP_SWITCH_REQUEST MAC CE at a first point of time.

The terminal applies a predefined uplink timing advance and initiates Random Access procedure in the PCell if the RAMDOM_ACCESS_REQUIRED_FIELD indicates a first value. The predefined uplink timing advance is fixed per duplex mode.

The terminal applies stored (maintained) uplink timing advance (N_TA); Timing advance between downlink and uplink for the PCell if the RAMDOM_ACCESS_RE-QUIRED_FIELD indicates a second value.

The terminal transmits (or triggers) a MOBILITY_GROUP_SWITCH_RESPONSE MAC CE on the additional PCell at a third point of time.

The first point of time is after the MOBILITY_GROUP_SWITCH_REQUEST MAC CE reception and before n slot1s elapsed since the reception of the MAC CE. Alternatively, the first point of time is after HARQ feedback transmission for the MOBILITY_GROUP_SWITCH_REQUEST MAC CE starts and before n slot3s elapsed since the end of the HARQ feedback transmission.

The second point of time is after the MOBILITY_GROUP_SWITCH_REQUEST MAC CE reception and before m slot1s elapsed since the reception of the MAC CE. Alternatively, the second point of time is after HARQ feedback transmission for the MOBILITY_GROUP_SWITCH_REQUEST MAC CE starts and before m slot3s elapsed since the end of the HARQ feedback transmission.

n is greater than m.

The third point of time is after the second point of time and before k slot2s elapsed since the second point of time.

slot1 is the slot of the DL BWP where MOBILITY_GROUP_SWITCH_REQUEST MAC CE is received. slot2 is the slot of the DL BWP of the default PCell or the additional PCell. slot3 is the slot of the UL BWP where the HARQ feedback for MOBILITY_GROUP_SWITCH_REQUEST MAC CE is transmitted.

The MOBILITY_GROUP_SWITCH_RESPONSE MAC CE includes one or more TCI_STATE_FIELD_GROUP_FIELDs. The terminal includes in TCI_STATE_FIELD_GROUP_FIELD of the MOBILITY_GROUP_SWITCH_RESPONSE MAC CE the TCI_STATE_FIELD_GROUP_FIELDs received in the MOBILITY_GROUP_SWITCH_REQUEST MAC CE.

The MOBILITY_GROUP_SWITCH_RESPONSE MAC CE is response to the MOBILITY_GROUP_SWITCH_RE-QUEST MAC CE. The MOBILITY_GROUP_SWITCH_REQUEST MAC CE is identified by a first two-octet eLCID index. The MOBILITY_GROUP_SWITCH_RESPONSE MAC CE is identified by a second two-octet eLCID index.

The MOBILITY_GROUP_SWITCH_RESPONSE MAC CE includes first part of the MOBILITY_GROUP_SWITCH_REQUEST MAC CE. The first part of the MOBILITY_GROUP_SWITCH_REQUEST MAC CE excludes the MOBILITY_GROUP_ID_FIELD and includes TCI_STATE_FIELD_GROUP_FIELDs.

The terminal stop monitoring a paging channel if an amg is active and dmg is deactivated (if an additional PCell is active and a default PCell is deactivated). The terminal stop acquiring system information if an amg is active and dmg is deactivated (if an additional PCell is active and a default PCell is deactivated.

The terminal monitors Short Message transmitted with P-RNTI in the additional PCell, if the amg is active and the dmg is deactivated (if the additional PCell is active and the default PCell is deactivated), in accordance with the TCI state indicated for the additional PCell in the MOBILITY_GROUP_SWITCH_REQUEST MAC CE.

The terminal receives PDCCH and PDSCH in the additional PCell and in the activated additional SCells in accordance with the TCI states indicated in the MOBILITY_GROUP_SWITCH_REQUEST MAC CE.

The terminal transmits PUSCH and PUCCH and SRS in the additional PCell and in the activated additional SCells in accordance with the TCI states indicated in the MOBILITY_GROUP_SWITCH_REQUEST MAC CE.

The terminal receives a downlink message from the base station in a default PCell.

The downlink message includes information about an additional PCell.

The terminal transmits a MAC PDU including an uplink message to the base station in the additional PCell.

The uplink message is a response to the downlink message.

A priority of the uplink message is higher than BSR if the downlink message is a MAC CE (or layer2 control message).

The priority of the uplink message is lower than BSR if the downlink message is a RRC message (or layer3 control message).

Higher the priority of the uplink message earlier uplink resource is allocated to the uplink message.

Uplink data with higher priority is allocated with uplink resource before uplink data with lower priority is.

The uplink data includes MAC SDU and MAC CE.

The terminal receives a downlink MAC PDU including a downlink message from the base station in a default PCell at a 5th point of time.

The downlink message includes information on an additional PCell.

The terminal transmits a HARQ acknowledgement for the downlink MAC PDU at a 6th point of time.

The terminal transmits an uplink MAC PDU including an uplink message to the base station in the additional PCell at a 7th point of time if the downlink message is a MAC CE and at a 8th point of time if the downlink message is a RRC message.

The uplink message is response to the downlink message.

The 7th point of time is determined based on the 5th point of time.

The 8th point of time is determine based on the 6th point of time.

Terminal monitors PDCCH of a first PCell for a first tpc-PUCCH-RNTI for PUCCH power control and monitors for a P-RNTI for paging monitoring and Short Message monitoring when the first PCell is activated.

Terminal monitors PDCCH of a second PCell for a second tpc-PUCCH-RNTI for PUCCH power control and monitors for the P-RNTI for Short Message monitoring when the second PCell is activated.

The first tpc-PUCCH-RNTI is allocated in a first RRCReconfiguration.

The second tpc-PUCCH-RNTI is allocated in a second RRCReconfiguration.

The first tpc-PUCCH-RNTI is common for a first group of terminals. The first group of terminals are associated with the first PCell.

The second tpc-PUCCH-RNTI is common for a second group of terminals. The second group of terminals are associated with the second PCell.

The first RRCReconfiguration message is characterized as including a CellGroupConfig with a Reconfiguration With-Sync.

The second RRCReconfiguration message is characterized as including a CellGroupConfig2 with a L2mobilityConfig.

The first PCell is default PCell. The second PCell is additional PCell.

In L2 mobility operation, GNB transmits the downlink signal in the second cell based on one or more TCI states in the second configuration during the second period.

In L2 mobility operation, GNB transmits the downlink signal in the first cell based on one or more TCI states in the first configuration during the first period and the third period.

The downlink signal is PDSCH.

In L2 mobility operation, GNB performs downlink data transmission based on the first configuration and third configuration in the first cell during the first period and the third period.

In L2 mobility operation, GNB performs downlink data transmission based on the second configuration and third configuration in the second cell during the second.

Figure 2B:
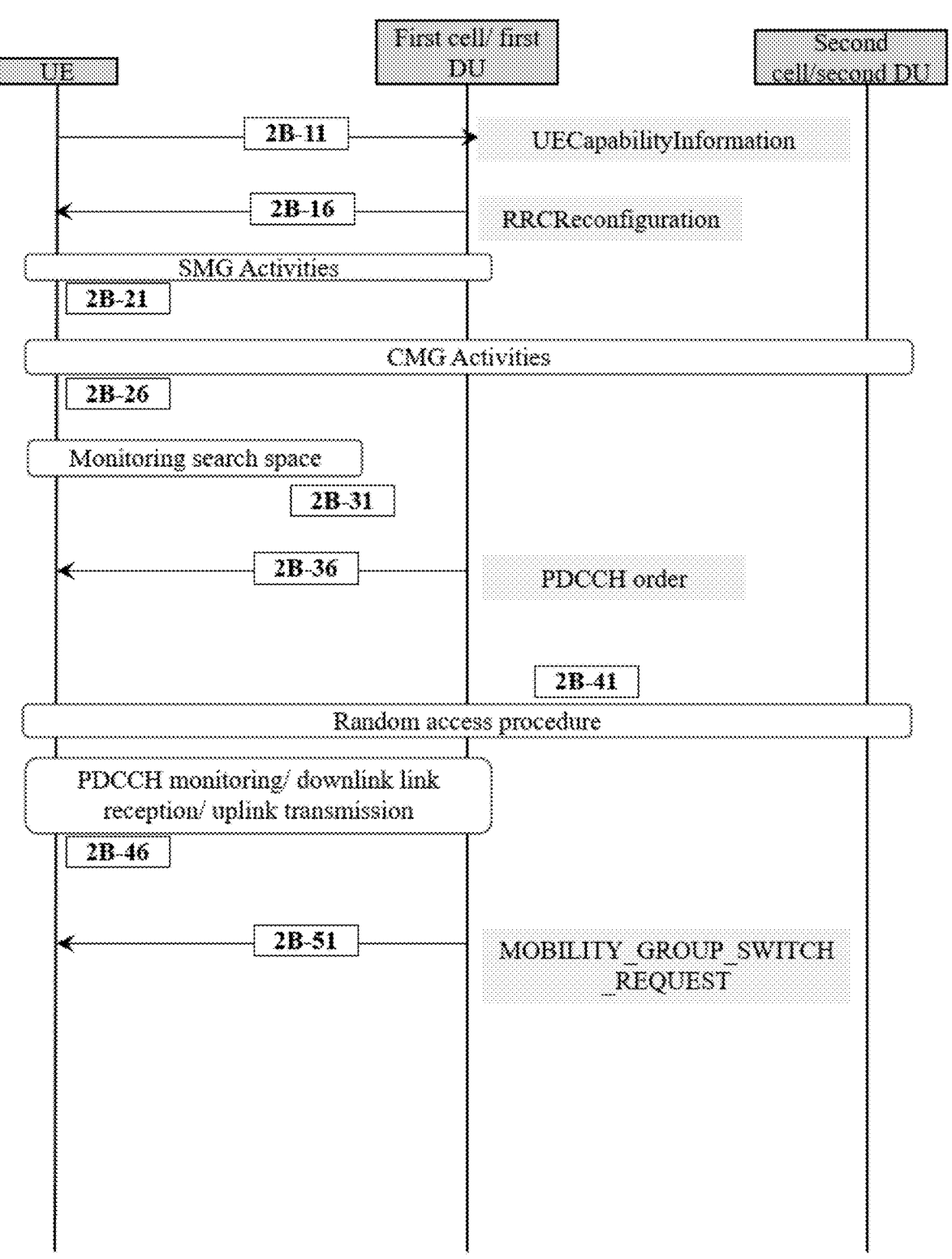
FIG. 2B is a diagram illustrating random access opera-tions of a terminal and a base station according to an embodiment of the present invention.

FIG. 2B illustrates the operation of a terminal and a base station for random access for lower layer triggered mobility.

The terminal is in a first cell. The first cell is controlled by a first DU. The first DU is controlled by a first CU. The first CU is connected with the first DU and a second DU. The first CU and the first DU and the second DU composes a base station. The second cell is controlled by the second DU.

In 2B-11, the terminal in the first cell transmits to the base station a RRC message for capability reporting. (UECapabilityInformation).

The UECapabilityInformation comprises following capability information.

One or more GroupL2mobility IEs. Each GroupL2mobility IE indicates whether the terminal supports MAC CE based mobility for a corresponding band. If the IE is included for the band, it indicates the terminal supports following functionality for the band.

Cell switch (mobility group switch) based on MOBILITY_GROUP_SWITCH_REQUEST MAC CE.
    Transmission of MOBILITY_GROUP_SWITCH_RESPONSE after mobility group switch.
    Second random access procedure.
    Reception of second TAC MAC CE in SMG.
    NTA maintenance after the second random access procedure.

In 2B-16, the terminal receives a RRC message containing configuration information for the terminal (RRCReconfiguration).

The RRCReconfiguration comprises a SMG configuration information and a list of CMG configuration information.

The SMG configuration information includes following IEs.

one or more layer1 parameter sets for a one or more serving cell (ServingCellConfigCommon and ServingCellConfig). Each of layer1 parameter set is applied to a specific serving cell.
    Layer 2 parameter set (MAC-CellGroupConfig) applied to the one or more serving cells.
    SpCell specific parameter set (reconfiguration WithSync). This parameter set is applied to a specific serving cell.
    Measurement configuration (MeasConfig). Measurement gap configuration (MeasGapConfig).

A CMG configuration information includes following IEs.
a CMG identifier
an inner RRCReconfiguration. The inner RRCReconfiguration includes the configuration information of the CMG; one or more ServingCellConfig, one or more ServingCellConfigCommon, a MAC-CellGroupConfig, a reconfiguration WithSync, a MeasConfig and a MeasGapConfig.

The MAC-CellGroupConfig includes one or more TAG configuration information such as TAT value and TAG identifier. Each serving cell is assigned with a TAG identifier.

The MAC-CellGroupConfig includes one or two DRX configuration (DRX-Config).

In 2B-21, the terminal performs SMG operation for serving cells of the SMG.

The terminal performs a SMG_Active_Operation for an active serving cells. Active serving cells comprises a SpCell and one or more active secondary cells.

<SMG_Active_Operation>

UE monitors, based on the DRX configuration of the SMG and measurement gap configuration of the SMG, in the active downlink bandwidth parts of the active serving cells. UE monitors PDCCH during a first period.

UE receives, based on the measurement gap configuration of the SMG, PDSCH in the active downlink bandwidth parts of the active serving cells. UE receives PDSCH during a second period.

UE transmits, based on measurement gap configuration of the SMG, PUCCH for HARQ feedback and CSI report and SR in the active uplink bandwidth parts of one or two active serving cells. UE transmits PUCCH for HARQR feedback and CSI report and SR during a second period.

UE transmits, based on DRX configuration of the SMG and measurement gap configuration of the SMG, CSI on PUSCH in the active uplink bandwidth parts of one or more active serving cells. UE transmits CSI on PUSCH during a first period.

UE transmits, based on measurement gap configuration of the SMG and DRX configuration of the SMG, SRS in the active uplink bandwidth parts of one or more active serving cells. UE transmits SRS during a first period.

The first period is the period which is Active Time according to DRX configuration and not measurement gap according to measurement gap configuration.

The second period is the period which is not measurement gap according to measurement gap configuration.

In 2B-26, the terminal performs Candidate Mobility Group (CMG) operation for serving cells of the CMGs.

For each CMG, the terminal performs CMG_Preparation_Operaiton for a specific candidate cell. The specific candidate cell is the SpCell of the CMG. The specific candidate cell is candidate SpCell.

<CMG_Preparation_Operaiton>

For each inner RRCReconfiguration included in the CMG list, the terminal performs followings.

The terminal performs downlink synchronization for the specific cell based on ssb-PositionsInBurst and absoluteFrequencySSB indicated in reconfiguration WithSync IE of the corresponding inner RRCReconfiguration.

The terminal measures SSBs based on ssb-PositionsInBurst and absoluteFrequencySSB indicated in reconfiguration WithSync IE of the corresponding inner RRCReconfiguration.

The terminal determines pathloss based on SSB measurement.

The terminal receives MIB based on ssb-PositionsInBurst and absoluteFrequencySSB indicated in reconfiguration WithSync IE of the corresponding inner RRCReconfiguration.

The terminal determines SFN of the candidate SpCell based on the received MIB.

In 2B-31, the terminal monitors a one or more search spaces of the serving cells of SMG to receive PDCCH order.

The terminal monitors a first search space for a first PDCCH order. The terminal monitors a second search space for a second PDCCH order. The first search space and the second search space are configured in a reconfigurration WithSync or in a one or more servingCellConfigCommon in SMG configuration. The first search space is for the first PDCCH order reception and for downlink scheduling and for uplink scheduling. The second search space is only for the second PDCCH order reception.

The first PDCCH order is transmitted to a terminal by the base station to trigger a first random access procedure of the terminal. The second PDCCH order is transmitted to a terminal by the base station to trigger a second random access procedure.

In 2B-36, the terminal receives a PDCCH order and performs random access procedure. The terminal performs the first RA procedure if the first PDCCH order is received. The terminal performs the second RA procedure if the second PDCCH order is received.

The first PDCCH order is transmitted by means of DCI format 1_0 with CRC scrambled by C-RNTI.

The first PDCCH order includes following information.

Frequency domain resource assignment field: This field is set to all ones.

Random Access Preamble index: This field indicates the preamble to be transmitted by the terminal.

SS/PBCH index field: this field indicates the SS/PBCH that shall be used to determine the RACH occasion for the PRACH transmission.

The second PDCCH order is transmitted by means of DCI format 1_0 with CRC scrambled by EUA-RNTI.

The second PDCCH order includes following information.

Frequency domain resource assignment field: This field is set to a predefined value e.g. all zeros or all bits set to one but the last one set to zero.

Random Access Preamble index: This field indicates the preamble to be transmitted by the terminal.

SS/PBCH information: this field indicates one or more SS/PBCHs that shall be used to determine one or more RACH occasions for the PRACH transmission. This field could consist with two sub-fields. The first sub-field indicates the first SS/PBCH index and the second sub-field indicates the number of consecutive SS/PBHC indexes starting from the first SS/PBHC index. To keep the commonality between the first PDCCH order and the second PDCCH order, the first sub-field and the second sub-field are located in non-adjacent places. More specifically, the first sub-field locates immediately after Random Access Preamble index field and the second sub-field locates after CMG identifier field. Terminal determines the one or more RACH occasions based on the SS/PBCH information in the PDCCH order and ssb-perRACH-OccasionAndCB-PreamblesPerSSB in the reconfiguration WtihSync in the corresponding RRCReconfiguration. ssb-perRACH-OccasionAndCB-PreamblesPerSSB conveys the information about the number of SSBs per RACH occasion. Value oneEighth corresponds to one SSB associated with 8 RACH occasions, value one-Fourth corresponds to one SSB associated with 4 RACH occasions and so on.

Second PDCCH order indicator field: If this field is set to a first value, the DCI format 1_0 is the second PDCCH order. If this field is set to a second value, the DCI format 1_0 is the first PDCCH order.

CMG identifier: This field conveys an identifier of the CMG. The terminal determines the candidate SpCell where preamble is to be transmitted based on this field. Alternatively, this field comprises an identifier (e.g., short-candidate-id) derived from the CMG identifier. CMG identifier and Itm-CandidateId are used interchangeably.

Preamble transmission power information: This field conveys information related to preamble transmission. This field indicates whether the preamble transmission power shall be ramped up comparing to the last preamble transmission in the same candidate SpCell or the transmission power shall be same as the last preamble transmission in the same candidate SpCell. This field can indicate power ramping shall be initialized to zero (ramping step is initialized to zero). Alternatively, this field indicates one of predefined power offset that shall be added to the preamble transmission power.

In 2B-41, the terminal performs random access procedure. If the first PDCCH order is received, the terminal performs the first random access procedure. If the second PDCCH order is received, the terminal performs the second random access procedure.

The terminal performs the first random access procedure as follows.

The terminal sets PREAMBLE_RECEIVED_TARGET_POWER to preamble ReceivedTargetPower+DELTA_PREAMBLE+(PREAMBLE_POWER_RAMPING_COUNTER−1)×PREAMBLE_POWER_RAMPING_STEP The terminal sets transmission power to the sum of PREAMBLE_RECEIVED_TARGET_POWER and pathloss of the serving cell where the first PDCCH order is received.

The terminal transmits the preamble in the RACH occasion determined from the SS/PBCH index field in the first PDCCH order. The terminal transmits the preamble in the active uplink bandwidth part of the serving cell where the first PDCCH order is received.

The terminal monitors PDCCH in a specific search space for a specific RNTI in a specific downlink bandwidth part of a specific serving cell. The specific serving cell is the serving cell where the preamble is transmitted. The specific downlink bandwidth part is the active downlink bandwidth part of the specific serving cell. The specific search space is indicated by ra-SearchSpace field in the configuration information of the specific serving cell. The specific RNTI is RA-RNTI. The terminal monitors PDCCH to receive a first random access response (RAR).

If the first RAR is not received, the terminal determines new transmission power based on new PREAMBLE_POWER_RAMPING_COUNTER and transmits the preamble with the new transmission power. The new PREAMBLE_POWER_RAMPING_COUNTER is the old PREAMBLE_POWER_RAMPING_COUNTER plus one.

The terminal performs the second random access procedure as follows.

The terminal sets PREAMBLE_RECEIVED_TARGET_POWER to preamble ReceivedTarget-Power+DELTA_PREAMBLE+(PREAMBLE_POWER_RAMPING_COUNTER−1)×PREAMBLE_POWER_RAMPING_STEP. PREAMBLE_POWER_RAMPING_COUNTER is determined based on the Preamble transmission power information field in the second PDCCH order. Alternatively, the terminal sets PREAMBLE_RECEIVED_TARGET_POWER to pre-ambleReceivedTargetPower+DELTA_PREAMBLE+POWER_OFFSET. POWER_OFFSET is determined based on the Preamble transmission power information field in the second PDCCH order.

The terminal sets transmission power to the sum of PREAMBLE_RECEIVED_TARGET_POWER and pathloss of a candidate SpCell. The candidate SpCell is determined based on CMG identifier field in the second PDCCH order and Reconfiguration WithSync IE in the corresponding inner RRCReconfiguration.

The terminal transmits the preamble in the one or more RACH occasions determined from the SS/PBCH information field in the second PDCCH order. The terminal transmits the preamble in the one or more RACH occasions with the same transmission power with different spatial domain transmission filters (different uplink beams). The terminal transmits the preamble in a specific uplink bandwidth part of a specific cell. The uplink bandwidth part identifier of the specific uplink bandwidth part is indicated in the reconfiguration With-Sync IE of the inner RRCReconfiguration message corresponding to CMG identifier. The specific cell is the candidate SpCell.

The terminal monitors PDCCH in a specific search space for a specific RNTI in a specific downlink bandwidth part of a specific serving cell. The specific serving cell is the serving cell where the second PDCCH order is received. The downlink bandwidth part identifier of the specific downlink bandwidth part is indicated in the reconfiguration WithSync IE of the inner RRCRecon-figuration message corresponding to CMG identifier. The specific search space is UE specific search space. The specific RNTI is C-RNTI of the SMG. The terminal monitors PDCCH to receive a second RAR.

The terminal receives a first RAR if the random access procedure was triggered by the first PDCCH order. The terminal receives a second RAR if the random access procedure was triggered by the second PDCCH order. One or more first RAR are included in a MAC PDU. The terminal determines the first RAR for itself based on MAC subhead associated with the first RAR. Only a single second RAR is included in a MAC PDU.

The first RAR comprises following information.

Timing Advance Command (TAC): The Timing Advance Command field indicates the index value TA used to control the amount of timing adjustment that the terminal has to apply for a specific TAG. The size of the Timing Advance Command field is 12 bits. The specific TAG is SMG TAG to which the serving cell belong. The serving cell is the cell where the first PDCCH order is received.

UL Grant: The Uplink Grant field indicates the resources to be used on the uplink. The size of the UL Grant field is 27 bits; This field includes TPC command for PUSCH (Msg 3). This field includes MCS for PUSCH. This field includes PUSCH time resource allocation for PUSCH.

Temporary C-RNTI: The Temporary C-RNTI field indicates the temporary identity that is used by the MAC entity during Random Access. The size of the Temporary C-RNTI field is 16 bits.

The second RAR comprises following information.

CMG identifier: This field indicates CMG to which a candidate cell belongs to. The candidate cell is the cell where the preamble was transmitted. The candidate cell is SpCell indicated in the inner RRCReconfiguration corresponding to the CMG identifier.

Timing Advance Command: The Timing Advance Command field indicates the index value TA used to control the amount of timing adjustment that the terminal has to apply for a specific TAG. The size of the Timing Advance Command field is 12 bit. The specific TAG is primary TAG of CMG indicated by CMG identifier.

UL beam index: This field indicates the index of the uplink beam that the terminal shall applied in a specific uplink bandwidth part of a specific cell. The UL beam index is in the form of SS/PBHC index. The specific uplink bandwidth part is indicated in the inner RRCReconfiguration corresponding to CMG identifier. The specific cell is the candidate SpCell indicated in the inner RRCReconfiguration corresponding to CMG identifier.

Upon receiving a RAR, the terminal adjusts uplink transmission timing of an uplink of a specific cell (or specific TAG) based on TAC in the RAR and based on a downlink frame boundary of a specific cell.

In case of the first random access procedure, followings apply.

The terminal determines TA of a specific serving TAG based on TA (TA=0, 1, 2, . . . , 3846) in the TAC field in the first RAR.

The terminal determines NTA of the specific serving TAG. $NTA=TA*16*6$ $4/SCS\_COEEFICIENT$. SCS_COEEFICIENT is predefined per subcarrier spacing. SCS_COEFFICIENT is 1 if SCS is 15 KHz. SCS_COEFFICIENT is 2 if SCS is 30 KHz. SCS_CO-EFFICIENT is 4 if SCS is 60 KHz. SCS_COEFFI-CIENT is 8 if SCS is 120 KHz. SCS_COEFFICIENT is 16 if SCS is 240 KHz, and so on.

The terminal determines TTA of the specific serving TAG. $TTA=(NTA+NTA\_OFFSET)*T\_C$. NTA_OFFSET is indicated in SIB1. T_C is a basic time unit for NR. T_C is equal to $1/(480*1000*4096)$ ms.

The terminal applies TTA such that the terminal starts uplink frame boundary of the specific serving TAG TTA before the start of the corresponding downlink frame of any serving cell of the specific TAG.

The specific serving TAG is the TAG where a specific serving cell belongs to. The specific serving cell is the serving cell where the preamble is transmitted. SCS_COEFFICIENT is determined based on the SCS of the first PUSCH transmission after the reception of the first random access response.

In case of the second random access procedure, follow-ings apply.

The terminal determines TA of a specific candidate TAG based on TA (TA=0, 1, 2, . . . , 3846) in the TAC field in the second RAR.

The terminal determines NTA of the specific candidate TAG. $NTA=TA*16 *64/SCS\_COEEFICIENT$.

The terminal determines TTA of the specific candidate TAG. $TTA=(NTA+N\ TA\_OFFSET)*T\_C$. NTA_OFF-SET is indicated in the corresponding inner RRCReconfiguration.

The terminal applies TTA such that the terminal starts uplink frame boundary of the specific candidate TAG TTA before the start of the corresponding downlink frame of a specific candidate cell.

The specific candidate TAG is the TAG where a specific candidate cell belongs to. The terminal determines the specific candidate cell based on CMG identifier field of the second RAR. The specific candidate cell is the candidate SpCell of the CMG indicated by the CMG identifier field. SCS_COEFFICIENT is determined based on the SCS of the preamble transmission after the reception of the second PDCCH order.

After the reception of the RAR, UE starts or restarts a TimeAlignmentTimer.

If the first RAR is received, UE starts or restarts a TimeAlignmentTimer (TAT) of a specific serving TAG. The specific serving TAG is the TAG where a specific serving cell belongs to. The specific serving cell is the serving cell where the preamble is transmitted.

When the TAT of the serving TAG expires, the terminal performs followings.

The terminal flushes all HARQ buffer for all serving cells of the TAG.

The terminal releases SRS for all serving cells of the TAG.

The terminal releases PUCCH for all serving cells of the TAG.

The terminal clears any configured downlink assignment and configured uplink grants for all serving cells of the TAG.

The terminal does not perform any uplink transmission on a serving cell except the random access preamble when the TAT associated with the TAG to which the serving cell belongs is not running.

If the second RAR is received, UE starts or restarts a TAT of a specific candidate TAG. The specific candidate TAG is the TAG where a specific candidate cell belongs to. The terminal determines the specific candidate cell based on CMG identifier field of the second RAR.

When the TAT of the candidate TAG expires, the terminal performs followings.

The terminal flushes all HARQ buffer for all candidate cells of the TAG.

The terminal releases SRS for all candidate cells of the TAG. Before expiry of TAT, SRS re suspended. The suspended SRS of a candidate cell is activated when the candidate cell is switched to a serving cell.

The terminal releases PUCCH for all candidate cells of the TAG. Before expiry of TAT, PUCCH are suspended. The suspended PUCCH of a candidate cell is activated when the candidate cell is switched to a serving cell.

The terminal clears any configured downlink assignment and configured uplink grants for all candidate cells of the TAG. Before expiry of TAT, configured assignments and configured grants are suspended. The suspended configured assignment and the suspended configured grants of a candidate cell are activated when the candidate cell is switched to a serving cell.

The terminal release the maintained/stored TTA and NTA of the candidate TAG.

The terminal does not perform any uplink transmission on a candidate cell except the random access preamble regardless of whether the TAT associated with the TAG to which the candidate cell belongs is running or not running.

TAT of SMG is to control uplink transmission and resource management (to release activated resource). TAG of CMG is to control NTA management and resource management (i.e. to release suspended resource)

In 2B-46, the terminal performs PDCCH monitoring and downlink reception and uplink transmission in the serving cells of SMG.

In 2B-51, the terminal receives a TAC MAC CE. If the first TAC MAC CE is received, the terminal (re)starts a TAT of the SMG. If the second TAC MAC CE is received, the terminal (re)starts a TAT of a CMG.

The first TAC MAC CE is identified by MAC subheader with a LCID. The first TAC MAC CE comprises following information.

TAG Identity (TAG ID): This field indicates the TAG Identity of the addressed TAG. The TAG containing the SpCell has the TAG Identity 0. The length of the field is 2 bits;

Timing Advance Command: This field indicates the index value TA (0, 1, 2 . . . 63) used to control the amount of timing adjustment that MAC entity has to apply The length of the field is 6 bits.

The terminal updates NTA of the serving TAG indicated by TAG ID field. The terminal adjusts uplink transmission of the serving TAG based on updated NTA.

The second TAC MAC CE is identified by MAC subheader with an eLCID. The second TAC MAC CE comprises following information.

CMG identifier: This field indicates CMG to which the TAG belongs.

TAG Identity (TAG ID): This field indicates the TAG Identity of the addressed TAG. The TAG containing the SpCell has the TAG Identity 0. The length of the field is 2 bits;

Timing Advance Command: This field indicates the index value TA (0, 1, 2 . . . 63) used to control the amount of timing adjustment that MAC entity has to apply The length of the field is 6 bits.

The terminal updates NTA of a specific TAG of a specific CMG. The specific CMG is indicated by CMG identifier field. The specific TAG is indicated by TAG Identity field.

The terminal maintains/stores the new NTA and the new TTA derived from the new NTA. The terminal (re)starts the TAT of the specific TAG of the specific CMG.

In 2B-51, the terminal receives from the base station a MOBILITY_GROUP_SWITCH_REQUEST MAC CE. The MOBILITY_GROUP_SWITCH_REQUEST MAC CE comprises a L2_RESET_INDICATOR field. If the field is set to a first value, UE performs L2_RESET_ACTIVITIES_1 for the MAC entity. If the field is set to a second value, UE performs L2_RESET_ACTIVITIES_2 for the MAC entity.

L2_RESET_ACTIVITIES_1 comprises following activities.

During L2_MOBILITY_PERIOD_1,

The terminal stops all TATs of all TAGs of the SMG.

The terminal stops ongoing Random Access procedure in SMG. The terminal continues ongoing Random Access procedure in CMG.

The terminal flush Msg3 buffer of SMG.

The terminal cancels triggered Scheduling Request procedure in SMG.

The terminal cancels triggered Buffer Status Reporting procedure in SMG.

The terminal cancels triggered Power Headroom Reporting procedure in SMG.

The terminal releases any configured uplink grants in SMG.

The terminal releases PUCCH in SMG.

The terminal releases SRS in SMG.

During L2_MOBILITY_PERIOD_3,

The terminal triggers Buffer Status Reporting procedure in CMG.

The terminal triggers Power Headroom Reporting procedure in CMG.

L2_RESET_ACTIVITIES_2 comprises following activities.

During L2_MOBILITY_PERIOD_1,

The terminal does not stop TATs of the SMG.

The terminal stops ongoing Random Access procedure in SMG. The terminal continues ongoing Random Access procedure in CMG.

The terminal cancels triggered Scheduling Request procedure in SMG.

The terminal cancels triggered Buffer Status Reporting procedure in SMG.

The terminal cancels triggered Power Headroom Reporting procedure in SMG.

The terminal suspends any configured uplink grants in SMG.

The terminal suspends PUCCH in SMG.

The terminal suspends SRS in SMG.

During L2_MOBILITY_PERIOD_3,

The terminal triggers Buffer Status Reporting procedure in CMG.

The terminal triggers Power Headroom Reporting procedure in CMG.

If the RAMDOM_ACCESS_REQUIRED_FIELD is set to a first value, UE performs RA_ACTIVITIES_1. If the field is set to a second value, UE performs RA_ACTIVITIES_2.

RA_ACTIVITIES_1 comprises following activities.

During L2_MOBILITY_PERIOD_1,

The terminal stops the TATs of the CMG.

The terminal clears configured grants in CMG.

The terminal releases suspended PUCCH in CMG.

The terminal releases suspended SRS in CMG

During L2_MOBILITY_PERIOD_2,

The terminal triggers Random Access Procedure in the target candidate SpCell of the CMG.

The terminal generates MOBILITY_GROUP_SWITCH_RESPONSE MAC CE.

RA_ACTIVITIES_2 comprises following activities.

During L2_MOBILITY_PERIOD_1,

The terminal does not stop the TATs of the CMG.

The terminal does not clear configured grants in CMG.

During L2_MOBILITY_PERIOD_2,

The terminal applies maintained NTA and determines TTA for uplink transmission in the P-TAG of CMG The terminal monitor PDCCH with a specific C-RNTI in a specific downlink bandwidth part of the target candidate SpCell. The specific C-RNTI is the one indicated in a corresponding inner RRCReconfiguration. The specific downlink bandwidth part is the one indicated in the corresponding inner RRCReconfiguration.

The terminal activates suspended uplink grants of the CMG.

The terminal activates suspended PUCCH of the CMG.

The terminal activates suspended SRS of the CMG.

L2_MOBILITY_PEIROD_1 is from the moment when HARQ ACK for MOBILITY_GROUP_SWITCH_REQUEST is transmitted to the moment when the terminal switches to the CMG or candidate SpCell (i.e. terminal's transceiver is tuned to the CMG).

L2_MOBILITY_PERIOD_2 is from the moment when the terminal switches to the CMG/candidate SpCell to the moment when access to the target candidate SpCell is successfully completed.

L2_MOBILITY_PERIOD_3 is from the moment when access to the target candidate SpCell is successfully completed to the moment when HARQ ACK for MOBILITY-_GROUP_SWITCH_RESPONSE is received.

Access to the target SpCell is considered successfully completed when uplink grant for new transmission addressed by the specific C-RNTI is received in the target SpCell.

Alternatively, access to the target SpCell is considered successfully completed when downlink assignment for new transmission addressed by the specific C-RNTI is received in the target SpCell.

Serving Mobility Group (SMG) and Default Mobility Group (DMG) are used interchangeably.

Additional Mobility Group (AMG) and Candidate Mobility Group (CMG) are used interchangeably.

SMG is equivalent to current serving SpCell and current serving SCells.

CMG is equivalent to currently non-serving candidate SpCell and currently non-serving candidate SCells.

A PCell/PSCell and a SCell in smg are called serving PCell/PSCell and serving SCell. A PCell/PSCell and a SCell in cmg are called candidate PCell/PSCell and candidate SCell.

UE and terminal are used interchangeably.

GNB and base station are used interchangeably.

PDCCH and downlink control channel are used interchangeably.

PDSCH and downlink shared channel and downlink traffic channel are used interchangeably.

PUCCH and uplink control channel are used interchangeably.

PUSCH and uplink shared channel and uplink traffic channel are used interchangeably.

Primary Cell and Primary SCG Cell are called SpCell.

CMG identifier in a MAC CE indicates RRCReconfiguration corresponding to a CMG.

CMG identifier in a MAC CE indicates the identifier of RRCReconfiguration applied to lower layer mobility)

The operations of the terminal are explained below.

<Search Space and RNTI for PDCCH Order>

The terminal transmits the UECapability Information to the base station. The UECapability Information includes capability information related to lower layer mobility.

The terminal receives the RRCReconfigruation from the base station. The RRCReconfiguration includes a UE specific search space configuration information for type1 PDCCH order monitoring and a first RNTI for type1 PDCCH order monitoring and common search space identifier for type2 PDCCH order monitoring and a second RNTI for type2 PDCCH order monitoring. The RRCReconfiguration includes one or more inner RRCReconfiguration and associated mobility group identifier.

The terminal receives a PDCCH order from the base station. For type1 PDCCH order, the first RNTI and the UE specific search space determined from the UE specific search space configuration information are applied. For type2 PDCCH order, the second RNTI and the common search space determined from the common search space identifier are applied.

The terminal transmits a preamble to the base station based on the PDCCH order. If the PDCCH order is the type1 PDCCH order, preamble is transmitted in a first cell. If the PDCCH order is the type2 PDCCH order, preamble is transmitted in a second cell. The first cell is the cell where the PDCCH order is received. The second cell is determined from a first field in the PDCCH order. The first field includes an identifier of a mobility cell group. The second cell is a SpCell of the mobility cell group.

<Preamble Transmission Power>

The terminal transmits the UECapabilityInformation to the base station. The UECapabilityInformation includes capability information related to lower layer mobility.

The terminal receives the RRCReconfigruation from the base station. The RRCReconfiguration includes UE specific search space configuration information for type1 PDCCH order monitoring and a first RNTI for type1 PDCCH order monitoring and common search space identifier for type2 PDCCH order monitoring and a second RNTI for type2 PDCCH order monitoring. The RRCReconfiguration includes one or more inner RRCReconfiguration and associated mobility group identifier.

The terminal receives a PDCCH order from the base station.

The terminal determines the transmission power of the preamble. If the PDCCH or der is a type1 PDCCH order, preamble transmission power is determined based on a first parameter set and pathloss of a first cell. The first parameter set includes at least a preamble ReceivedTargetPower. The first parameter set is included in the system information block1 of the first cell. If PDCCH order is a type2 PDCCH order, preamble transmission power is determined based on a second parameter set and a first information (CMG iden-tifier) and a second information (transmission power related information) and pathloss of a second cell. The second parameter set includes at least a preambleReceivedTarget-Power. The second parameter set is included in an inner RRCReconfiguration corresponding to the first information. The second cell is determined based on the first information. The second information indicates how much more transmis-sion power is added to the transmission power determined based on the second parameter set and pathloss of the second cell.

The terminal transmits a preamble to the base station based on the PDCCH order.

<Response and TTA>

The terminal transmits the UECapability Information to the base station. The UECapabilityInformation includes capability information related to lower layer mobility.

The terminal receives the RRCReconfigruation from the base station. The RRCReconfiguration includes UE specific search space configuration information for type1 PDCCH order monitoring and a first RNTI for type1 PDCCH order monitoring and common search space identifier for type2 PDCCH order monitoring and a second RNTI for type2 PDCCH order monitoring. The RRCReconfiguration includes one or more inner RRCReconfiguration and asso-ciated mobility group identifier.

The terminal receives a PDCCH order from the base station. For type1 PDCCH order, the first RNTI and the UE specific search space determined from the UE specific search space configuration information are applied. For type2 PDCCH order, the second RNTI and the common search space determined from the common search space identifier are applied.

The terminal transmits a preamble to the base station based on the PDCCH order.

The terminal receives a response from the base station. A first response is received if type1 PDCCH order was received. A second response is received if type2 PDCCH order was received. For the first response and the second response, the UE specific search space determined from the UE specific search space configuration information is applied. For the first response, a third RNTI is applied. The third RNTI is predefined in the standard. For the second response, the first RNTI is applied.

The terminal determines Timing advance between down-link and uplink (TTA). If the type1 PDCCH order was received, the terminal determines TTA of a first cell based on the first field (TAC) and the subcarrier spacing for a first PUSCH transmission. The first cell is the cell where the first PDCCH order was received. The first PUSCH is the PUSCH transmission after the first response reception. If the type2 PDCCH order was received, the terminal determines TTA of a second cell based on the first field and the subcarrier spacing for the preamble transmission and the second field (CMG identifier).

<TAC MAC CE>

The terminal transmits the UECapabilityInformation to the base station. The UECapabilityInformation includes capability information related to lower layer mobility.

The terminal receives the RRCReconfigruation from the base station. The RRCReconfiguration includes one or more inner RRCReconfiguration and associated mobility group identifier.

The terminal receives a TAC MAC CE in a first cell.

The terminal determines Timing advance between down-link and uplink (TTA).

If the type1 TAC MAC CE is received, the terminal determines Timing advance between downlink and uplink (TTA) of a second TAG of a first mobility group based on the first field (TAC) and the second field (TAG ID) and a first subcarrier spacing. The first mobility group is the current serving mobility group. The first TAG is the TAG indicated by the second field. The first subcarrier spacing is the largest subcarrier spacing of active uplink bandwidth parts of the first TAG of the first mobility group.

If the type2 TAC MAC CE is received, the terminal determines Timing advance be tween downlink and uplink (TTA) of a second TAG of a second mobility group based on the first field (TAC) and the second field (TAG ID) and a third field (CMG ID field) and a second subcarrier spacing. The second mobility group is determined based on the third field.

The second TAG is the TAG indicated by the second field. The second subcarrier spacing is the subcarrier spacing of a specific uplink bandwidth part of a specific candidate cell of the second TAG of the second mobility group. The identifier of the specific uplink bandwidth part is indicated in the corresponding inner RRCReconfiguration. The configura-tion information of the specific candidate cell is indicated in the corresponding inner RRCReconfiguration. Alternatively, the specific uplink bandwidth part is the uplink bandwidth part with the lowest uplink bandwidth part identifier. Alter-natively, the specific uplink bandwidth part is the uplink bandwidth part with a specific uplink bandwidth part iden-tifier (e.g. 0). The specific candidate cell is the candidate cell with the lowest serving cell identifier. Alternatively, the specific candidate cell is the candidate cell with a specific serving cell identifier (e.g. 0)

<Switching MAC CE>

The terminal transmits the UECapabilityInformation to the base station. The UECapability Information includes capability information related to lower layer mobility.

The terminal receives the RRCReconfigruation from the base station. The RRCReconfiguration includes UE specific search space configuration information for type1 PDCCH order monitoring and a first RNTI for type1 PDCCH order monitoring and common search space identifier for type2 PDCCH order monitoring and a second RNTI for type2 PDCCH order monitoring. The RRCReconfiguration includes one or more inner RRCReconfiguration and associated mobility group identifier.

The terminal receives a PDCCH order from the base station. For type1 PDCCH order, the first RNTI and the UE specific search space determined from the UE specific search space configuration information are applied. For type2 PDCCH order, the second RNTI and the common search space determined from the common search space identifier are applied.

The terminal transmits a preamble based on the type2 PDCCH order for a first mobility group.

The terminal receives in a first cell a MAC CE for lower layer mobility execution toward the second mobility group. The first RNTI and the UE specific search space determined from the UE specific search space configuration information are applied for the MAC CE reception.

The terminal performs a first operation set in the first mobility group at a first point of time. The first operation set comprises stopping TAT and canceling BSR and canceling PHR. The first point of time is after the positive HARQ feedback for the MAC CE is trans mitted and before the mobility group switch starts. The first cell belongs to the first mobility group.

The terminal performs a second operation set in the second mobility group at a second point of time. The second operation set comprise applying TTA having determined for the second mobility group based on the type2 PDCCH order. The second point of time is after the mobility group switch starts and before access to the target candidate cell is successfully completed.

The terminal performs a third operation set in the second mobility group at a third point of time. The third operation set comprises triggering BSR if has been cancelled and triggering PHR. The third point of time is after access to the target candidate cell is successfully completed and before the positive HARQ feedback for a second MAC CE (MOBILITY_GROUP_SWITCH_RESPONSE) is transmitted.

Figure 3A:
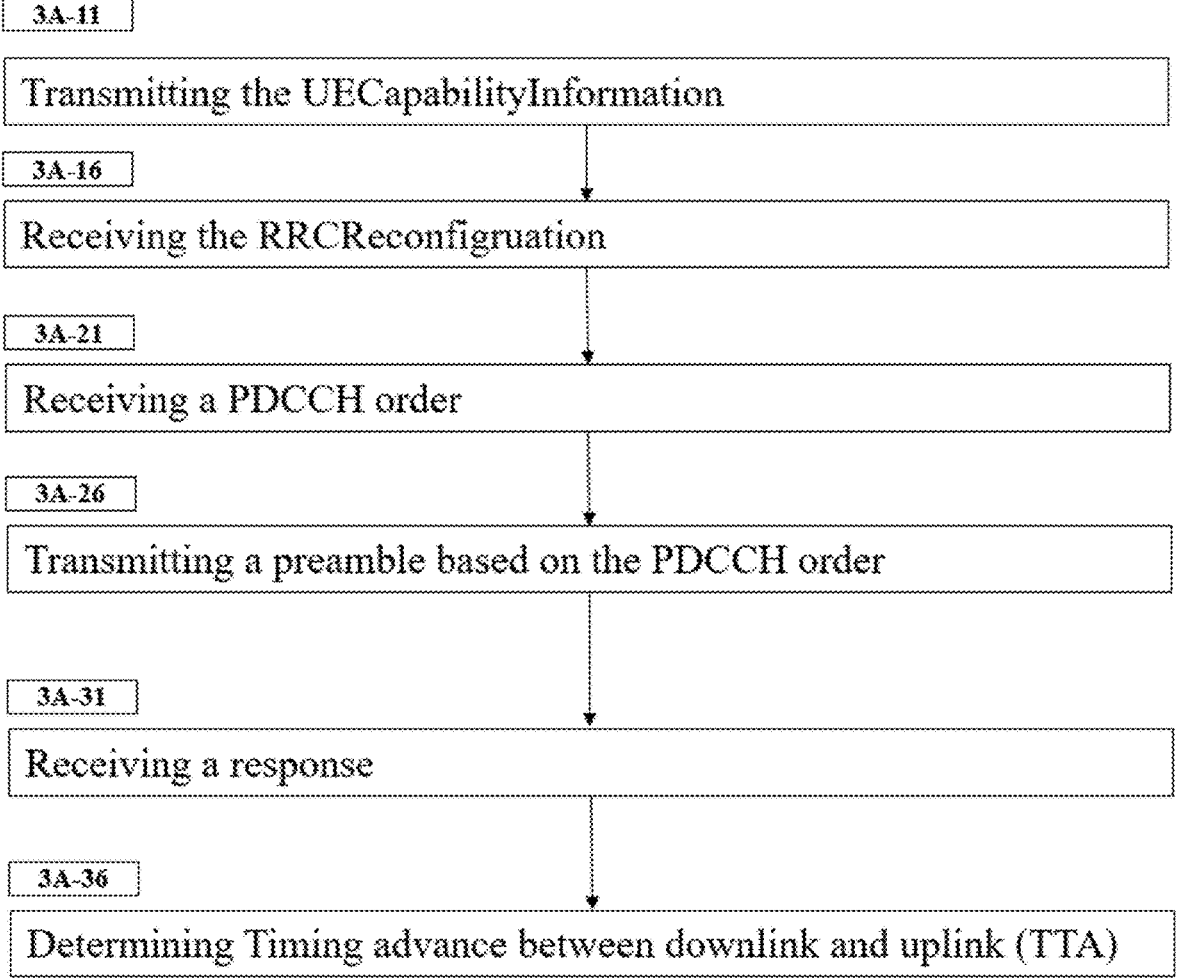
FIG. 3A is a flow diagram illustrating an operation of a terminal.

FIG. 3A illustrates the operation of the terminal.

In 3A-11, the terminal transmits the UECapabilityInformation to the base station. The UECapabilityInformation includes capability information related to lower layer mobility.

In 3A-16, the terminal receives the RRCReconfigruation from the base station. The RRCReconfiguration includes UE specific search space configuration information for type 1 PDCCH order monitoring and a first RNTI for type1 PDCCH order monitoring and common search space identifier for type2 PDCCH order monitoring and a second RNTI for type2 PDCCH order monitoring. The RRCReconfiguration includes one or more inner RRCReconfiguration and associated mobility group identifier.

In 3A-21, the terminal receives a PDCCH order from the base station. For type1 PDCCH order, the first RNTI and the UE specific search space determined from the UE specific search space configuration information are applied. For type2 PDCCH order, the second RNTI and the common search space determined from the common search space identifier are applied.

In 3A-26, the terminal transmits a preamble to the base station based on the PDCCH order.

In 3A-31, the terminal receives a response from the base station. A first response is received if type1 PDCCH order was received. A second response is received if type2 PDCCH order was received. For the first response and the second response, the UE specific search space determined from the UE specific search space configuration information is applied. For the first response, a third RNTI is applied. The third RNTI is predefined in the standard. For the second response, the first RNTI is applied.

In 3A-36, the terminal determines Timing advance between downlink and uplink (TTA). If the type1 PDCCH order was received, the terminal determines TTA of a first cell based on the first field (TAC) and the subcarrier spacing for a first PUSCH transmission. The first cell is the cell where the first PDCCH order was received. The first PUSCH is the PUSCH transmission after the first response reception. If the type2 PDCCH order was received, the terminal determines TTA of a second cell based on the first field and the subcarrier spacing for the preamble transmission and the second field (CMG identifier).

Figure 4A:
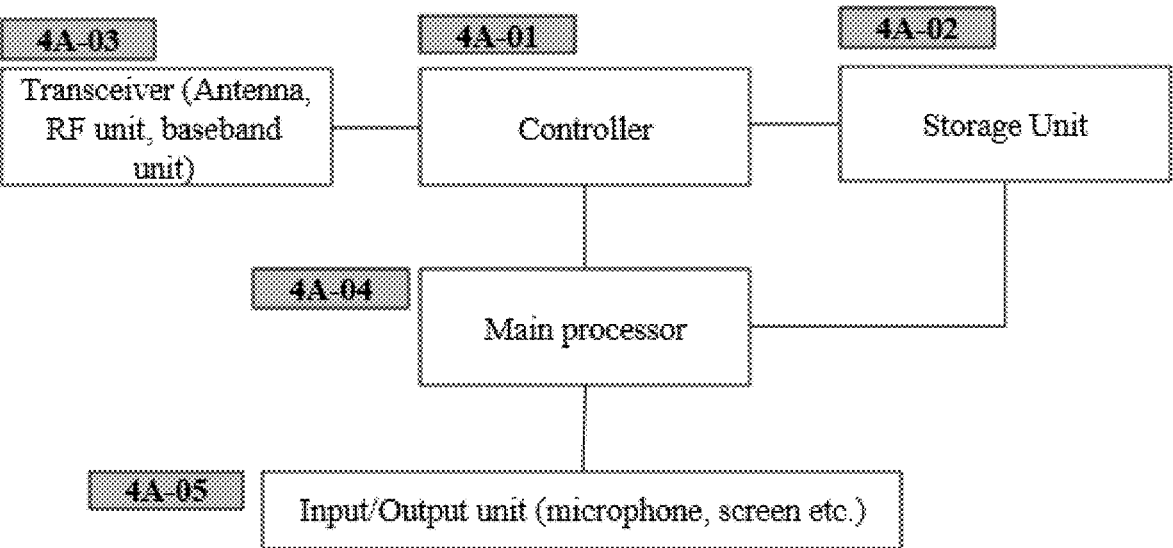
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP that performs control for communication and an application processor (AP that controls the upper layer, such as an application program. The controller controls storage unit and transceiver such that UE operations illustrated in FIG. 2A and FIG. 2B and FIG. 3A are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor May include a transmission filter, a reception filter, an amplifier, a mil0r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit (4A-05).

I/O unit 4A-05 consists of equipment for inputting user data and for outputting use r data such as a microphone and a screen. I/O unit 4A-05 performs inputting and outputting user data based on the main processor's instruction.

Figure 4B:
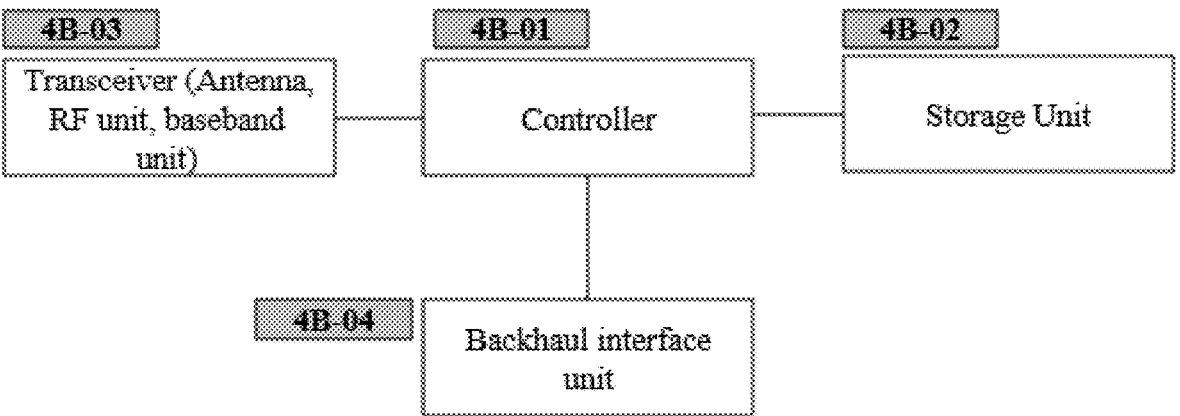
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2A and FIG. 2B are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node in to a bit string.

What is claimed is:

1. A method by a terminal, the method comprising:
receiving, by the terminal from a base station, a radio resource control (RRC) reconfiguration message, wherein the RRC reconfiguration message comprises one or more inner RRC reconfiguration messages and one or more first identifiers;
performing, by the terminal and based on an inner RRC reconfiguration message, a first set of operations for a candidate cell associated with the inner RRC reconfiguration message, wherein the first set of operations comprises downlink synchronization towards the candidate cell;
receiving, by the terminal from the base station, a first downlink (DL) Medium Access Control (MAC) message, wherein the first DL MAC message comprises a first identifier field; and
applying, by the terminal and in the candidate cell associated with a first identifier indicated in the first identifier field, a timing advance command after performing a second set of operations,
wherein the second set of operations comprises cancelling triggered buffer status report.

2. The method of claim 1,
wherein each of the one or more inner RRC reconfiguration messages is associated with at least one candidate cell.

3. The method of claim 1,
wherein each of the one or more first identifiers is associated with one of the one or more inner RRCReconfiguration messages.

4. The method of claim 1,
wherein the first set of operations further comprises measuring Synchronization Signal/Physical Broadcast Channel (SSB) of the candidate cell based on a parameter indicating absolute frequency of SSB, and wherein the parameter is comprised in the inner RRC reconfiguration message associated with the candidate cell.

5. The method of claim 1,
wherein the first set of operations further comprises determining a pathloss of Synchronization Signal/Physical Broadcast Channel (SSB) of the candidate cell.

6. The method of claim 1,
wherein the first set of operations further comprises receiving Mater Information Block of the candidate cell based on one or more parameters comprised in the inner RRC reconfiguration message associated with the candidate cell.

7. The method of claim 6,
wherein the one or more parameters comprised in the inner RRC reconfiguration message associated with the candidate cell comprises:
a parameter indicating a Synchronization Signal/Physical Broadcast Channel (SSB) position in burst; and
a parameter indicating an absolute frequency of SSB.

8. The method of claim 1,
wherein the second set of operations further comprises cancelling triggered power headroom report.

9. The method of claim 1,
wherein the second set of operations further comprises stopping one or more time alignment timers.

10. The method of claim 1,
wherein the second set of operations further comprises flushing buffer for Msg 3.

11. The method of claim 1,
wherein the second set of operations further comprises releasing uplink grants.

12. The method of claim 1, further comprising:
receiving, by the terminal from the base station, a Physical Downlink Control Channel (PDCCH) order in a serving cell, wherein the PDCCH order comprises:

a random access preamble index field; and a Synchronization Signal/Physical Broadcast Channel (SSB) field.

13. The method of claim 12, further comprising:

performing, by the terminal, a first type random access procedure or a second type random access procedure.

14. The method of claim 13, wherein the first type random access procedure is performed in case that:

the PDCCH order does not comprise a specific field; or the PDCCH order comprises the specific field and the specific field indicates a first value.

15. The method of claim 13, wherein the second type random access procedure is performed in case that:

the PDCCH order comprises a specific field; and the PDCCH order comprises the specific field and the specific field indicates a second value.

16. The method of claim 13, wherein a preamble is transmitted:

in a serving cell in case that the first type random access procedure is performed; and in a candidate cell in case that the second type random access procedure is performed.

17. The method of claim 16, wherein the candidate cell is indicated by a second identifier indicated in the PDCCH order.

18. The method of claim 17, wherein the second identifier is associated with the candidate cell.

19. The method of claim 18, wherein the second identifier is shorter than the first identifier that is associated with the candidate cell.

20. A terminal comprising:

a transceiver, a memory, and a controller coupled to the transceiver and the memory, wherein the controller is configured to cause the terminal to:

receive, from a base station, a radio resource control (RRC) reconfiguration message, wherein the RRC reconfiguration message comprises one or more inner RRC reconfiguration messages and one or more first identifiers;

perform, based on an inner RRC reconfiguration message, a first set of operations for a candidate cell associated with the inner RRC reconfiguration message, wherein the first set of operations comprises downlink synchronization towards the candidate cell;

receive, from the base station, a first downlink (DL) Medium Access Control (MAC) message, wherein the first DL MAC message comprises a first identifier field; and apply, in the candidate cell associated with a first identifier indicated in the first identifier field, a timing advance command after performing a second set of operations, wherein the second set of operations comprises cancelling triggered buffer status report.

* * * * *